(12) United States Patent
Harper

(10) Patent No.: US 11,835,940 B2
(45) Date of Patent: Dec. 5, 2023

(54) APPARATUS FOR SEPARATING COMPONENTS OF A HARD DISK DRIVE

(71) Applicant: Jack Harper, Oakwood Village, OH (US)

(72) Inventor: Jack Harper, Oakwood Village, OH (US)

( * ) Notice: Subject to any disclaimer, the term of this patent is extended or adjusted under 35 U.S.C. 154(b) by 178 days.

(21) Appl. No.: 17/398,736

(22) Filed: Aug. 10, 2021

(65) Prior Publication Data

US 2021/0365015 A1 Nov. 25, 2021

Related U.S. Application Data

(63) Continuation-in-part of application No. 17/115,457, filed on Dec. 8, 2020, now Pat. No. 11,429,088, which is a continuation of application No. 16/574,925, filed on Sep. 18, 2019, now Pat. No. 10,860,009.

(60) Provisional application No. 62/849,889, filed on May 18, 2019, provisional application No. 62/849,890, filed on May 18, 2019, provisional application No. 63/063,686, filed on Aug. 10, 2020.

(51) Int. Cl.
*B23P 19/00* (2006.01)
*G11C 5/12* (2006.01)
*G05B 19/418* (2006.01)
*G01V 8/10* (2006.01)
*G06K 7/14* (2006.01)

(52) U.S. Cl.
CPC ......... *G05B 19/41865* (2013.01); *G01V 8/10* (2013.01); *G06K 7/1417* (2013.01); *G05B 2219/31229* (2013.01)

(58) Field of Classification Search
CPC ................ G01V 8/10; G05B 19/41865; G05B 2219/31229; G06K 7/1417
See application file for complete search history.

(56) References Cited

U.S. PATENT DOCUMENTS

| | | | |
|---|---|---|---|
| 6,886,234 B2 * | 5/2005 | Nayar | G11B 25/043 29/426.6 |
| 8,141,236 B2 * | 3/2012 | Fawzi | B23P 19/069 29/709 |
| 9,718,159 B2 * | 8/2017 | Ruden | B23P 19/06 |
| 2003/0011986 A1 * | 1/2003 | Ariga | G06F 1/203 361/679.17 |
| 2011/0090585 A1 * | 4/2011 | Schwarcz | G11B 5/0245 206/223 |

\* cited by examiner

*Primary Examiner* — Paul D Kim
(74) *Attorney, Agent, or Firm* — MacMillan, Sobanski & Todd, LLC

(57) ABSTRACT

An apparatus for separating components of a hard disk drive includes a pair of opposing drive rollers and a separating blade mounted on a blade mount. The opposing drive rollers are configured to contact a hard disk drive housing and move the hard disk drive through a separating station. The separating station defines a base and includes the separating blade mounted on a blade mount. The separating blade and the blade mount are resiliently suspended relative to the base. The separating blade is configured to deflect to a separation point to remove a first hard drive component from a second hard drive component.

12 Claims, 46 Drawing Sheets

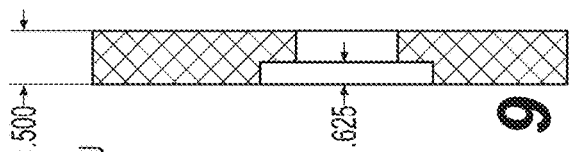
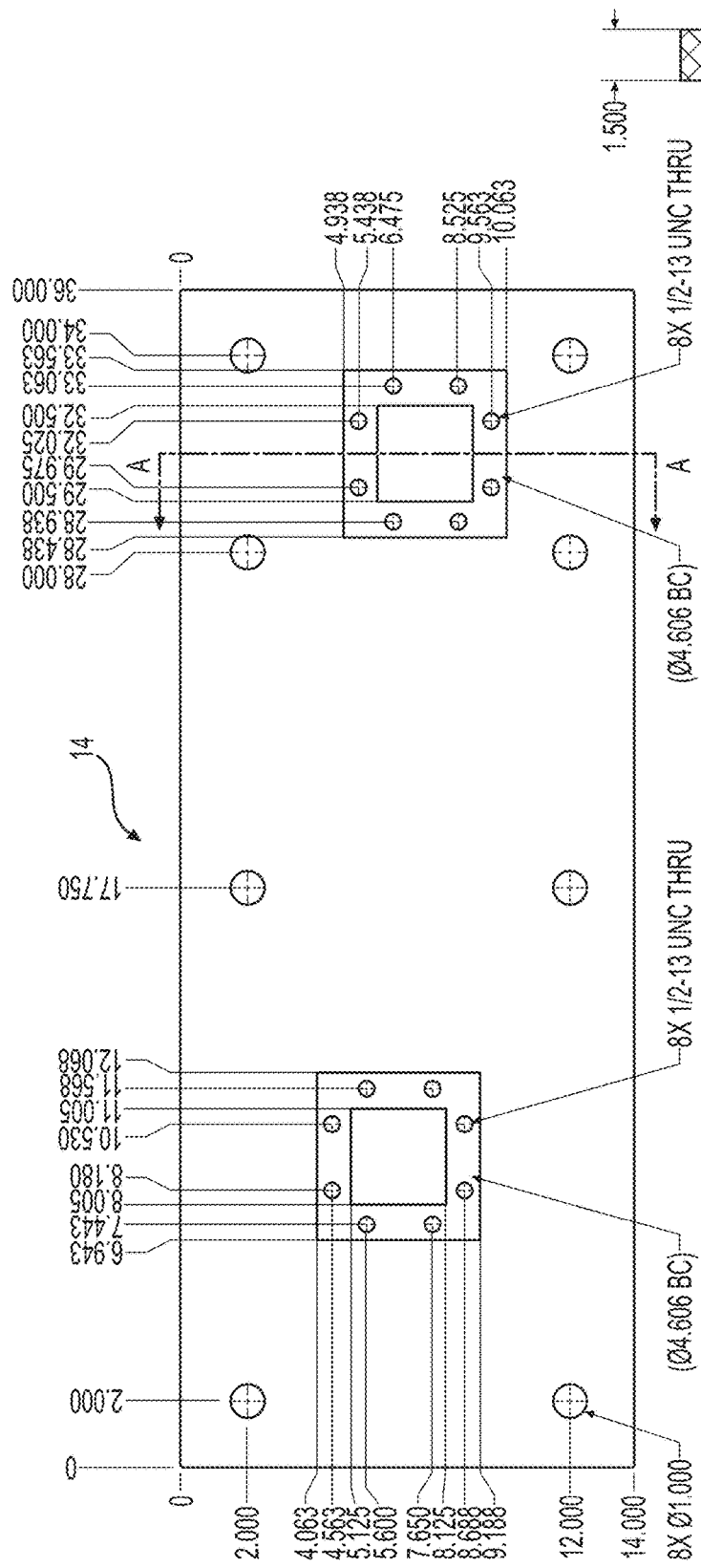
*FIG. 8*
*FIG. 9*

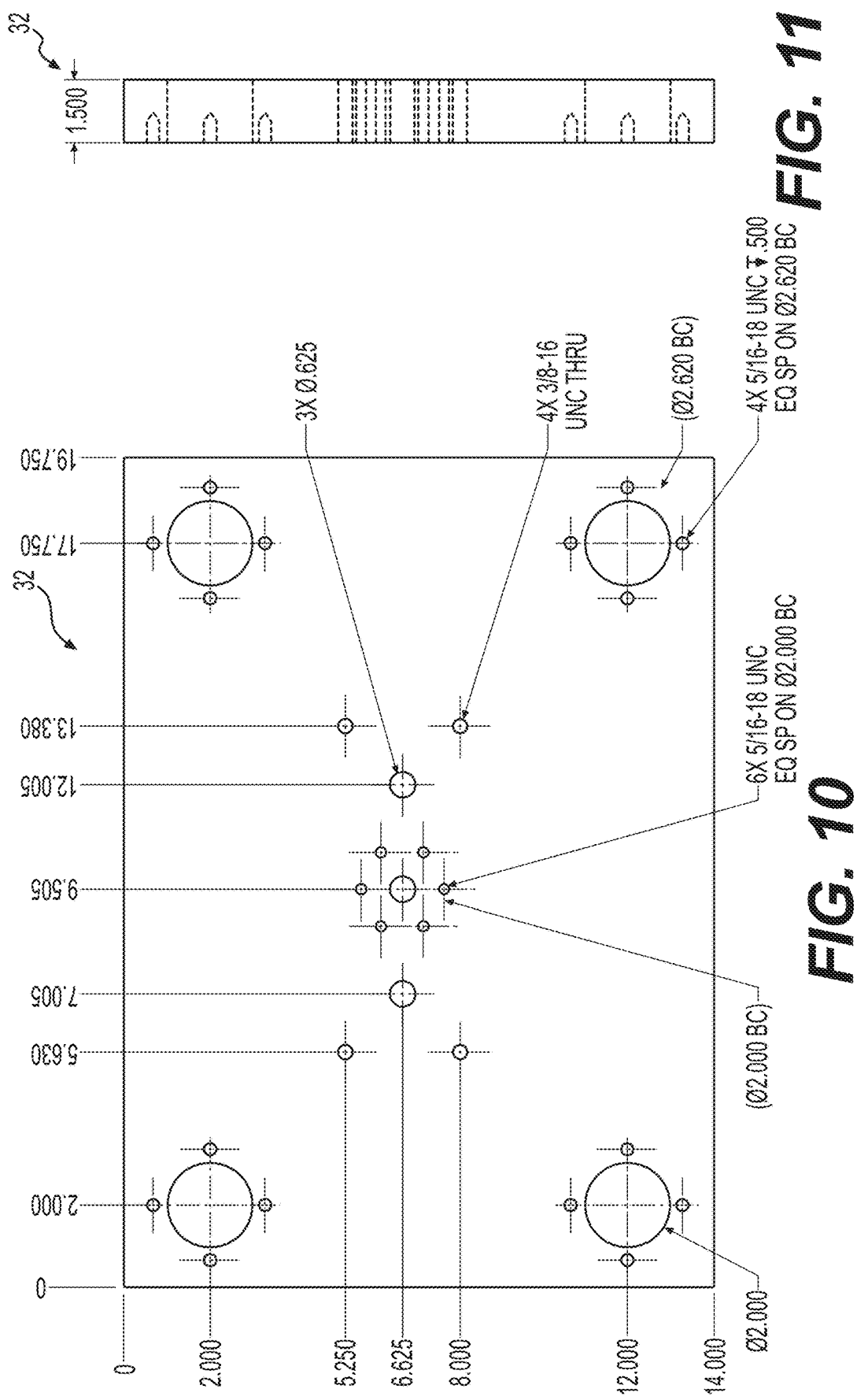

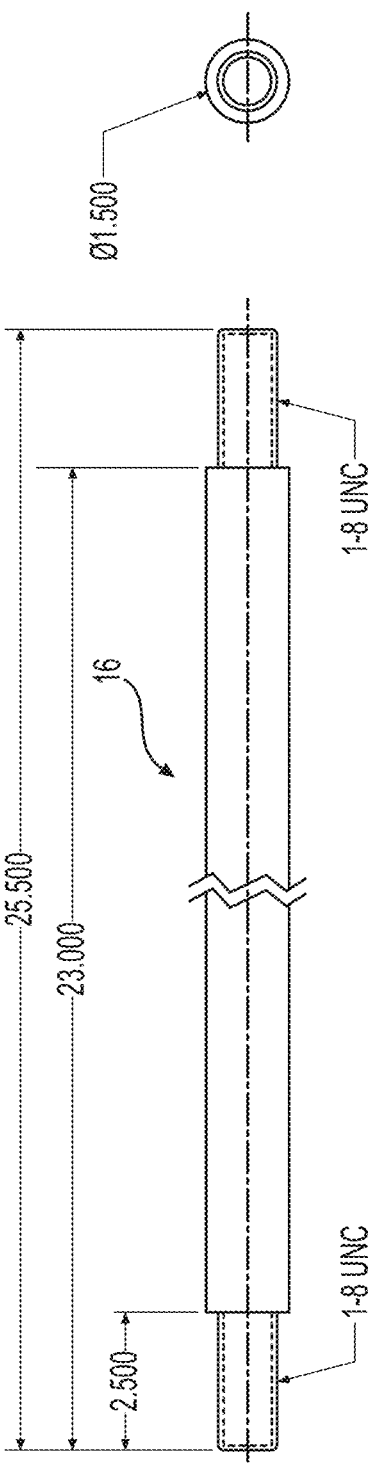

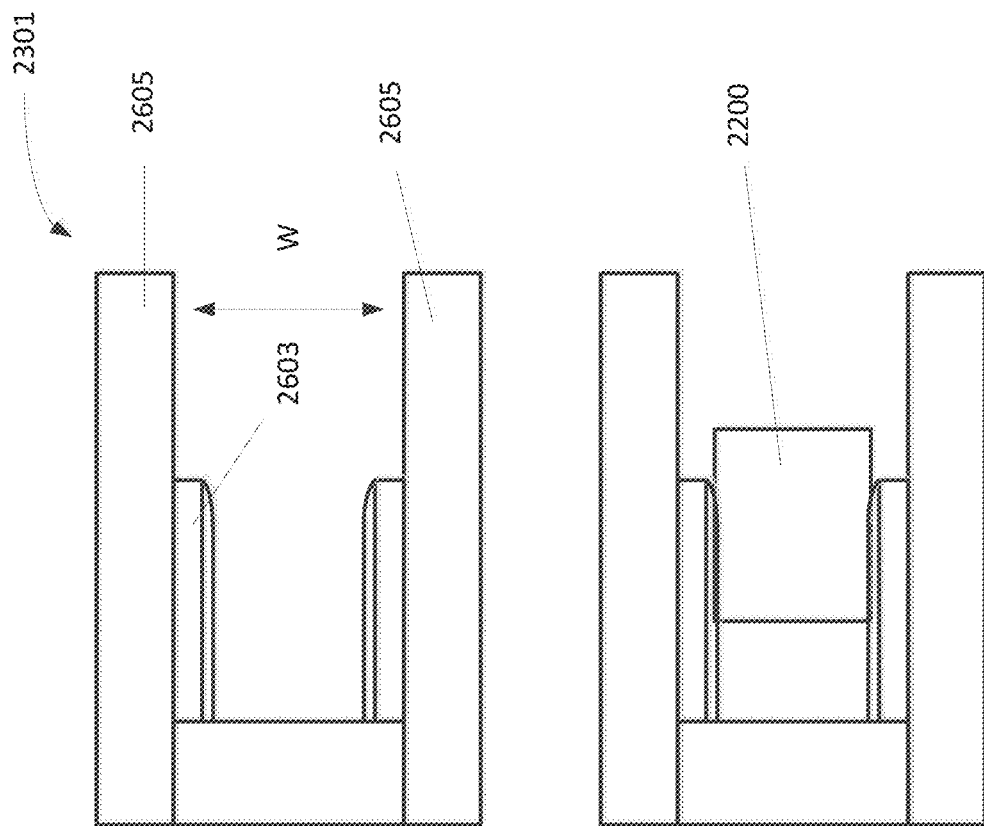

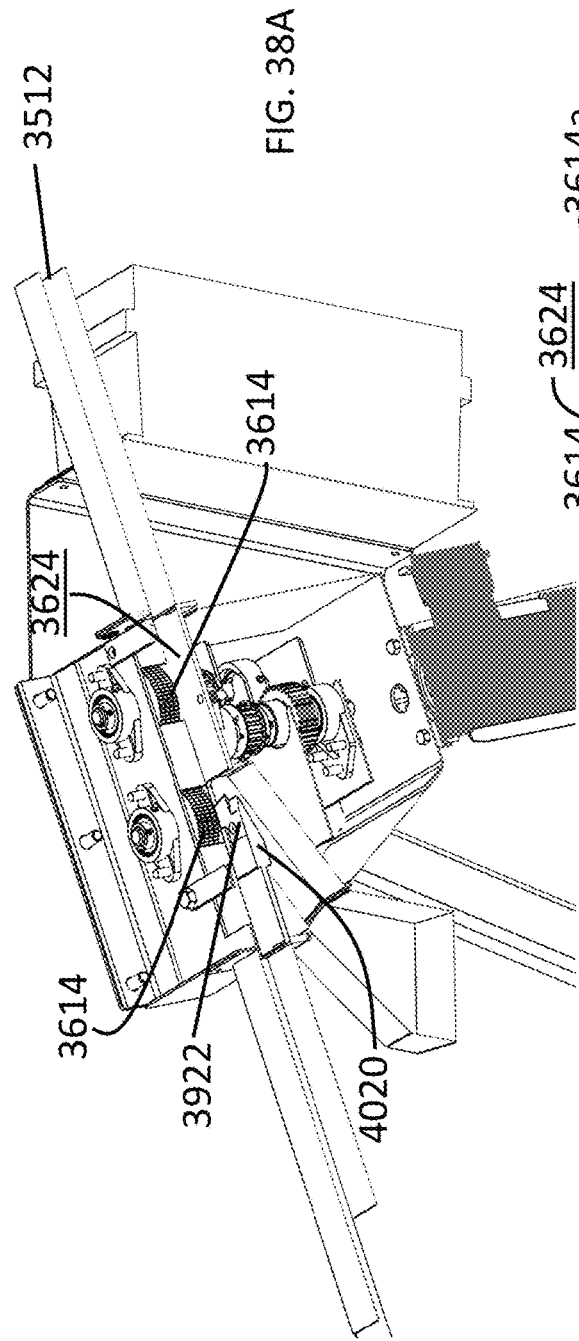
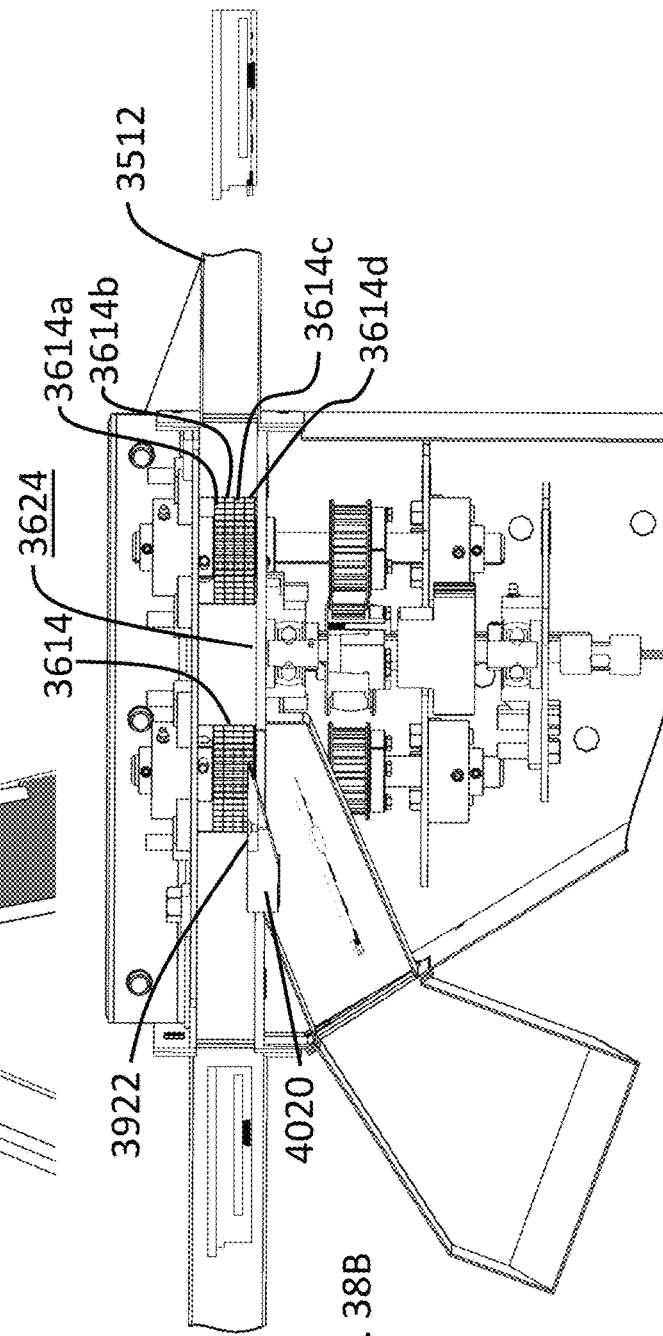
FIG. 38A
FIG. 38B

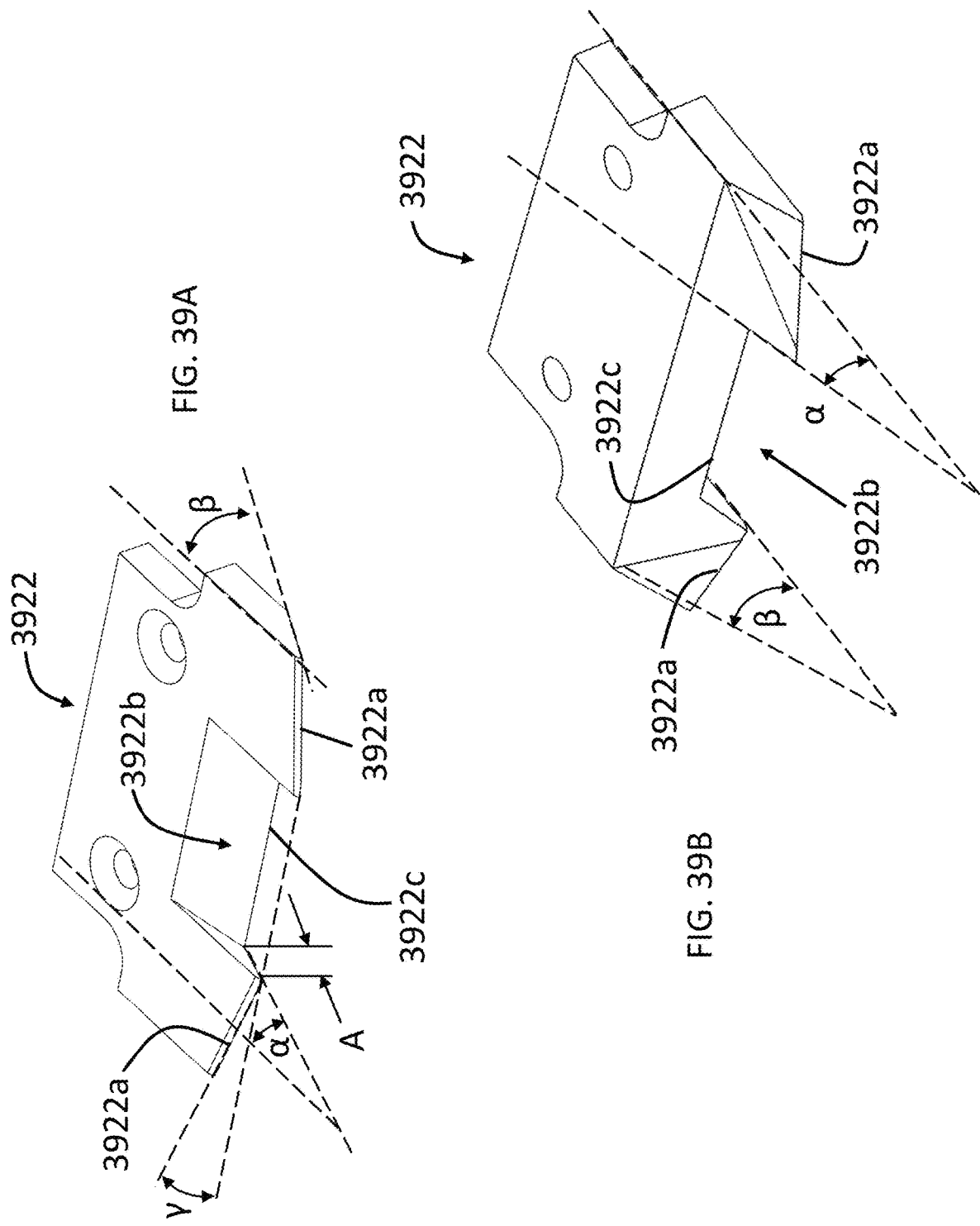

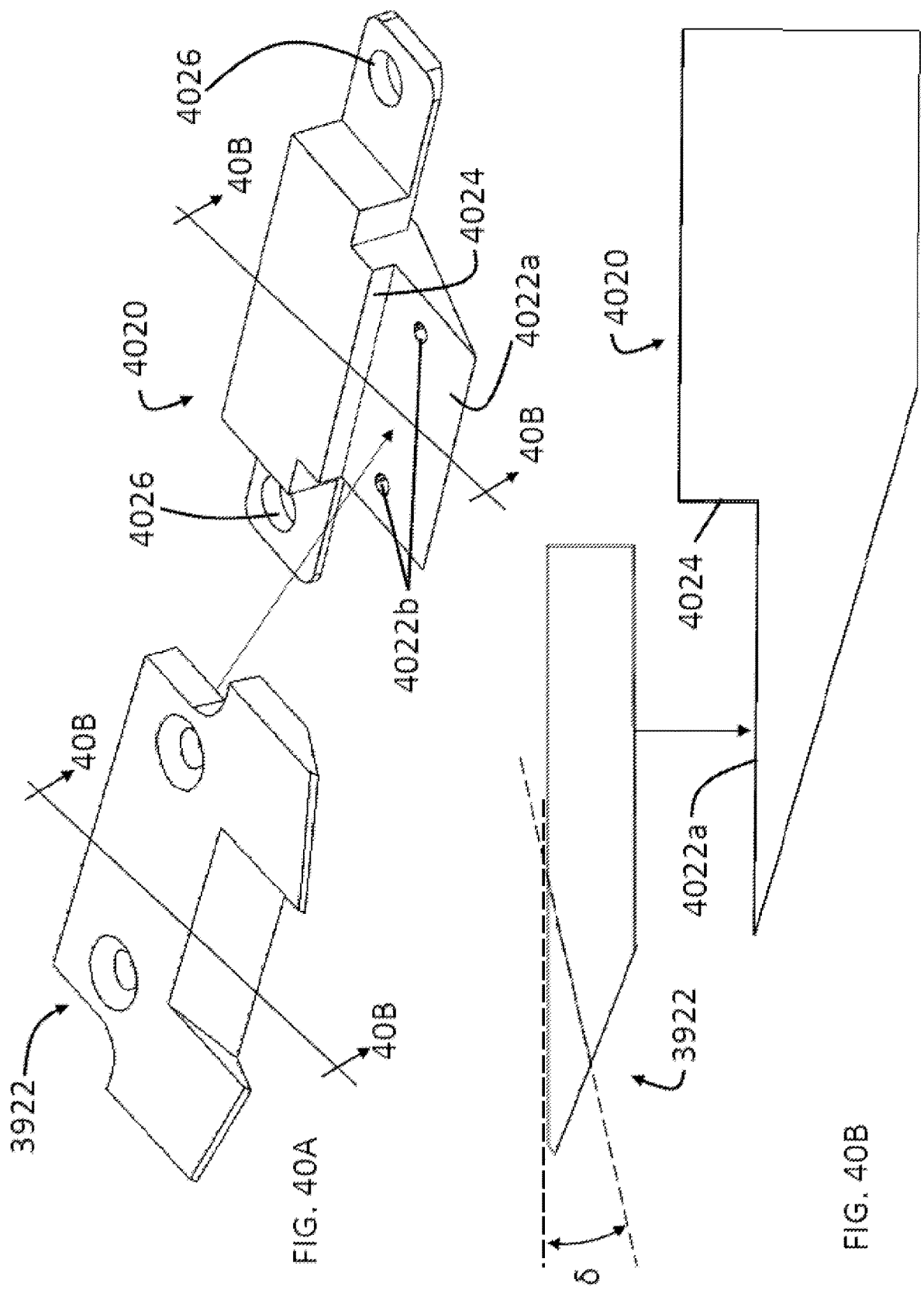

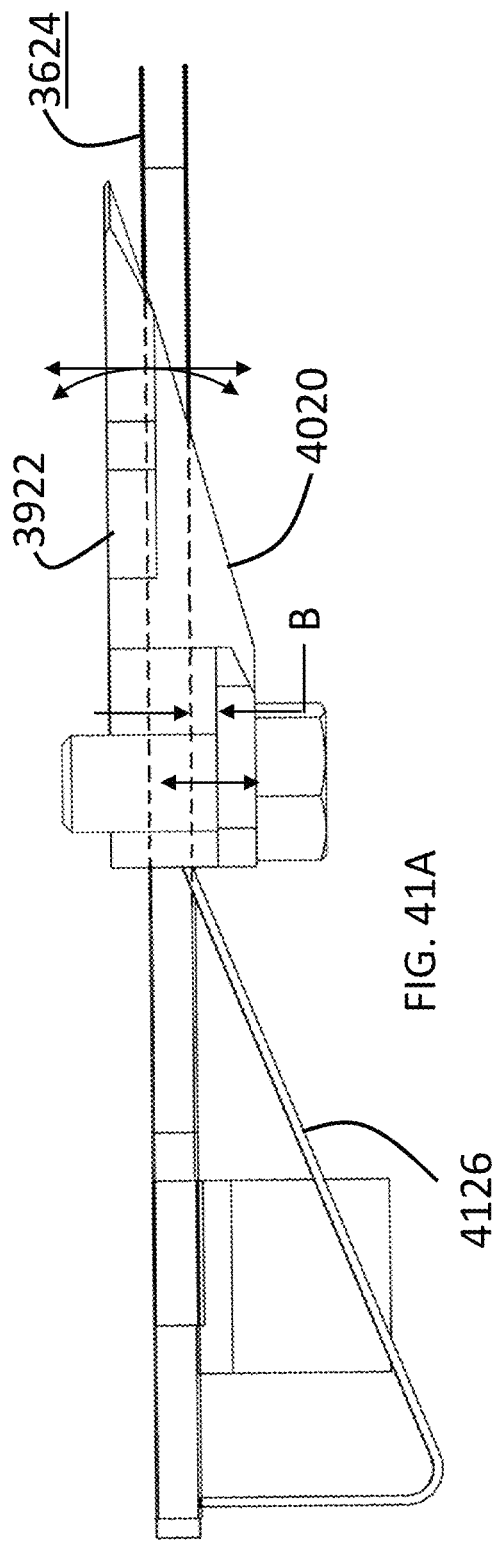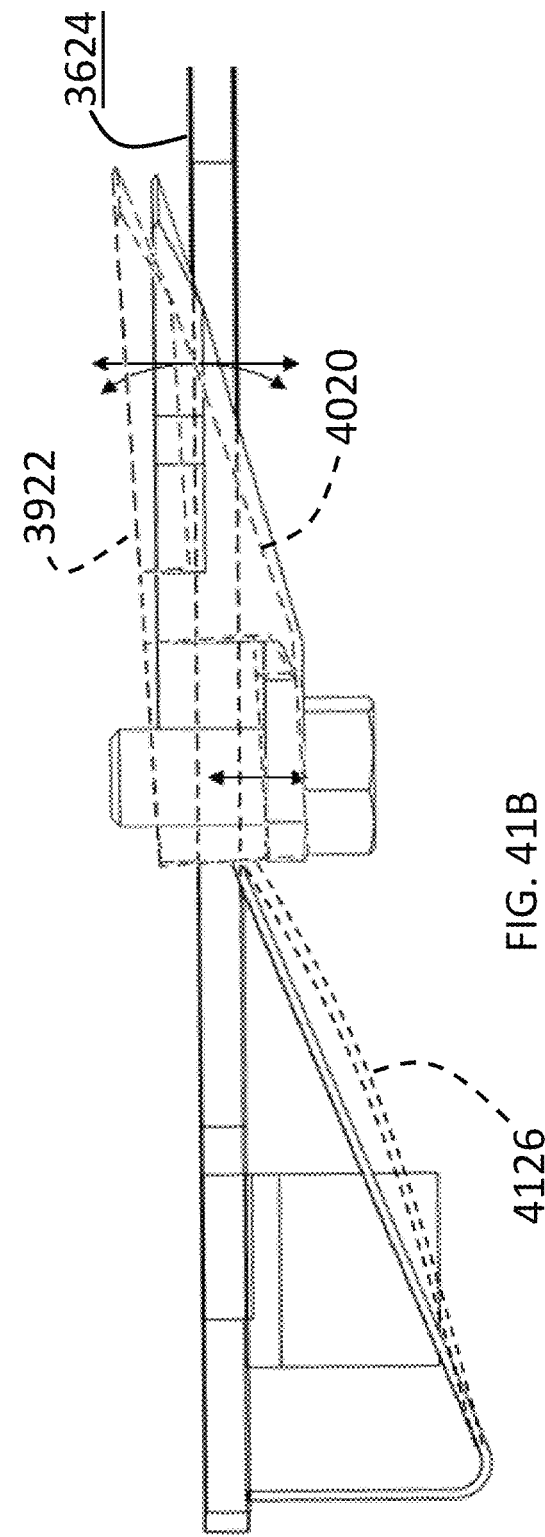

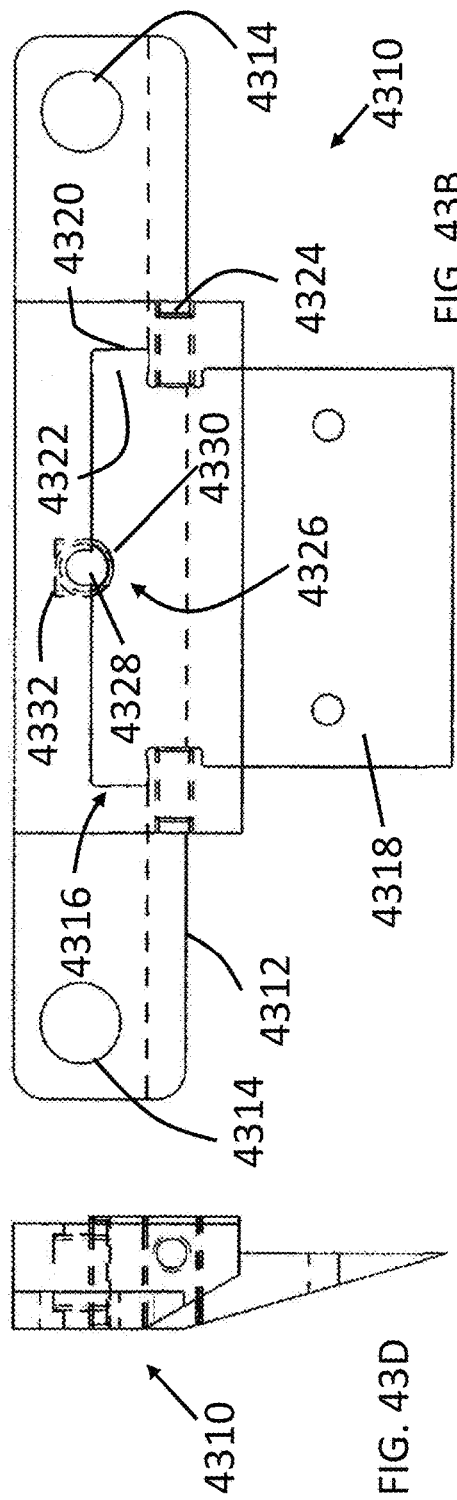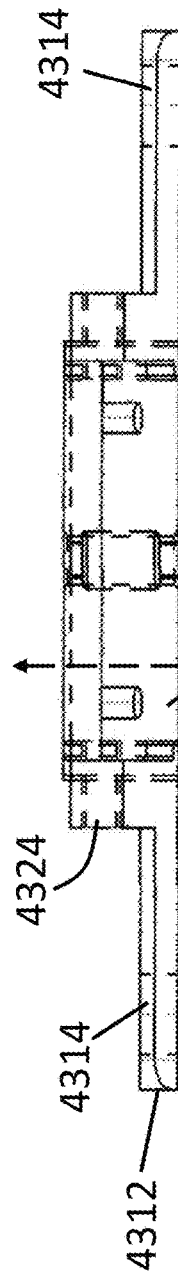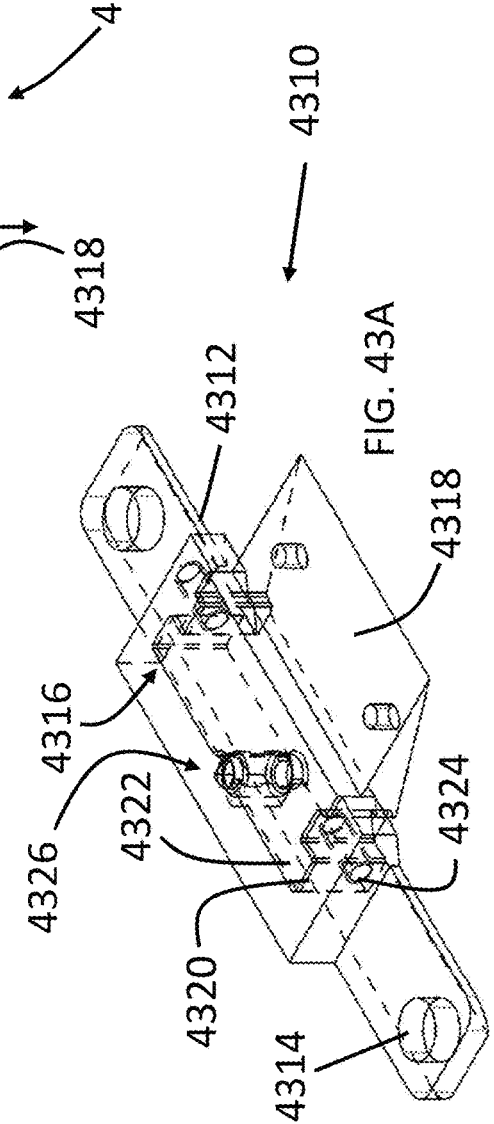

APPARATUS FOR SEPARATING COMPONENTS OF A HARD DISK DRIVE

CROSS-REFERENCE TO RELATED APPLICATIONS

This application is a continuation-in-part of U.S. patent application Ser. No. 17/115,457, filed Dec. 8, 2020, now U.S. Pat. No. 11,429,088, issued Aug. 30, 2020. U.S. patent application Ser. No. 17/115,457 is a continuation patent application of U.S. patent application Ser. No. 16/574,925, filed Sep. 18, 2019, now U.S. Pat. No. 10,860,009, issued Dec. 8, 2020. U.S. patent application Ser. No. 16/574,925 claims the benefit of U.S. Provisional Application No. 62/849,889, filed May 18, 2019 and U.S. Provisional Application No. 62/849,890, filed May 18, 2019. This application further claims the benefit of U.S. Provisional Patent Application No. 63/063,686, filed Aug. 10, 2020. The disclosure of these applications are incorporated herein by reference in their entirety.

BACKGROUND

Technical Field

The present disclosure is directed to a system and method for securely dismantling or breaking down a hard disk drive.

Description of the Related Art

The background description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

Hard disk drives (HDD) are used as the main storage device in computer devices, which may be either standalone systems or part of a network such as data centers. Three-and-a-half inch drives, for example, are commonly included in desktop computers, workstations, and server computers, as well as for mass storage in data centers. Smaller two and a half inch drives are commonly included in laptop computers. Various other sizes of hard disk drives have been provided for various other computer devices.

Data centers currently widely exists as facilities used to house computer systems and associated components, such as telecommunications and storage systems. Data centers generally include redundant or backup power supplies, redundant data communications connections, environmental controls (e.g., air conditioning, fire suppression) and various other equipment that may be used to operate and manage a carrier's telecommunication network, provide data center based applications directly to the carrier's customers, provide hosted applications for a third party to provide services to their customers, or provide a combination of these or similar data center applications. With the increased utilization of cloud computing, the number, functions, size and importance of large data centers are all increasing.

Partly the result of the above indicated increases, environmental efficacy in the design and operation of data centers are routinely scrutinized, and ongoing efficiencies in capacity, energy consumption, and operations are almost universally continuous improvement goals.

In addition, the current use of hard disk drives (HDD's) as data storage devices in these and other applications are a crucial aspect in data storage and recall. However, the use of disk drives poses additional concerns in their decommissioning, destruction or recycling in that the destruction or incapacity of the information maintained data must also be secured. Data erasure (also called data clearing or data wiping) is normally a software-based method of overwriting or otherwise rendering unrecoverable any electronic data residing on a hard disk drive or other digital media. Permanent data erasure goes beyond basic file deletion commands, which only remove direct pointers to the data disk sectors and make the data recovery possible with available software tools.

Consequently, decommissioning of HDD's typically requires physical destruction of electronic storage media in order to render it unusable. While data erasure is designed to remove all information and leave the disk operable, in many instances the absolute destruction of these data storage systems is desired, preferred, or required due to privacy, security or regulatory requirements (including, but not limited to, the Gramm-Leach-Bliley Act ("GLBA") 501 and the Health Insurance Portability and Accountability Act ("HIPAA").

Various commercially available methods and devices intended to address these requirements offer only varying degrees of effectiveness. Industry best practices, and expectations (and desires) of consumers generally include electromagnetic methods (e.g., degaussing), and mechanical methods (e.g., crushing, or drilling). In some instances, no acceptable method of destruction currently meets the desired needs, resulting in inventories of obsolete HDD's waiting for a secure solution.

Typical methods and devices are known that physical destruct the HOD device. For example, U.S. Pat. No. 8,251,303 issued in the name of Wozny discloses a hard drive destruction system for destroying a memory device (e.g., a hard drive) having data stored thereon. The system has a grind chamber with a rotatable grind wheel positioned therein. A pressure arm presses the memory device against the grind wheel as the grind wheel rotates. The rotating grind wheel grinds the memory device into particles from which the data stored on the memory device cannot be recovered. The particles are collected in a receptacle adjacent the grind wheel. The system may include a plurality of guides configured to maintain the memory device in a substantially stationary position relative to the pressure arm as the grind wheel grinds the memory device into particles.

This example typifies the physical destruction of HDD's through grinding, shredding or other types of comminuting. Such physical destruction continues to result in significant problems for which solutions are still needed. Maintaining chain of custody and proof of destruction or information non-recovery are issues with which to deal. Further, there have been few or any attempts to decrease environmental contamination or increase the recyclability of waste products resulting from the destruction of current HDD's. By way of example, and not as a limitation, the destruction and disposal of phones, computers and hard drives, known as electronic garbage or "e-Waste", is the fastest growing type of community waste. These metals may be toxic if released in an airborne particulate or a groundwater leachate form, and many rare earth and metals are non-renewable resources that cannot be efficiently recycled when comminuted or ground and commingled into a common waste stream. The current solution for much electronic trash is often to ship the bulk mixed materials for processing in Asian and African countries, in some cases by children who must manually separate the materials, thereby creating exposure to dangerous toxins.

Subsequently, approaches have been applied which disassemble and recycle hard disk drives. Also, some approaches have been applied which disassemble and refurbish hard disk drives. U.S. Pat. No. 8,141,236 describes an apparatus for removal of a mechanism retaining a cover of a component device. A drive mechanism drives a plurality of retentive mechanism removers to unscrew cover screws retaining the cover of the component device. U.S. Pat. No. 9,275,677 describes a hard disk drive top cover removal tool. U.S. Pat. No. 8,863,372 describes another hard disk drive top cover removal tool.

Also, hard disk drives include magnets that contain rare earth minerals. U.S. Pat. No. 9,095,940 describes a system and method for recycling magnetic material. The system includes a positioning mechanism that defines a recess to receive and locate the end-of-life product, the end-of-life product including a waste magnet, a separating station to separate a portion of the end-of-life product containing the waste magnet from the rest of the end-of-life product, and a transport station that receives the portion of the end-of-life product containing the waste magnet from the positioning mechanism. GB 2487656 describes a method of removing one or more rare earth magnets from the assembly that includes exposing at least one or more selected rare earth magnets to hydrogen gas.

In some cases, the hard disk drives may contain confidential information. In such case, it is desirable to remove the hard disk drives in a manner that prevents the data from being picked up, comprehended, or used by an outside party. An approach to preventing confidential data from being obtained from a hard disk drive has been to shred the platters. U.S. Pat. No. 8,851,404 describes a method and apparatus for destroying data on a hard drive having at least one platter on which data is stored. The platters are shredded while leaving the hub unshredded.

Also, a hard disk drive may be serviced by non-destructively removing its top cover. U.S. Pat. No. 6,886,234 describes a method for removing a top cover from a disc drive without subjecting the disc drive to shock and without damaging the disc drive components. A wedge is driven with sufficient force to break the gasket bond between top cover and base. A top cover holder holds onto the top cover and removes it from the base.

It is thus an object of the present invention to provide an improved method and apparatus for destruction of e-Waste hardware.

It is another object of the present invention to provide for such destruction of e-Waste hardware in a manner that minimizes noxious environmental contaminants.

It is yet another objection of the present invention to provide for such destruction of e-Waste hardware in a manner that maintains a verifiable and documented chain of custody and proof of destruction or information non-recovery.

It is yet another object of the present invention to provide such a method and apparatus particularly adapted for use in the decommissioning of data center data drives.

It is yet another object of the present invention to provide a method and apparatus for use in the decommissioning of data center data drives that satisfies privacy, security or regulatory requirements without grinding, shredding or other types of comminuting.

It is yet another object of the present invention to provide a method and apparatus for use in the decommissioning of data center data drives that results in the separation of HOD components in a manner that allows for reduced recycling • cost and overall efficiency.

It is yet another object of the present invention to provide a method and apparatus for use in the decommissioning of data center data drives that results in waste streams that are redistributable as sustainable engineered resources.

It is still another objection of the present invention to provide for such destruction of an e-Waste in a manner results in the material stream being capable of being entirely recycled.

It is preferable in an improved method and apparatus for secure disposal of electronic data drives that the hardware data drive be disassembled in a manner that allows for major components to be separated into separate material streams. Inventoried hard disc drives that are selected for disposal should be conveyed in a manner that allows for a standardized, oriented presentation and conveyed into an automated disassembly sheer in which the major componentry may be disconnected without drilling, grinding, or other operation that would significantly cause commingling of materials of differing makeup.

Upper and lower covers, frame, motors, magnets, actuators, platter assemblies and printed circuit boards (PCBs) are removed from each other in a manner that will allow for separation and diversion of each of the major components in an automated manner absent significant personnel manipulation. Once separated, each of the major components may be diverted for recycling in more efficient and cost effective manner than if the materials from these components would be ground or otherwise comminuted and then blended or mixed together. The hard disk drive platters are the circular disk on which magnetic data is stored, and generally a plurality of platters are mounted on a single spindle motor.

It is preferable in an improved method and apparatus for secure disposal of electronic data drives that the platter assemblies themselves be separated from the spindle motor and subsequently isolated. It is preferable in an improved method and apparatus that for the secure disposal of electronic data that only the separated, isolated platters themselves be treated for information destruction or information non-recovery in a manner that maintains a documented chain of custody.

It is still another object of the present disclosure to separate magnetic material from hard disk drives with high throughput. It is still another object of the present disclosure to separate parts and components of the hard disk drives with high throughput in a manner that accumulates materials for recycling.

Therefore, a need exists for methods of destroying a hard drive that ensure data stored on the hard drive cannot be retrieved that also allows the owner of the hard drive to maintain possession and/or control of the hard drive at all times in a manner that decreases environmental contamination or increases the recyclability of waste products resulting from the destruction of current HDD's. The present application provides these and other advantages as will be apparent from the following detailed description and accompanying figures.

SUMMARY

Aspects of the present invention include a method, apparatus and system for destroying a memory devices (such as a hard disk drives) having data stored thereon. The system disassembles major components of the HDD's in an automated manner and segregates these components into separate, selected material streams. Hard disc drives that are selected for disposal are conveyed to an automated disassembly sheer in a standardized position and oriented presentation. The disassembly sheer separates major componentry without drilling, grinding, or other operation that would significantly cause commingling of materials of differing makeup. Upper and lower covers, frame, motors, magnets, actuators, platter assemblies and printed circuit boards (PCBs) are removed from each other and diverted from each other in an automated manner absent significant personnel manipulation. Once separated, each of the major components are then individually recycled in a manner that optimizes cost, operational and environmental efficiencies. The hard disk drive platters themselves are identified and isolated for secure disposal of electronic data and treated for information destruction or information non-recovery in a manner that maintains a documented chain of custody.

In an exemplary embodiment, a method of dismantling a plurality of hard disk drives is disclosed. Each hard disk drive including a housing, a logic board at a lower portion of the housing, and a lid at an upper portion of the housing, such that the housing, logic board and lid encase internal parts of the hard disk drive. The method includes, for each of the plurality of hard disk drives clamping the hard disk drive into a holder assembly; reading identification information printed on a label of the hard disk drive by a scanner; indexing the hard disk drive to a position at which the logic board of the hard disk drive is peeled off and dropped into a bin for holding logic boards; separating the lid of the hard disk drive from a housing of the hard disk drive; indexing the hard disk drive to a position at which one or more magnets, as encased parts of the internal parts of the hard disk drive, are punched in a direction from the logic board side of the hard disk drive to separate the one or more magnets from the hard disk drive; and dispensing remaining of the internal parts of the hard disk drive into a final parts bin.

In another exemplary embodiment, an apparatus for dismantling a plurality of hard disk drives is disclosed. Each hard disk drive including a housing, a logic board at a lower portion of the housing, and a lid at an upper portion of the housing, such that the housing, logic board and lid encase internal parts of the hard disk drive. The apparatus including a holder assembly configured to clamp a hard disk drive; a scanner that reads an identification information printed on a label of the hard disk drive; a chain conveyor belt that indexes the hard disk drive to a position at which a logic board of the hard disk drive is peeled off and dropped into a bin for holding logic boards; a lid separating station configured to separate the lid of the hard disk drive from a housing of the hard disk drive; the chain conveyor belt indexes the hard disk drive to a position at which one or more magnets of the hard disk drive are punched; a magnet punching station configured to punch the one or more magnets, as encased parts of the internal parts of the hard disk drive, in a direction from the logic board side of the hard disk drive to separate the one or more magnets from the hard disk drive; and a final parts bin into which remaining of the internal parts of the hard disk drive are dispensed into.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 8 is a top plan view of an upper plate 14 for use therewith;

FIG. 9 is a cross sectional view taken along Line A-A of FIG. 8;

FIG. 10 is a top plan view of a sheer die plate 32 for use therewith;

FIG. 11 is a right side elevational view of the sheer die plate 32 of FIG. 10;

FIG. 14 is a top plan view of a guide post 16;

FIG. 15 is a right side elevational view of the guide post 16 of FIG. 14;

FIG. 26 is a diagram of a hard disk drive pusher bar assembly;

FIG. 38A is an enlarged, perspective view in cross section of the hard drive processing machine of FIG. 35.

FIG. 38B is an enlarged, elevation view of the hard drive processing machine of FIG. 38A.

FIG. 39A is a perspective view of a top side of an embodiment of a circuit board separating blade.

FIG. 39B is a perspective view of a bottom side of the circuit board separating blade of FIG. 39A.

FIG. 40A is an exploded view of the circuit board separating blade of FIG. 39A and a blade holder.

FIG. 40B is an elevation view in cross section of the blade and holder of FIG. 40A.

FIG. 41A is an enlarged view of the circuit board separating blade and mounting bracket with a suspension element.

FIG. 41B is an enlarged view of the blade, bracket, and suspension of FIG. 41A showing a deflected position in dotted line.

FIGS. 43A-43D are perspective and elevational views of an alternative embodiment of a blade holder.

DETAILED DESCRIPTION

Figure 1:
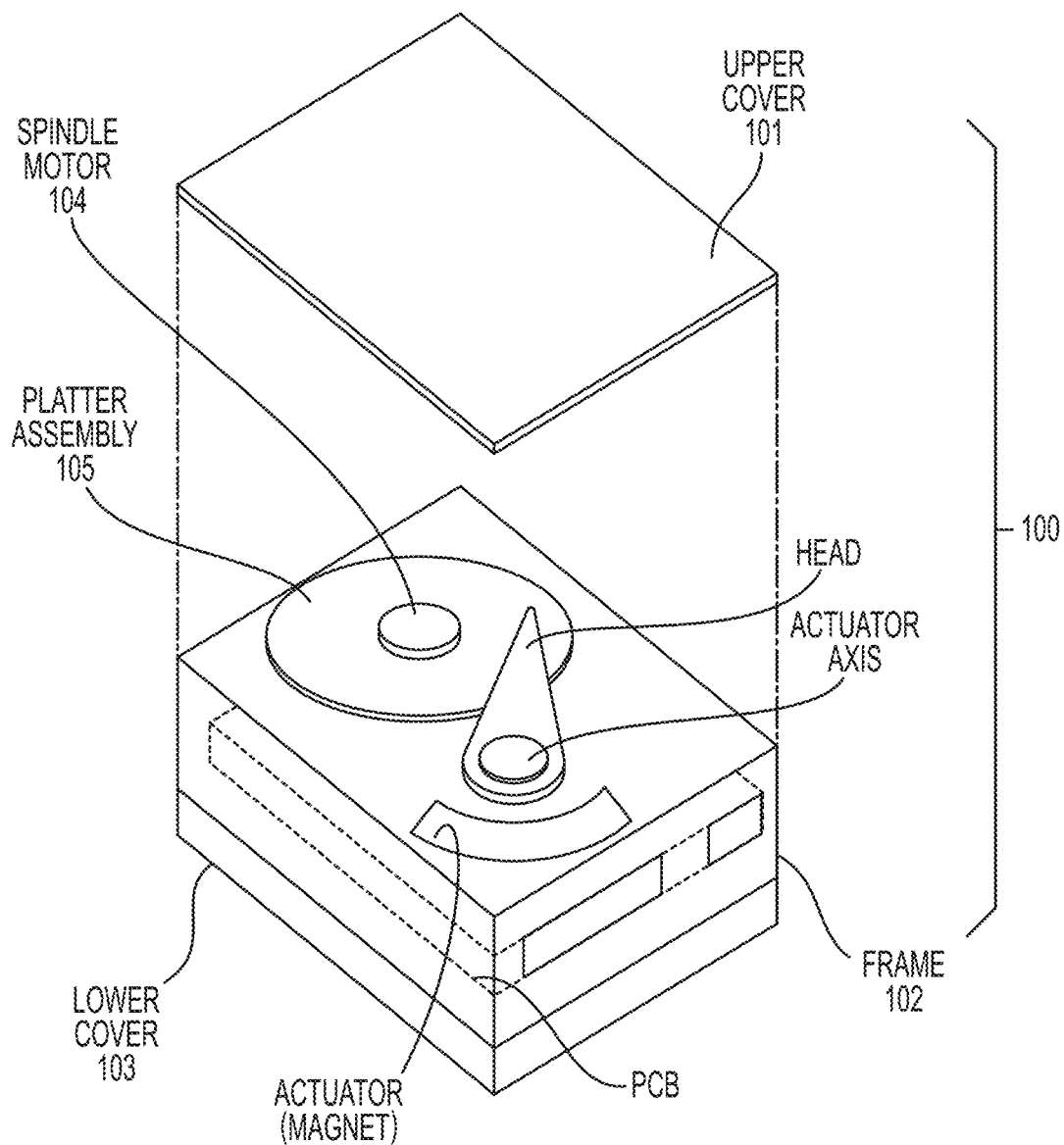
FIG. 1 depicts a partial exploded perspective view of a hard disk drive (HOD) used for data storage according to the PRIOR ART.

In the drawings, like reference numerals designate identical or corresponding parts throughout the several views. Further, as used herein, the words "a," "an," and the like generally carry a meaning of "one or more" unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

As shown in the drawings for purposes of illustration, the present invention provides an improved method and apparatus for destruction of e-Waste hardware in a manner that minimizes noxious environmental contaminants. In an example of the present invention, such a method and apparatus may be particularly adapted for use in the decommissioning of, for example, data center data drives. While more than 200 companies have manufactured HDDs over time, currently the production and available of commercially used HDDs have been concentrated to just three manufacturers today: Western Digital, Seagate, and Toshiba. The estimated 2013 market shares are about 40-45% each for Seagate and Western Digital and 13-16% for Toshiba. The form factor, hardware components and construction of any of these current HDDs according to the PRIOR ART as exemplified in FIG. 1 are similar: a central frame; an upper and lower cover (enclosing the frame); two electric motors; a spindle motor (that spins the disks); an actuator or motor (that positions the read/write head assembly across the spinning disks); an external rotor (attached to the disks); stator windings (fixed in place); a reach-write head (opposite the actuator at the end of the head support arm); thin printed-circuit cables (connect the read-write heads to amplifier electronics mounted at the pivot of the actuator).

Figure 2:
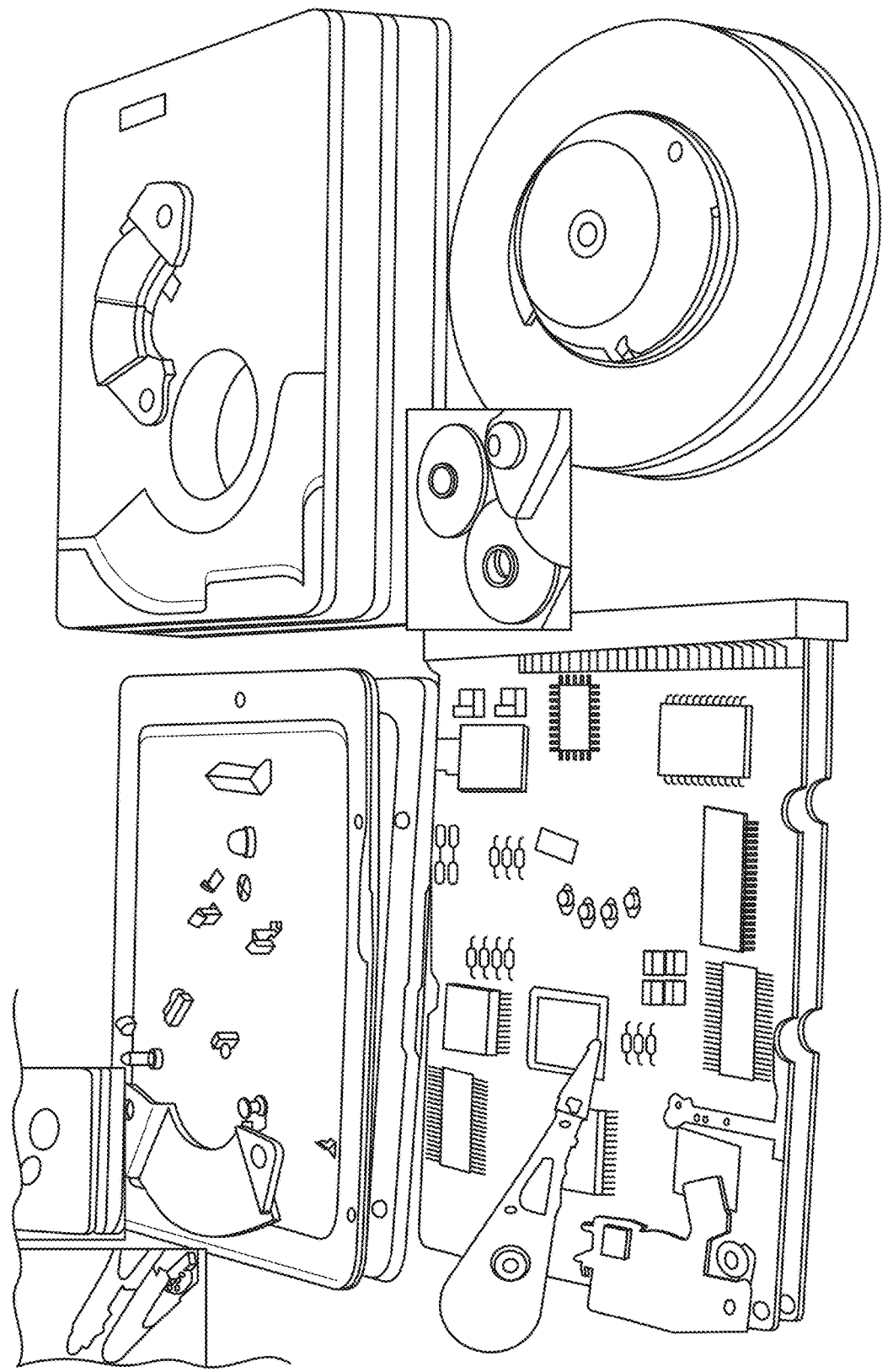
FIG. 2 depicts a photograph of the HOD of FIG. 1 according to the PRIOR ART shown separated by segregated material types.
Figure 3:
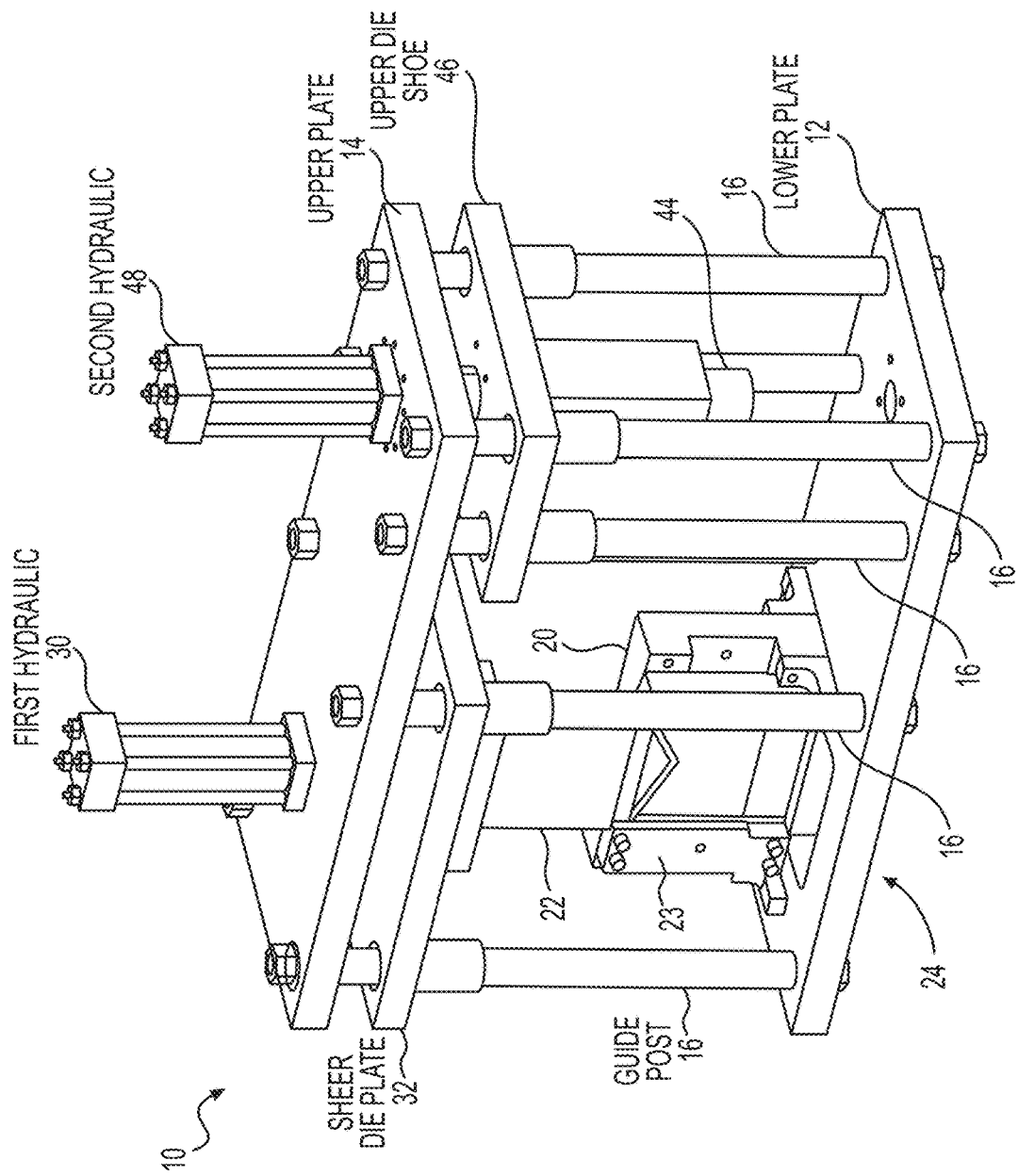
FIG. 3 is a perspective view of a disassembly sheer 10 for use with a method and apparatus for secure disposal of electronic data drives according to a preferred embodiment of the inventive system.
Figure 5:
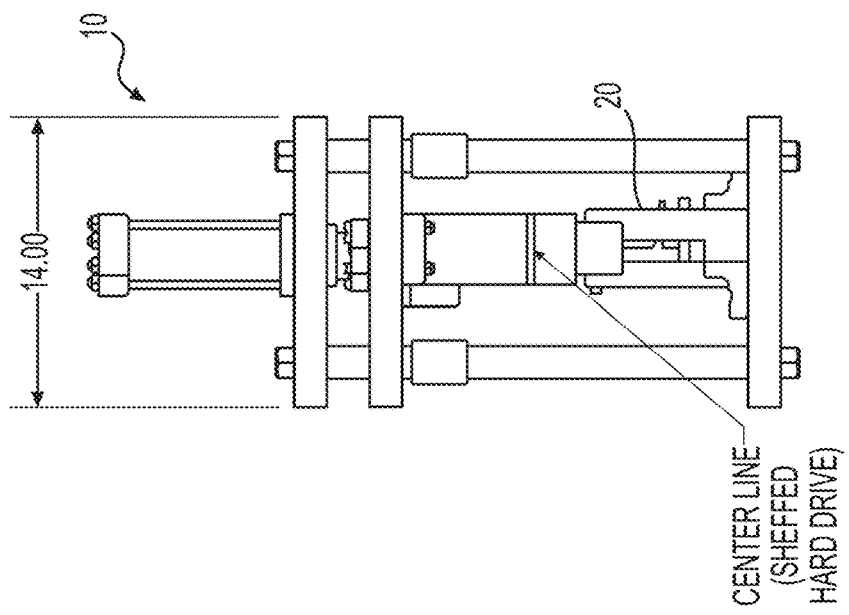
FIG. 5 is a right side elevational view of the disassembly sheer 10 of FIG. 4.
Figure 4:
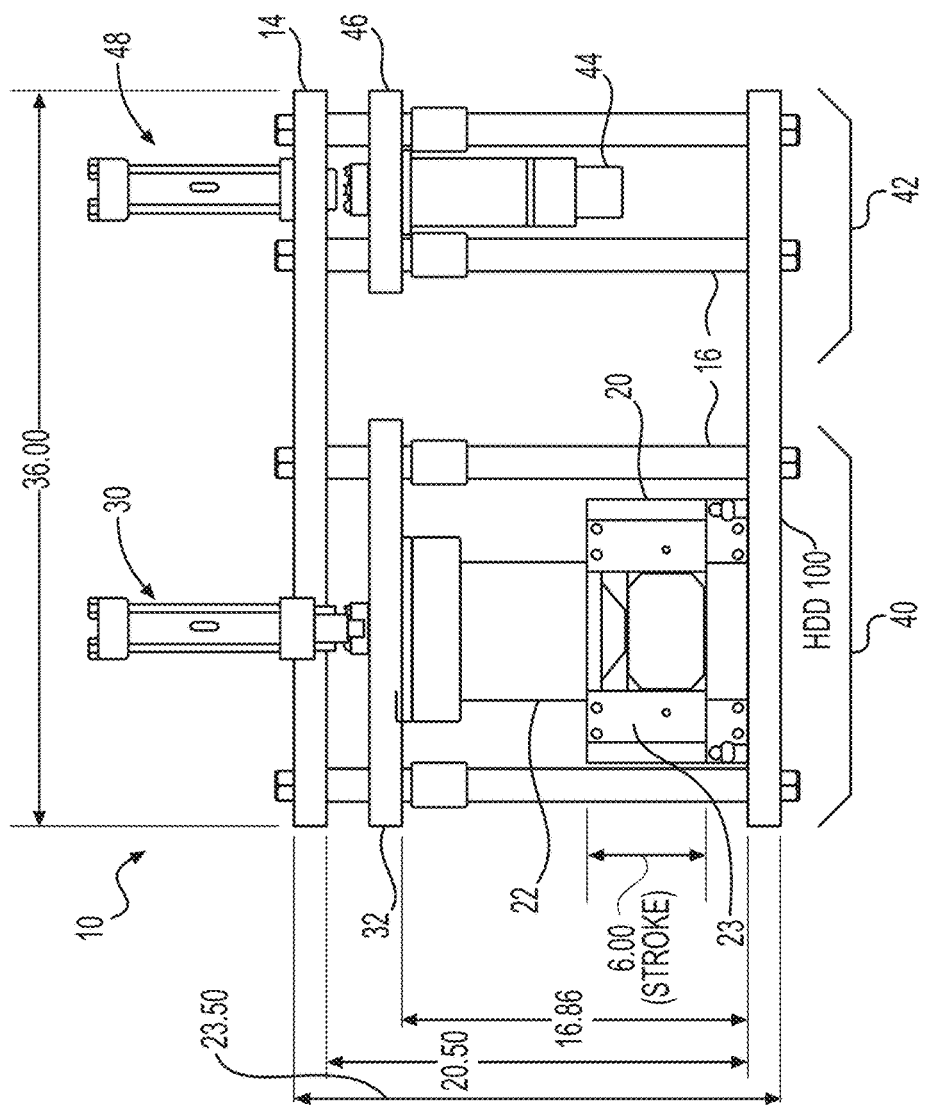
FIG. 4 is a front elevational view of the disassembly sheer 10 of FIG. 3.
Figure 7:
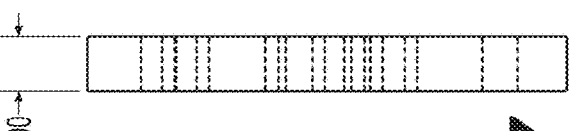
FIG. 7 is a right side elevational view of the lower plate 12 of FIG. 6.
Figure 6:
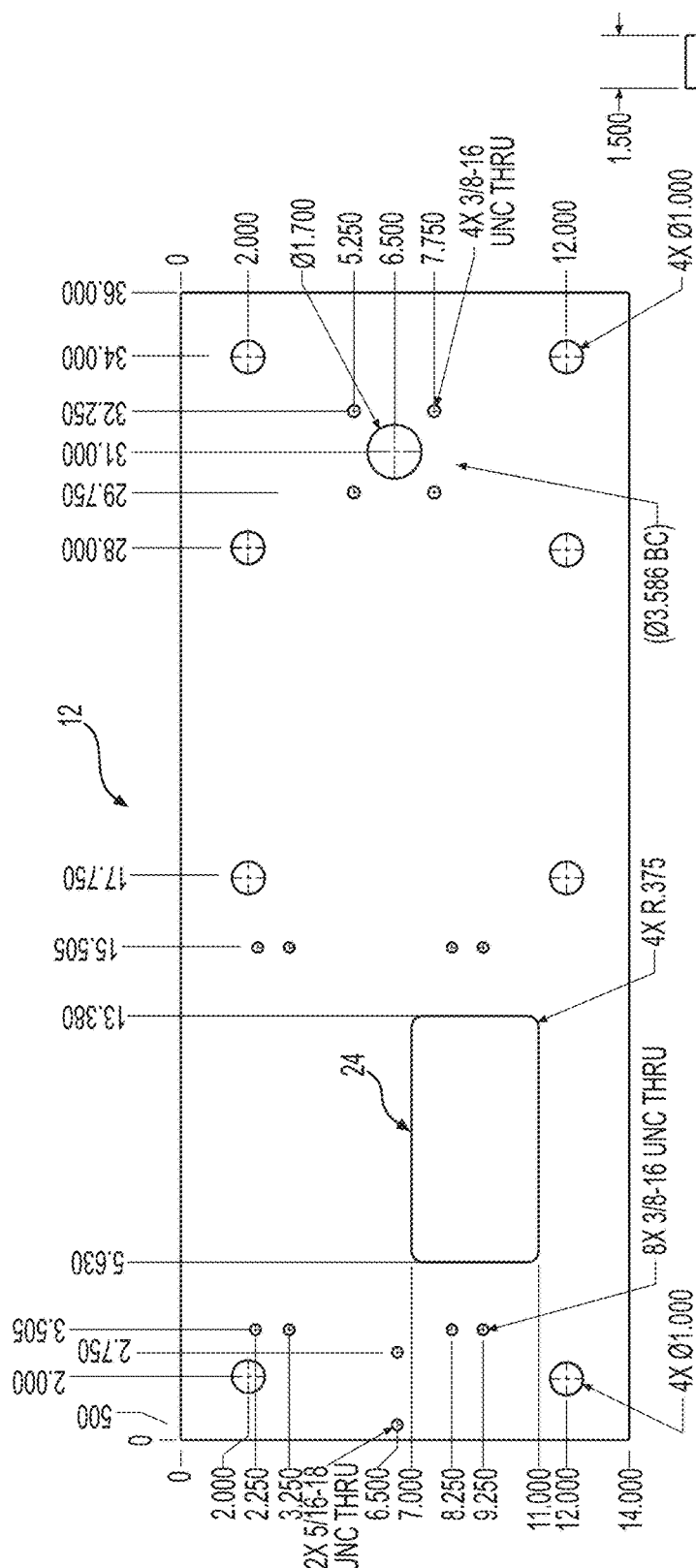
FIG. 6 is a top plan view of a lower plate 12 for use therewith.
Figure 13:
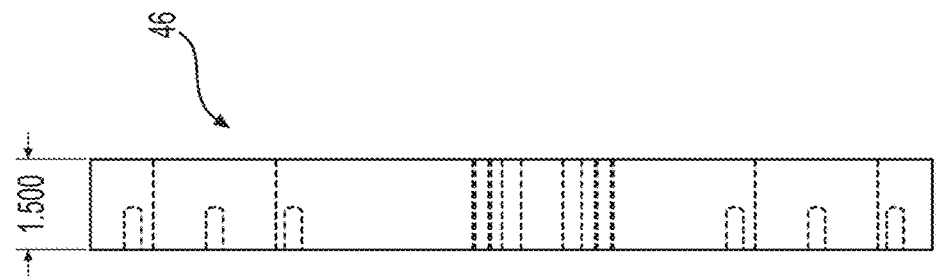
FIG. 13 is a right side elevational view of the upper die shoe 46 of FIG. 12.
Figure 12:
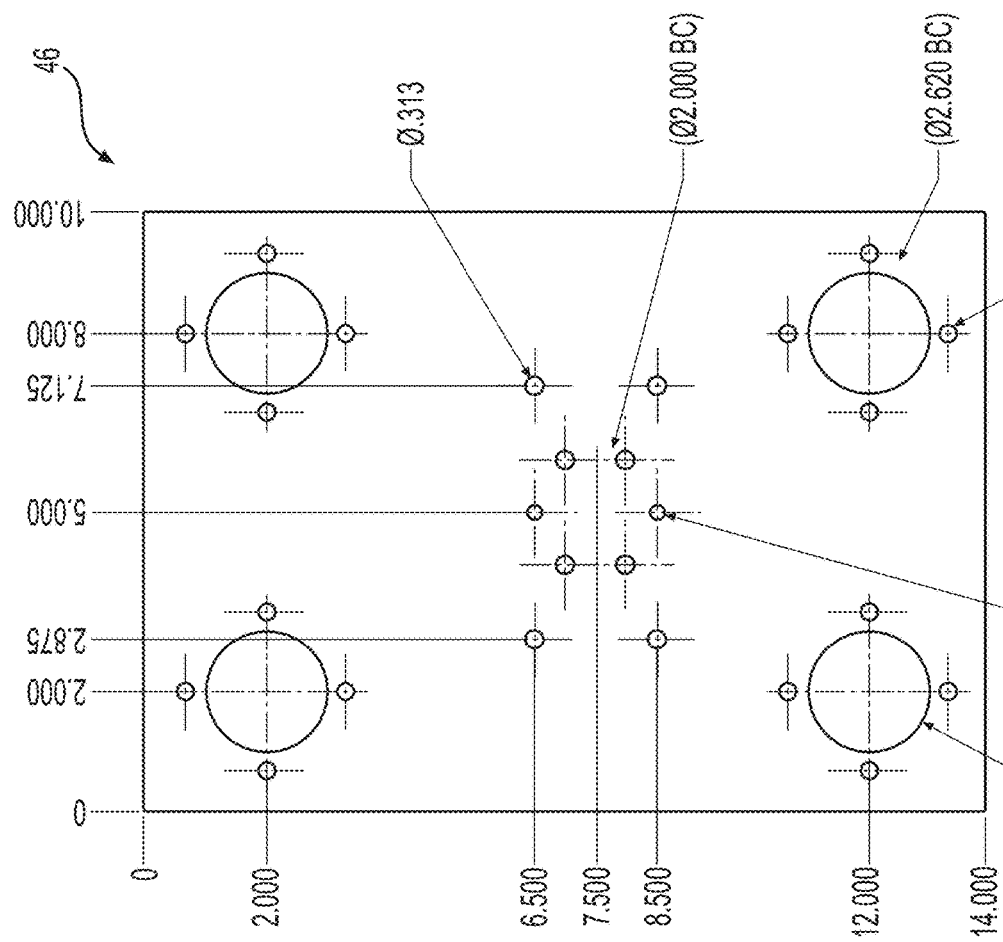
FIG. 12 is a top plan view of an upper die shoe 46 for use therewith.

As further shown in FIG. 2 according to the PRIOR ART, these individual major components each have a separate composition that, when segregated individually, can be easily reused or recycled in a manner that dramatically increases the ecological and economic efficiencies, as compared to existing methods of HOD destruction. By way of example these material types may include:

Upper cover made of stainless steel;

Lower Cover, also made of. stainless steel

Frame, or Housing, made of Aluminum

Actuator high-flux magnets made of neodymium-iron-boron (NeFeB, or NIB)

Actuator axis made of permalloy (80% nickel, 20% iron)

Platter assembly made of Aluminum

Spindle Motor and heads made of aluminum (with impurities, or

"ramp" that can include Si, Mg, Ni, Zn, Pb, Cr, Fe, Cu, V, and Mn); and

Printed Circuit Boards (PCBs) of various materials (including precious metals)

PCB's themselves are complex, multi-component integrated structures. However, when isolated by themselves, PCB's can be further separated and recycled into various materials by otherwise existing systems and methods. Table 1 below indicates generally the amount of waste from multilayer printed circuit board manufacturing process. While it is not the intention of the present invention to provide a process for such detailed deconstruction of the PCB assemblies themselves, the values and efficiencies that can be created by merely separating such PCB's in an isolated, automated manner and then subsequently processing them by any number of such methods is further improved and achieved in light of the present teachings.

TABLE 1

Amount of waste from multilayer printed circuit board manufacturing process

| Item | Waste | Characterization | kg/m² of PCB |
|---|---|---|---|
| 1 | Waste board | Hazardous | 0.01~0.3 kg/m² |
| 2 | Edge trim | Hazardous | 0.1~1.0 kg/m² |
| 3 | Hole drilling dust | Hazardous | 0.005~0.2 kg/m² |
| 4 | Copper powder | Non-hazardous | 0.001~0.01 kg/m² |
| 5 | Tin/lead dross | Hazardous | 0.01~0.05 kg/m² |
| 6 | Copper foil | Non-hazardous | 0.01~0.05 kg/m² |
| 7 | Alumina plate | Non-hazardous | 0.05~0.1 kg/m² |
| 8 | Film | Non-hazardous | 0.1~0.4 kg/m² |
| 9 | Drill backing board | Non-hazardous | 0.02~0.05 kg/m² |
| 10 | Paper (packaging) | Non-hazardous | 0.02~0.05 kg/m² |
| 11 | Wood | Non-hazardous | 0.02~0.05 kg/m² |
| 12 | Container | Non-hazardous | 0.02~0.05 kg/m² |
| 13 | Paper (processing) | Non-hazardous | — |
| 14 | Ink film | Non-hazardous | 0.02~0.1 kg/m² |
| 15 | Wastewater treatment slurry | Hazardous | 0.02~3.0 kg/m² |
| 16 | Garbage | Non-hazardous | 0.005~3.5 L/m² |
| 17 | Acidic etching solution | Hazardous | 1.5~3.5 L/m² |
| 18 | Basic etching solution | Hazardous | 1.8~3.2 L/m² |
| 19 | Rack stripping solution | Hazardous | 0.2~0.5 L/m² |
| 20 | Tin/lead stripping solution | Hazardous | 0.2~0.6 L/m² |
| 21 | Sweller solution | Hazardous | 0.05~0.1 L/m² |
| 22 | Flux solution | Hazardous | 0.05~0.1 L/m² |
| 23 | Microetching solution | Hazardous | 1.0~2.5 L/m² |
| 24 | PTH copper solution | Hazardous | 0.2~0.5 L/m² |

In light of the above objects and examples, an exemplary best mode for carrying out the present invention in terms of its preferred embodiment are herein described as particularly adapted for use in the decommissioning of, for example, data center data drives, and herein depicted within the FIG. 3 through FIG. 20. Detailed 1. Description of the Figures Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to FIG. 3 through FIG. 14, wherein like reference numerals indicate the same parts throughout the several views, a disassembly sheer 10 for use with a method and apparatus for secure disposal of electronic data drives 100 is provided. The disassembly sheer 10 has a lower plate 12 separated by an upper plate 14. The upper plate 14 is connected to an supported above the lower plate 12 by a plurality of guide posts 16. A receiving shoe 20 is positioned vertically to the lower plate 12 below a sheer die 22 supporting a sheer blade 23 and adjacent to a discharge orifice 24 formed within the lower plate 12. The sheer die 22 is positioned above the discharge orifice 24, and reciprocates linearly vertically as urged by a first linear actuator 30. While the first linear actuator 30 is shown and depicted herein as being a hydraulically driven cylinder, the selection of a hydraulically driven cylinder should be considered a design choice within the scope and function of the present invention, and it should be apparent to a person having ordinary skill in the relevant art, in light of the present teachings, that other types of linear actuators (i.e. electric, pneumatic, roller screw, cam, wheel and axle, or other variations and types) should be considered equivalent in nature and function.

The sheer die 22 is supported in a dependent manner from a sheer die plate 32 above the discharge orifice 24. As should be apparent in light of the teachings and disclosures herein, the receiving shoe 20 is configured and position as a first disassembly stage, generally noted as 40. The first disassembly stage 40 functions to separate the cover plate 101 from the frame 102, as described in greater detail below. A second disassembly stage 42 is covered and positioned adjacent to the first disassembly state 40. The second disassembly stage 42 functions to remove a spindle motor 104 by driving a sheer punch 44 through a spindle motor 104 of a data drive assembly that has been previously accessed by removing the cover plate 101 in the first disassembly stage 40. The sheer punch 44 is affixed in a vertically pendant position beneath an upper die shoe 46 that is driven by a second linear actuator 48. While the second linear actuator 48 is shown and depicted herein as being a hydraulically driven cylinder of a similar design as the first linear actuator 30, the selection of a hydraulically driven cylinder should be considered a design choice within the scope and function of the present invention, and it should be apparent to a person having ordinary skill in the relevant art, in light of the present teachings, that other types of linear actuators (i.e. electric, pneumatic, roller screw, cam, wheel and axle, or other variations and types) should be considered equivalent in nature and function.

2. Operation of the Preferred Embodiment

In operation for use with a method and apparatus for secure disposal of electronic data drives 100, a disassembly sheer 10 is provided in both a portable and an automated matter. It is felt that the manner of creating portability for use in the on-site destruction and segregation of materials, in light of the present invention, would be well within the skill of one knowledgeable in the art. As shown in conjunction with FIG. 15-17, photographs of a prototype of a disassembly sheer 10 is shown which incorporate the teachings of the present invention. A data drive 100 is positioned in a selected vertical position in the receiving shoe 20, and beneath the shear die 22 and above the discharge orifice 24. The first hydraulic cylinder 30 can then actuate in a first step, thereby driving the sheer die 22 downward and in which the supported sheer blade 23 will selectively remove the frame 102 from the upper cover 101. By breaking the connectors securing the cover 101 to the frame 102, both upper cover 101 and lower cover 103 become disconnected from the frame 102 and can dispensed through the discharge orifice 24 formed within the lower plate 12. The frame 102 can then be conveyed and rotated to a second stage where the remaining components of the data drive 100 is positioned in a selected horizontal position at a second disassembly stage 42 in order to remove a spindle motor 104 by driving a sheer punch 44 through a spindle motor 104 of a data drive assembly that has been previously accessed by removing the cover plate 101 in the first disassembly stage 40. The sheer punch 44 is driven by a second linear actuator 48, resulting in the removal of the spindle motor 104 from the platter assembly 105.

It is also felt that the manner of conveying an manipulating the material streams, as well as the segregation of the mechanically disassembled components, in light of the present invention, would be well within the skill of one knowledgeable in the art. It is further felt that the manner of automating the above described functions, in light of the present invention, would be well within the skill of one knowledgeable in the art.

Figure 16:
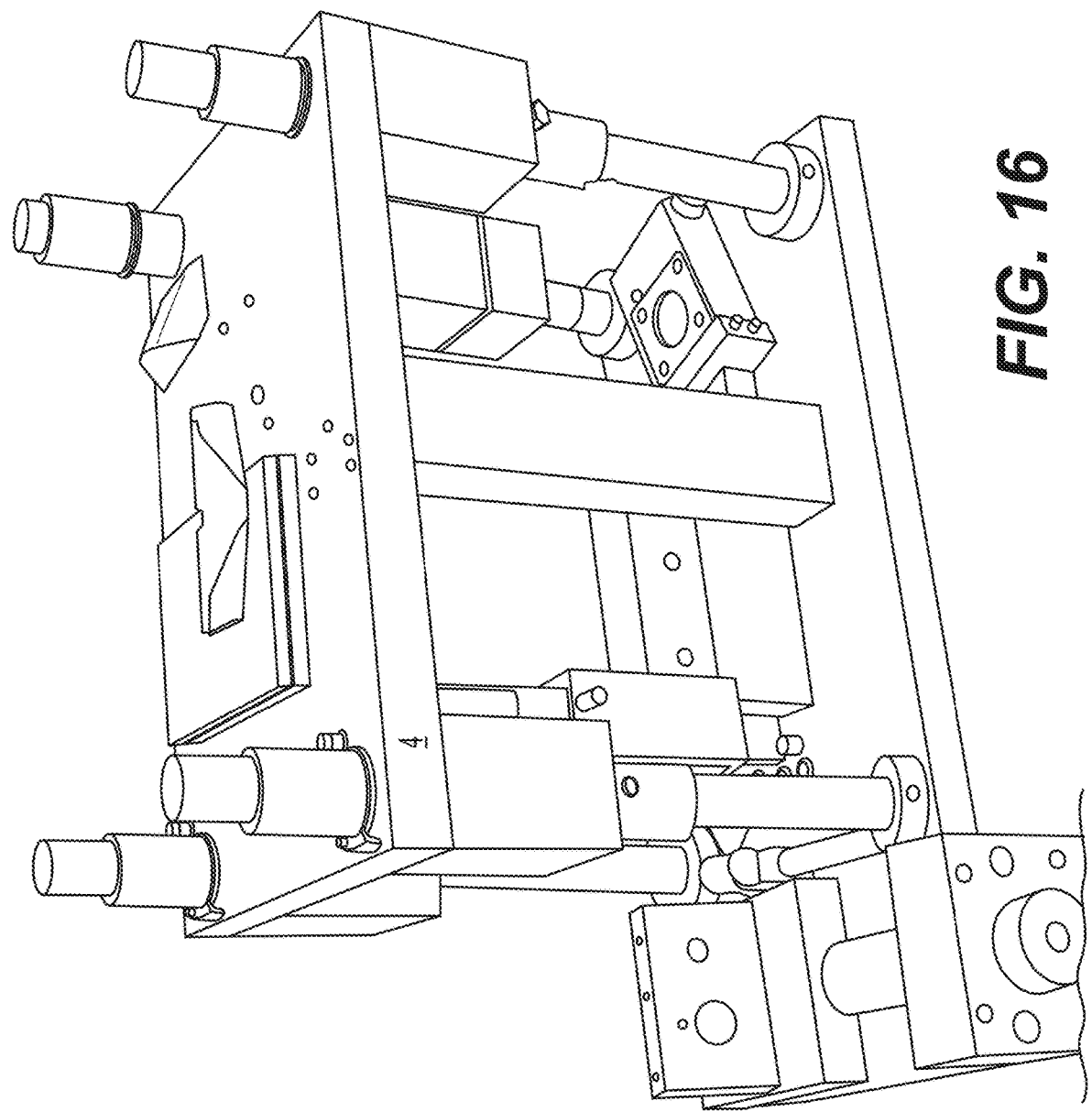
FIG. 16 is a photograph of a front view of a prototype of a disassembly sheer incorporating the teachings of the present invention.
Figure 17:
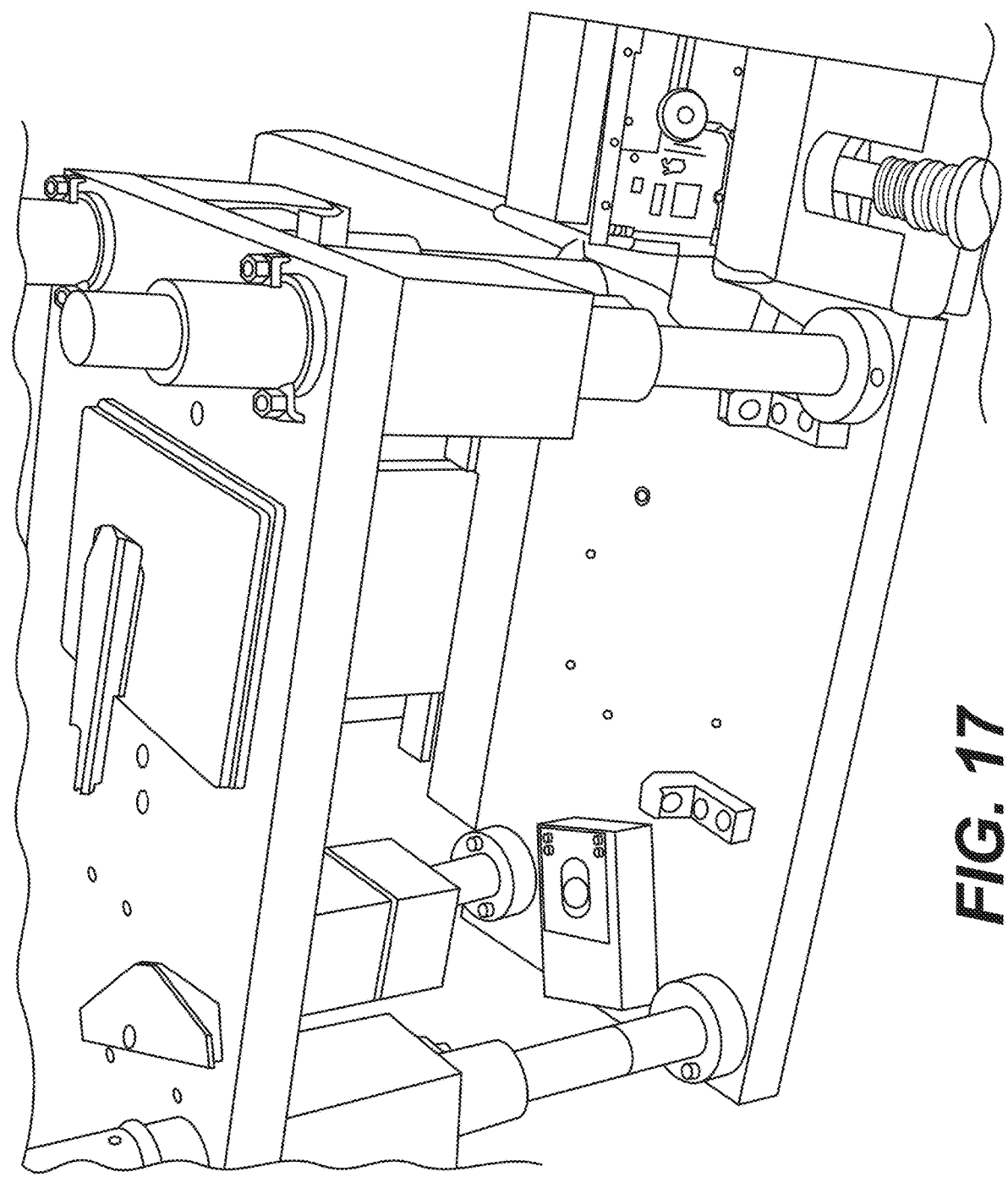
FIG. 17 is a photograph of a rear view of the prototype of FIG. 16.
Figure 18:
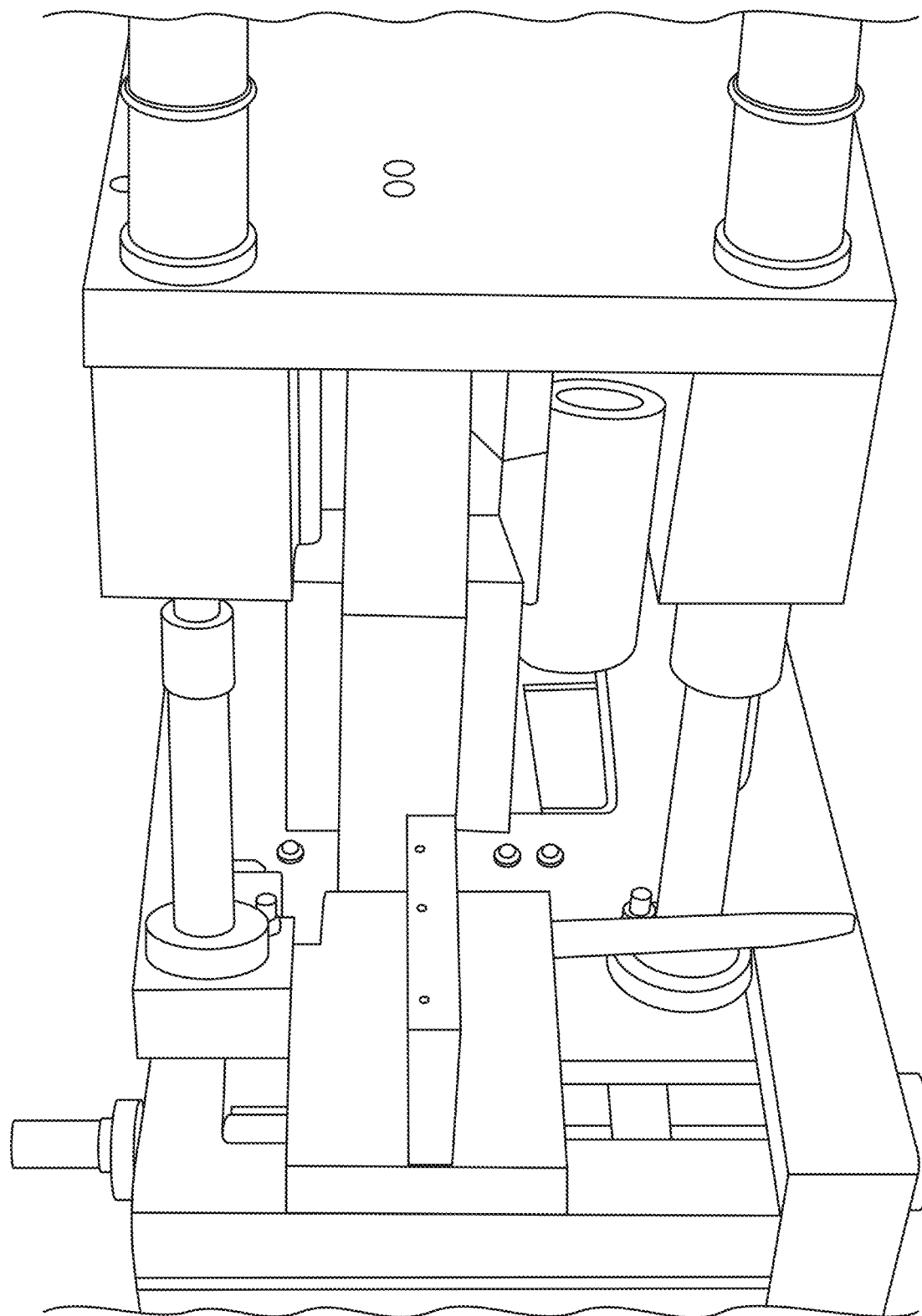
FIG. 18 is a photograph of a left side view of the prototype of FIG. 16.

As shown in conjunction with the photographs in FIG. 16-18, a combination in the operation of both the first disassembly stage 40 and second disassembly stage 42 may be combined into a single operational motion.

Figure 19:
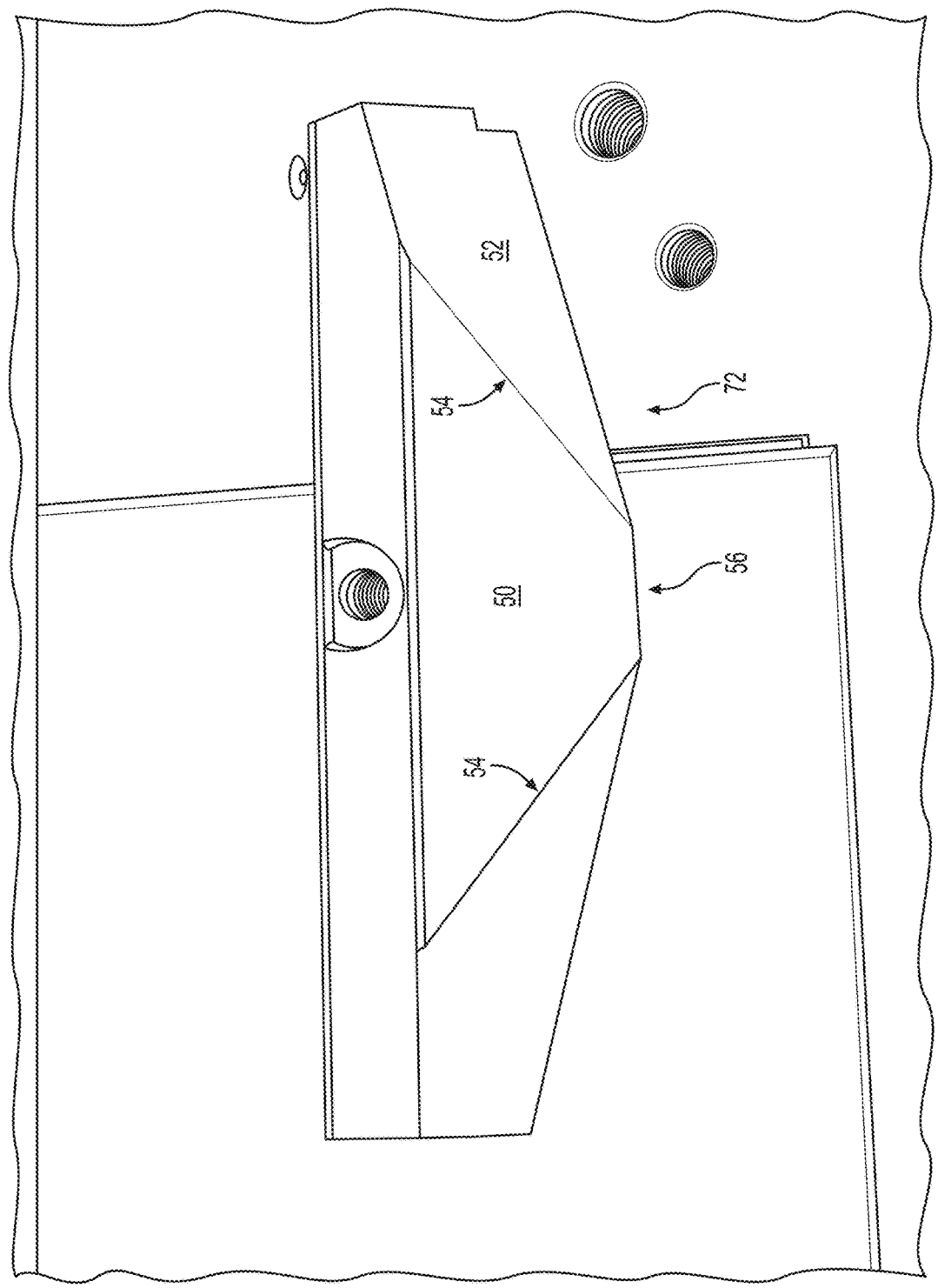
FIG. 19 is a photograph of a front view of a sheer blade 23 for use with the prototype of FIG. 16 through 18.
Figure 20:
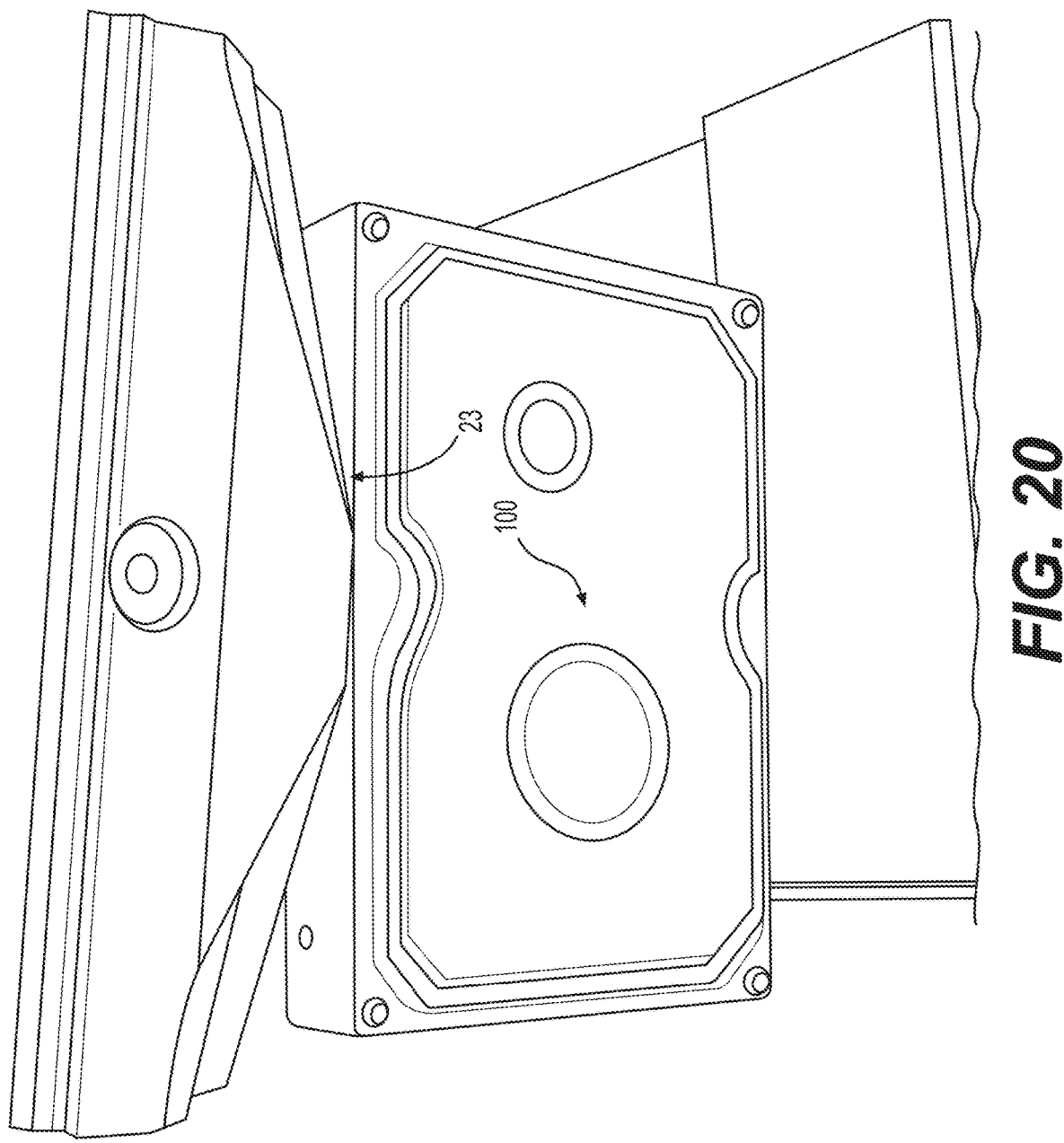
FIG. 20 is a photograph of the sheer blade 23 of FIG. 19 shown positioned at an engagement configuration with a HDD 100.

Referring now in greater detail to FIG. 19-20, the sheer blade 23 is shown in greater detail, and in position at an engagement configuration with a HOD 100. The blade 23 is flat along a rear surface (not shown), and have a faceted front face in which an angular central facet 50 is bounded by a pair of swept back faces 52 forming an urging fulcrum 54 along each seam. The base 56 of the central facet 50 is generally flat and is capable of engaging between the cover 101 and the frame 102 if the hard drive 100.

In operation, the data drive 100 is disassembled through strategically placed mechanical forces, with the component parts being disengaged from one another with limited die engagement steps.

Figure 21:
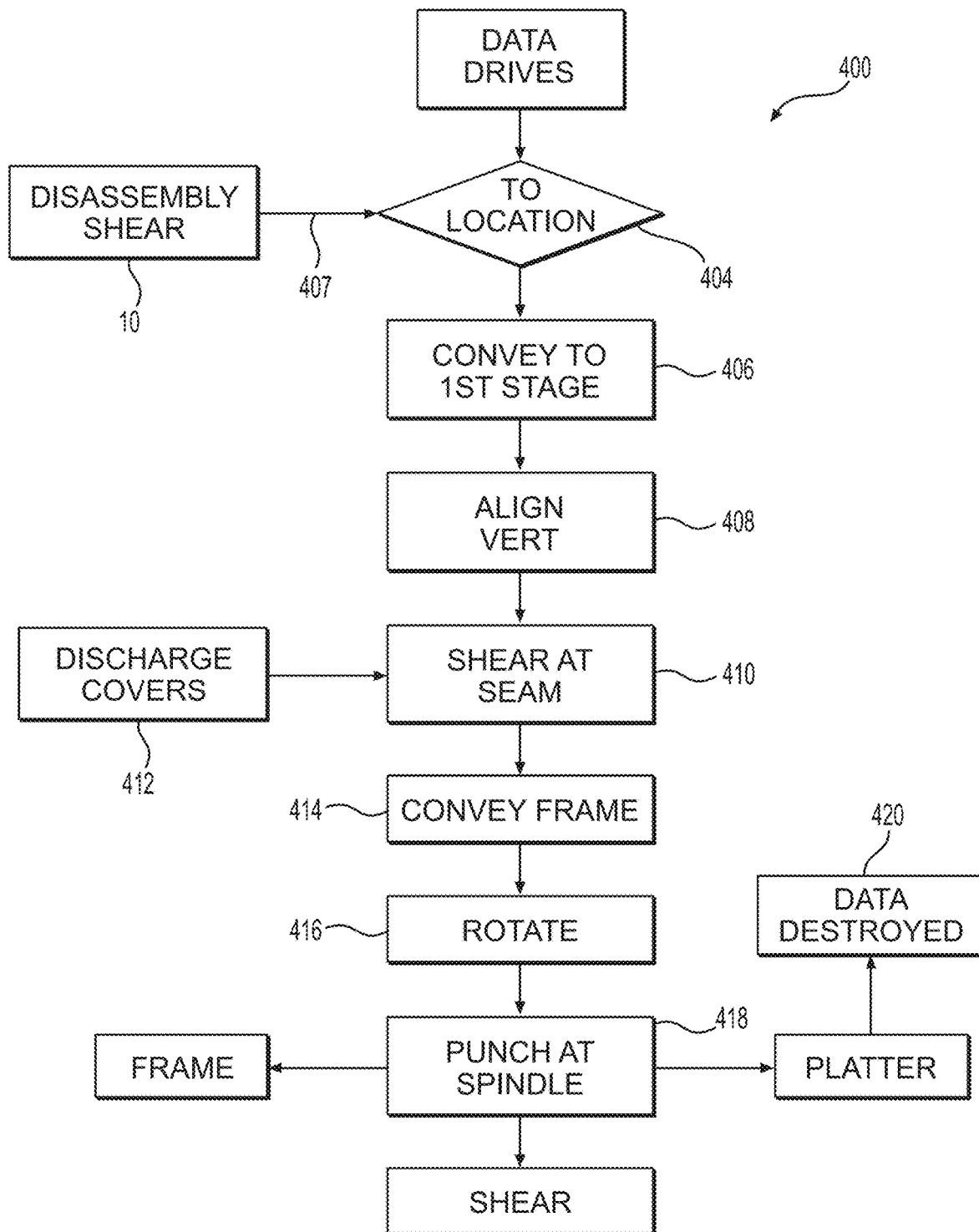
FIG. 21 provides a flow chart for an improved waste material recycling system for the targeted disassembly of data drive equipment for subsequent secured destruction of magnetic data and recycling of sorted materials streams according to the present invention.

The preferred method 400 for practicing the present invention is shown in the flow chart of FIG. 21. The disassembly shear 10 of the present invention is transported 402 to a location having access to hard drives for disassembly 404. The drives are conveyed to the first stage 406 where the drives 100 are aligned vertically 408 and sheared at the cover/frame seam 410. The covers 101 can be discharged, diverted and separated for recycling 412. The remaining frame 102 is conveyed 414 to the second disassembly stage where is it rotated 416. The spindle 104 can then be punched 418, causing separate of the frame, magnets, patters and other components. The platter can then be processed for additional data destruction 420. The remaining disassembled components can then be segregated from one another through other material separation techniques such as, for example, screening, vibration, and various other methods which, in light of the present invention, would be well within the skill of one knowledgeable in the art.

Further aspects of this disclosure are directed to a hard disk drive parts separation apparatus and a carousel feeder system that separates hard disk drives into parts at high throughput and that implements computer implemented security measures to prevent the data on the platters from being discovered.

Figure 22A:
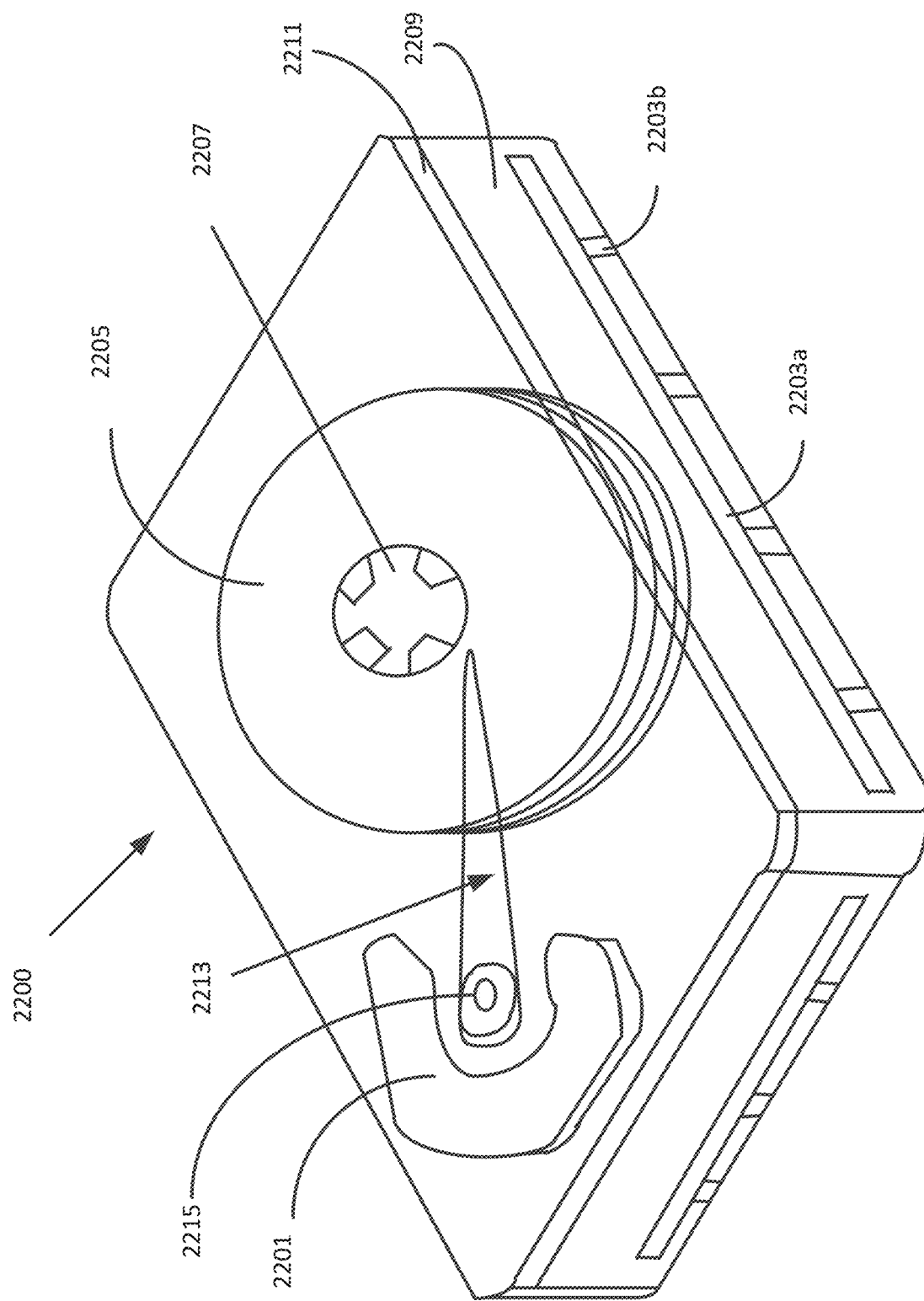
FIGS. 22A, 22B, 22C, 22D, 22E are diagrams of a typical hard disk drive and component parts.

FIG. 22A is a perspective diagram of a typical hard disk drive. A hard disk drive 2200 stores data on disk platters 2205, which are configured in sectors and tracks. Sectors may be grouped into clusters. During formatting the starting and ending points of each sector are written onto a platter. Files are stored as blocks of bytes. A disk drive stores files based on a file storage structure, such as a file allocation table.

Regarding FIG. 22A, a Hard Disk Drive (or HDD) 2200 may include a housing (also referred to as a case, casing, or frame) 2209, a lid (or cover) 2211 on a top of the hard disk drive 2200, and a logic board 2203a on a bottom side of the hard disk drive 2200. The logic board 2203a, also referred to as a circuit board or printed circuit board, includes a motor driver, SATA/ATA converter, controller, and a buffer. The controller controls exchange of data between the hard drive and the computer, controls the motor, and sends commands to the read/write heads. Firmware may be stored in a ROM and is the program that is executed by the controller. The logic board 2203a is supported and grounded by ribs 2203b set below the logic board.

A disk motor (spindle motor) has an external rotor (spindle) 2207 attached to the disk platters 2205. A head stack assembly 2213 is pivoted about a head stack bearing 2215. Opposite an actuator at the end of the head support arm is the read-write head. The actuator includes a permanent magnet and moving coil motor that swings the heads to the desired position. In particular, a metal plate supports a squat neodymium-iron-boron (NIB) high-flux magnet 2201. Beneath this plate is the moving coil, often referred to as the voice coil by analogy to the coil in loudspeakers, which is attached to the actuator hub, and beneath that is a second NIB magnet, mounted on the bottom plate of the motor (some drives have only one magnet).

Without the controller on logic board 2203a and the firmware associated with the controller, the data stored on disk platters 2205 cannot be retrieved, comprehended, or used. Also, separating disk platters 2205 from the disk drive renders the data on the disk platters 2205 undiscernible.

Figure 22B:
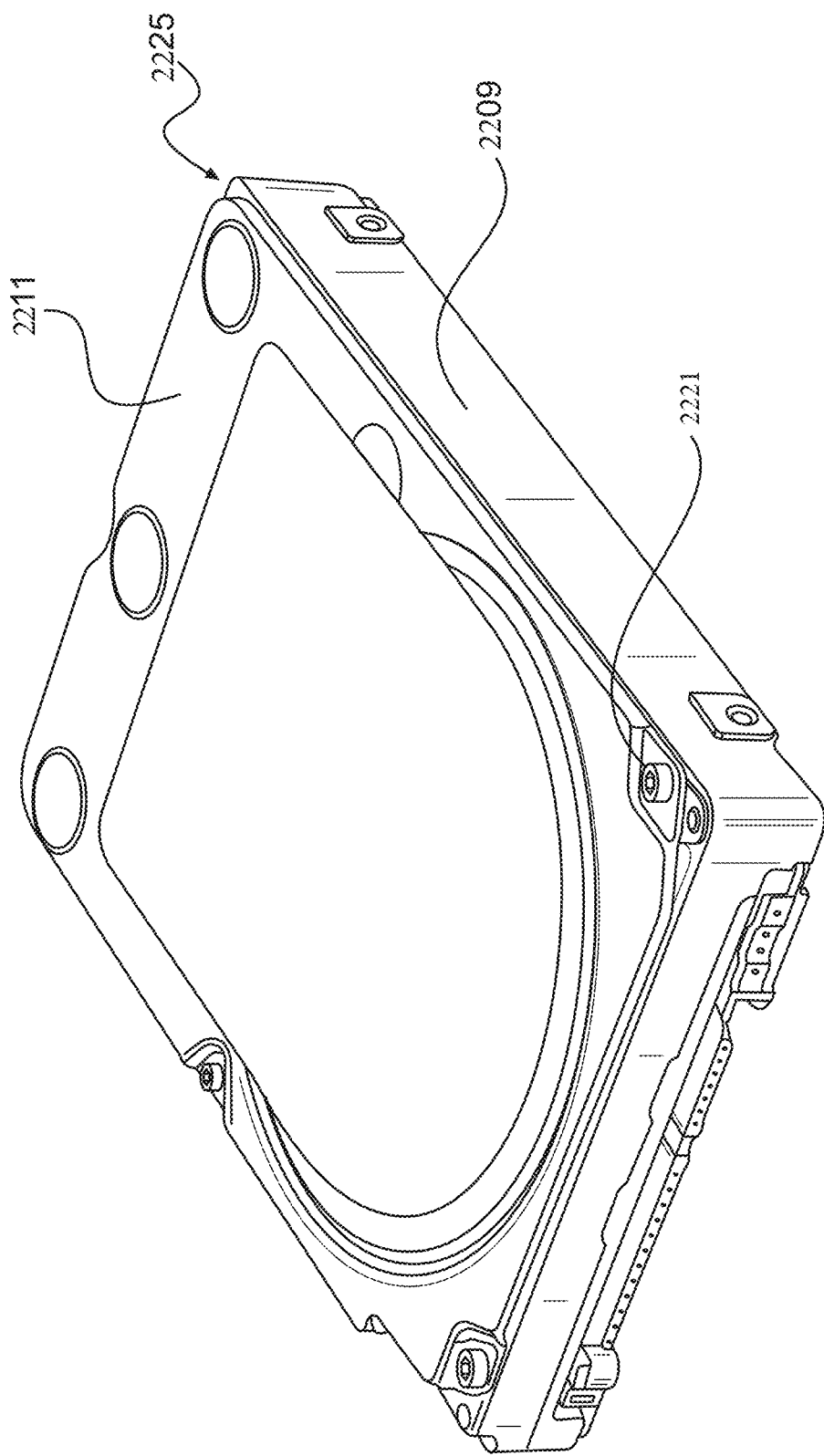
Figure 22C:
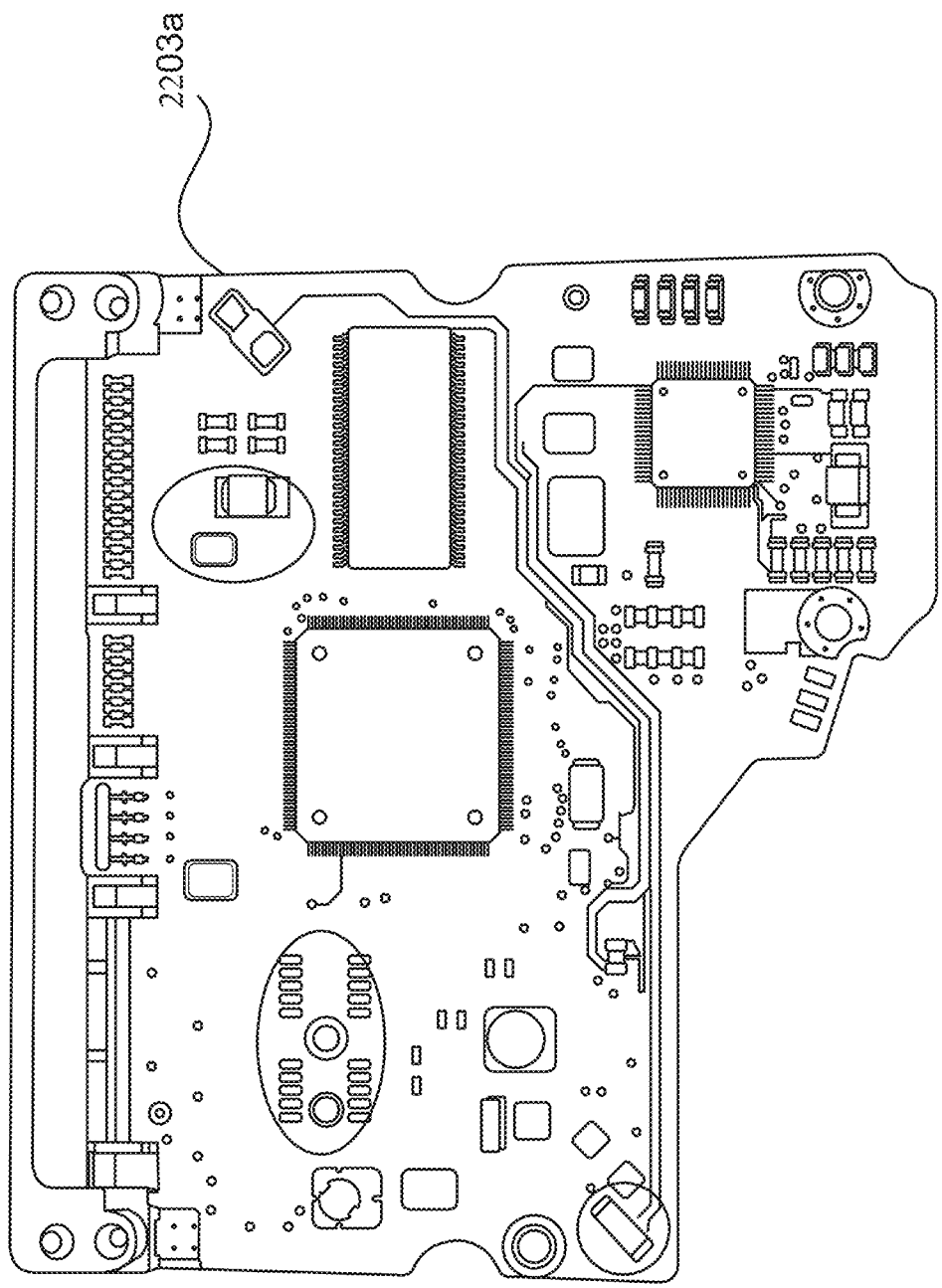
Figure 22D:
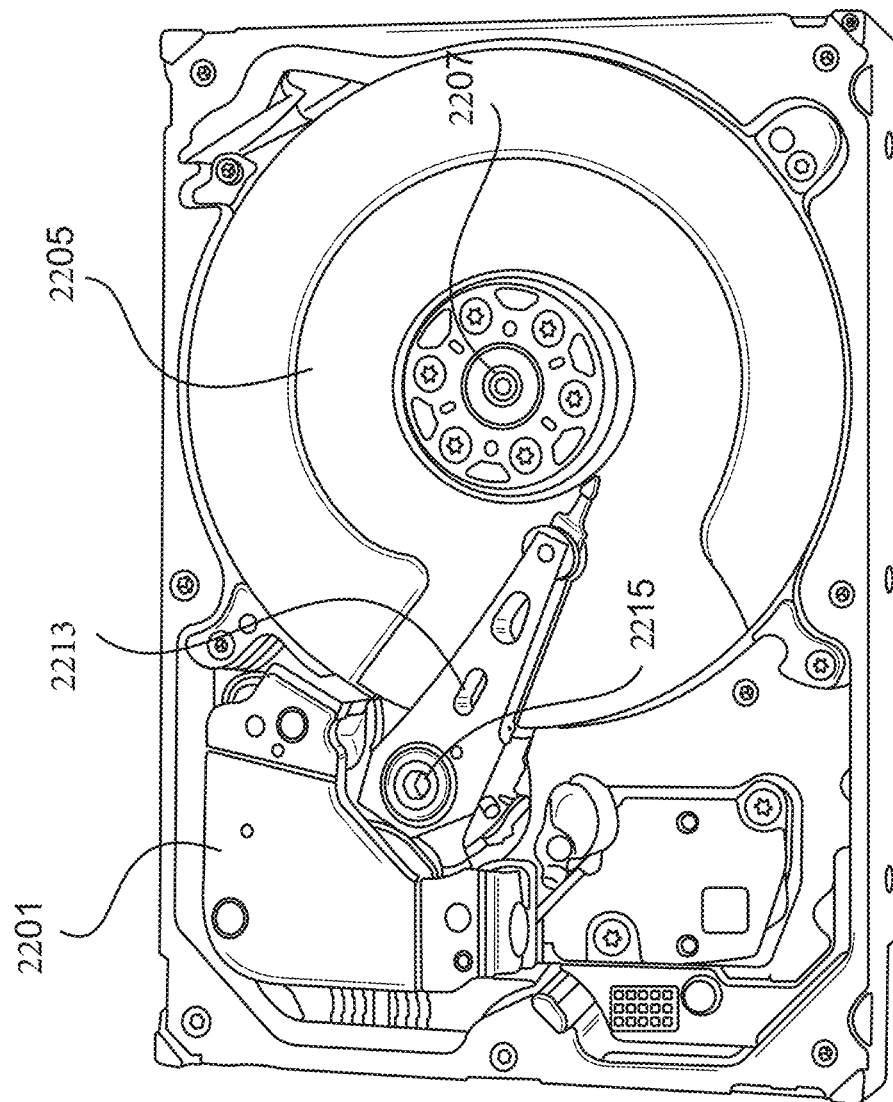
Figure 22E:
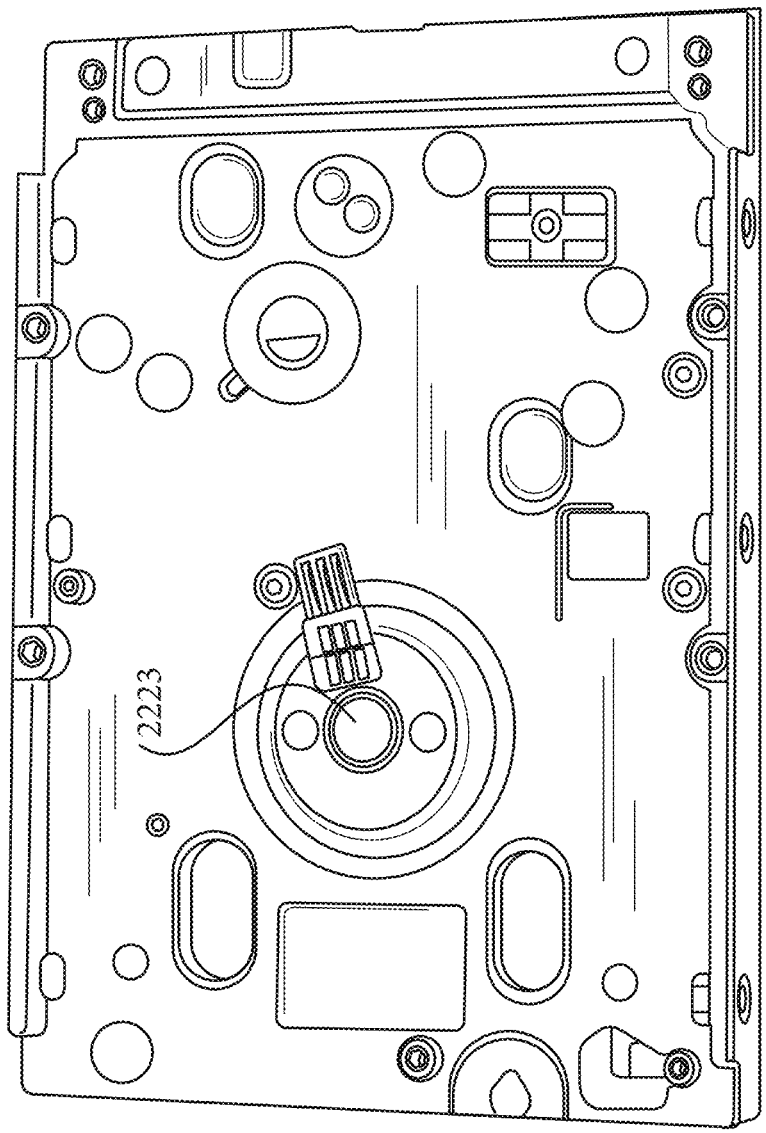

Materials of the various components of hard disk drives can be reclaimed and recycled. FIG. 22B is a perspective view of a hard disk drive having the lid (cover) attached. The lid 2211 is mounted to the housing 2209 by fasteners 2221, which may include screws or bolts. FIG. 22C is a view of the logic circuit board 2203a showing circuit components. FIG. 22D is a top view of the hard disk drive with the lid 2211 removed, exposing the top magnet 2201, top platter 2205, spindle 2207, top of the head stack assembly 2213 and bearing 2215. FIG. 22E is a view of the bottom of the hard disk drive with the logic circuit board 2203a removed. This view shows the location of the spindle motor 2223.

Figure 23:
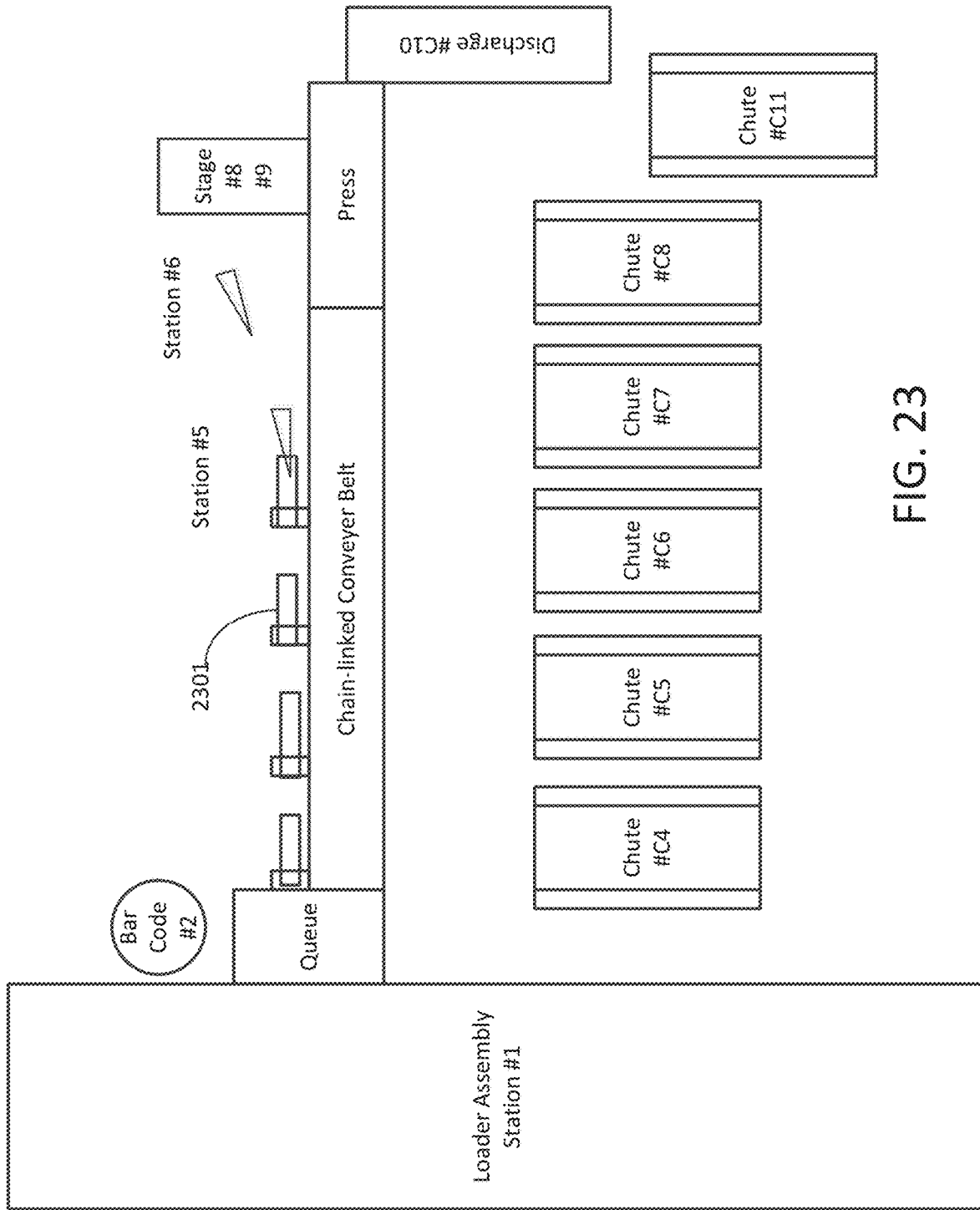
FIG. 23 is a diagram of stations for dismantling hard disk drives into parts in accordance with exemplary aspects of the disclosure.

FIG. 23 is a diagram of stations for dismantling hard disk drives into parts in accordance with exemplary aspects of the disclosure. In order to ensure securely dividing the hard drive into parts that may be recycled, an apparatus is provided that registers and tracks the hard drive that is to be dismantled and then separates the logic board from the hard disk drive and ensures security measures by tracking the remaining hard disk drive components through final dismantling. The apparatus also separates the remaining hard disk drive components, including punching out the spindle 2207 and spindle motor 2223. Punching out the spindle 2207 and spindle motor 2223 causes the hard disk platters 2205 to separate from the spindle and fall off as their individual component pieces.

The disclosed apparatus may be arranged as stations which may perform one or more functions associated with dismantling hard disk drives. The logic circuit is separated early on in order to render the disk platters from being utilized for recovery of discernable data. Remaining stations may be arranged in various orders of operation without departing from the scope of the present invention.

Station 1 includes a feeder for supplying a hard disk drive into the apparatus. In some embodiments, the feeder may include an infeed chute that drops a disk drive into the station. Although the apparatus is shown with a single path for handling hard disk dismantling, the apparatus is not limited as such. The apparatus may also be arranged as parallel paths for handling multiple hard disk drives simultaneously. Station 1 may include a sensor to detect the presence of a hard disk drive in the feeder. The sensor may be a laser sensor that detects presence or absence of the hard disk drive at a specific position. The apparatus includes a chain indexed conveyor belt. Upon chain index, the hard disk drive is clamped into a holder, such as a pusher bar assembly 2301.

Station 2 includes a scanner, such as a bar code reader, for reading information on the hard disk drive such as the serial number (S/N) and the manufacture number (M/N) of each hard disk drive. In some embodiments, the scanner reads the printed number or bar code of a hard disk drive as it is clamped into the pusher bar assembly 2301. A customer project database may be stored for a customer that includes serial numbers and manufacture numbers of the hard disk drives for the customer. The database may include serial numbers of hard disk drives that do not have confidential data and may not need to be dismantled. Information read from a hard disk drive being processed by the apparatus can be used to inform the operation of the apparatus as it pertains to the hard drive being processed. For example, certain hard drives may be ejected and saved before being dismantled by the apparatus.

In one embodiment, a laser driven mechanism may be used to detect and mark a groove or gap that is located at a position where the lid 2211 of the hard disk drive meets the housing 2209 of the hard disk drive. The marked position will be used in a later stage for aligning a blade to remove the lid 2211. In the embodiment, the laser driven mechanism may be a laser marker of Keyence Corp. The laser driven mechanism may mark a side of the hard disk drive by forming a profile of a portion of a side of the housing 2209 and the lid 2211 to detect the groove or gap located at the position where the lid meets the housing. The laser light is linear pattern that detects the elevation level of the housing, gap and lid along a plane intersecting at a direction that is perpendicular to a side of the housing. In an exemplary embodiment, the linear laser may detect a gap of 1/300,000 inch as the location of the groove or gap, at a rate of about 3 times per second.

In another embodiment, a gap 2225 between the lid 2211 and housing 2209 of the hard disk drive may be detected using a comb-like device having fine flexible comb fingers. The variance in amount of bending among the comb fingers can indicate the location of a gap.

A third station, Station 3, may be a section of the chain that is blank. The blank section may allow time for reading information from the customer database.

In Station 4, if the customer database indicates that the hard disk drive does not require dismantling, for example because it does not include confidential data, a controller may send a signal to an actuator, such as a pneumatic cylinder, to activate a drop panel for the disk drive to exit the machine through a chute C4.

Hard disk drives that are to be dismantled are firstly moved to Station 5 where the logic board 2203a is peeled from the bottom side of the casting and dropped thru chute C5 into a bin for holding logic boards. The apparatus may peel the logic board from the bottom side by applying a blade or a wedge. In some embodiments, the blade or wedge is made of steel, such as steel of type A2 to S7. In some embodiments, the wedge is a floating wedge, which may pivot about a pivot pin. The floating wedge may include a relief at its tip so that as a hard disk drive comes into contact with the wedge, the wedge floats into a position from below the casting and into a direction upwards to just above the logic board 2203a to force the logic board 2203a out of the lower area of the casting.

In order to simplify the removal of the disk platters from the remaining parts of the disk drive, the lid 2211 is removed. In some embodiments, the lid 2211 may be removed at the same station that peels the logic board. In other embodiments, the lid 2211 is removed in a station after removal of the logic board so that lid removal can be separately monitored. In Station 6, as the chain conveyor belt is indexing, a floating wedge or blade removes the lid 2211 from the top side of the hard disk drive casing 2209. In some embodiments, the floating wedge or blade is moved to a height that was determined using the laser. Provided the height of a gap/groove that had been detected by the laser, a signal is sent to a motor controller to move the wedge or blade to the detected height.

As with the wedge for removal of the logic board 2203a, the floating wedge or blade may be made of steel. The floating wedge or blade pivots about a pivot pin. The wedge or blade includes a slight hump proximate to the thick side that aids in shearing of screw heads off of the screws 2221, or other fasteners, that hold the lid 2211 to the housing 2209.

In the next index after removal, a sensor detects presence of the lid in order to determine if the lid has been fully separated. For example, the lid detection sensor may be a proximity sensor that detects presence or absence of the lid. If the lid has been separated, the lid is transported down chute C6 into a bin for holding lids.

In Station 7, if the proximity sensor detects that the lid has not been fully separated, hard disk drives that have failed lid removal are ejected thru a chute C7, for example, by way of a pneumatic cylinder. Hard disk drives in which the lids have not been fully removed and ejected thru chute C7 may be placed in a bin for holding partially dismantled hard disk drives. In some embodiments, partially dismantled disk drives may be reinserted in order to retry lid removal and completion of the dismantling process. In some embodiments, partially dismantled disk drives may alternatively passed through a shredder or grinder to destroy remaining parts or may have the lids removed by unscrewing screws holding the lid.

In some embodiments, a communications sensor, such as a near field communication (NFC) or Bluetooth low energy device (BLE), may be used to detect a security tag worn by a person, or other device for communicating the person's identify, clearance level, or authorization, in the vicinity of the apparatus to verify that they are authorized to approach the apparatus or authorized to be present during operation of the apparatus. In these embodiments, a person may be assigned a security level, and, for example, only persons at or above a particular security level may be authorized to come within a predefined distance from the apparatus. For example, persons identified as having a confidential clearance or above may have authorization to be within the vicinity of the apparatus. In some embodiments, persons may be identified by way of computer-based face recognition. In addition to a communication sensor, the apparatus may include a camera system that has sufficient resolution to detect the facial image of a person in the vicinity of the apparatus.

It is also possible for different persons or persons of different security levels to be authorized to perform different tasks on or in connection with the apparatus. For example, certain individuals may be permitted to perform limited operations with the apparatus, while others may be permitted to fully operate the apparatus. Also, certain individuals may be permitted to perform maintenance on and/or clean the apparatus, but they may not be permitted to operate the apparatus. Certain permissions, such as maintenance and/or cleaning, may be authorized to be performed only at times during which the apparatus is not operating, is off-line, and/or when no hard disk drives are present or in the vicinity of the apparatus.

When an unauthorized person or persons approaches within the vicinity of the apparatus, actions may be initiated, such as sounding an alarm, halting operation of the apparatus, and/or sending a warning message to a remote terminal. In other embodiments, one or a group of persons may be assigned authorization to operate the apparatus, so that only that person or group of persons may approach the vicinity of the apparatus. The authorization boundary for the apparatus may be based on the communication range of the communications sensor, or may be a predefined radius or distance that the communications sensor detects.

In Station 8 a motor knockout press punches the spindle 2207 and spindle motor 2223 out of the hard disk drive. The press may include a pin and ball screw driven by a servo motor. In some embodiments, the power of the servo motor is configured with a pressing force that is sufficient to punch the spindle 2207 and spindle motor 2223 out of the hard disk drive. In one embodiment, servo motor and ball screw are capable of pressing with up to approximately 20 or more tons of force. It has been determined that a high pressing force in pounds per square inch by reducing the diameter of the pin achieves the best results in effectively removing the spindle motor 2223. In a preferred embodiment, the diameter of the pin is about half of the diameter of the spindle 2207.

In some embodiments, a three platen die set may hold the motor knockout tool and an internal pivoting sub die set may be used to punch the reader head bearing. In one embodiment, a camera may focus on the head bearing and an identification of a center in an image of the head bearing may be used to move the head punch to a center position of the head piece. The camera helps to accommodate for variation in head placement. In a similar manner as with removal of the spindle motor 2223, the diameter of the die pin is about half of the diameter of the head bearing. With this diameter, a smaller motor that uses less energy may be used.

The motor and head bearings 2215 are dropped out thru chute C8 into a bin for holding the motors and bearings 2215.

Magnets in hard disk drives may vary in the way they are attached. In some cases, magnets are attached by screws. In other cases, magnets may be attached to a plate. In Station 9 the magnet may be separated in a manner that accounts for any way that the magnet may be attached in the hard disk drive. The magnet may be removed without moving the disk drive apparatus from the position at station 8. The magnet may be detached from the hard disk drive by lowering a bar to hold the hard disk drive in place and pushing two punch pins from underneath by a powered press that snap the magnet loose. A laser sensor may be included to check whether a magnet is stuck inside the press die and not properly removed.

In Station 10, as the chain conveyor indexes, internal items inside the remaining disk drive are loose and fall out into chute C10.

In Station 11, at the final index of the chain, the casting is removed from the pusher bar assembly using mounting cams and drops into chute C11. A laser sensor may be used to check that the casting has been removed from the conveyor by checking the presence or absence of the casting at a particular position.

The casting has the serial number and manufacture numbers and associated bar codes posted on an outside surface. In some embodiments, as the casting moves to the mounting cams, the hard disk drive is verified for completion of dismantling, for example by the bar code reader that may again read the bar code to verify and track the serial number of the hard disk drive that has been dismantled.

A queue area may be used to hold hard disk drives that are waiting to be fed to the dismantling apparatus. The queue area may be located at an entrance to a feeder chute. In one embodiment, the queue area holds 15 hard disk drives.

A loader assembly may be used to automate the feeding of hard disk drives into the queue area. The loader assembly may include a feeder arm assembly having a stepper motor driven ended belt actuator. The actuator indexes a hard disk drive thickness per every index of the motor. The indexing may be monitored by a sensor, such as a proximity sensor that checks for over travel. A pusher dog may traverse a belt to push each disk drive into the queue. Upon pushing a last disk drive into the queue, the pusher dog will traverse to a home position to start a new feed cycle.

Figure 24:
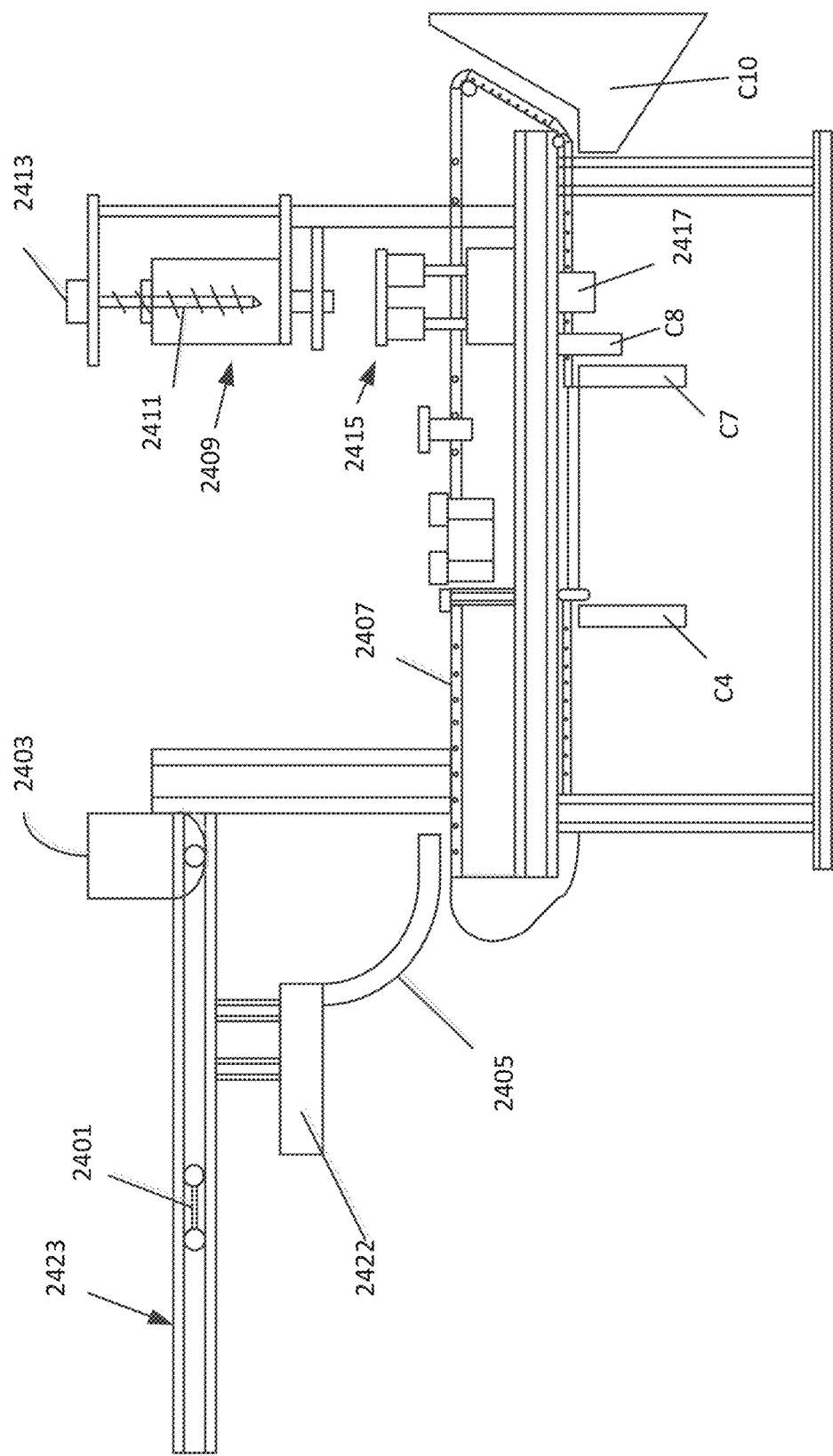
FIG. 24 is a schematic diagram of a side view of an exemplary apparatus for dismantling hard disk drives into parts in accordance with exemplary aspects of the disclosure.
Figure 25:
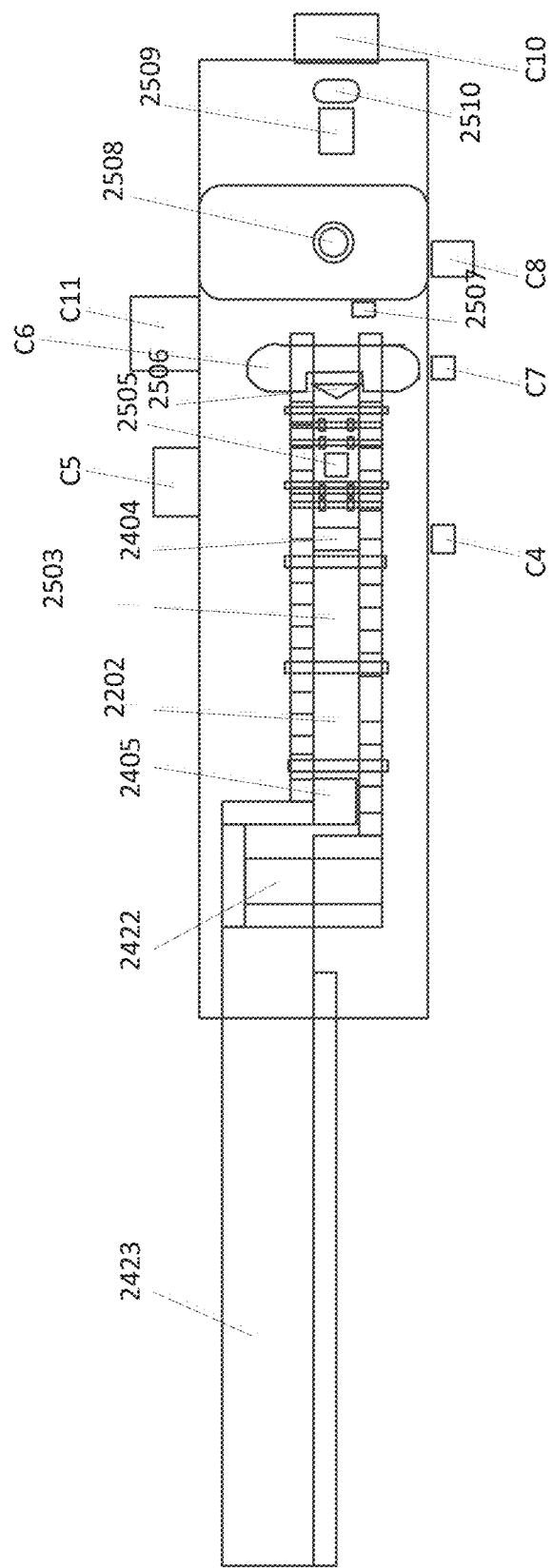
FIG. 25 is a schematic diagram of a top view of an exemplary apparatus for dismantling hard disk drives into parts in accordance with exemplary aspects of the disclosure.

FIG. 24 is a schematic diagram of a side view of an exemplary apparatus for dismantling hard disk drives into parts in accordance with exemplary aspects of the disclosure. FIG. 25 is a schematic diagram of a top view of an exemplary apparatus for dismantling hard disk drives into parts in accordance with exemplary aspects of the disclosure. The apparatus may be constructed of aluminum frame for ease of maneuverability in a mobile environment, such as a truck. The apparatus may also include wheels or tracks to facilitate mobility of the apparatus. Feed arm assembly 2423 feeds hard disk drives into a queue area by way of a pusher dog 2401. The feed arm assembly 2423 may be an aluminum beam housing a stepper motor belt actuator 2403 that indexes a hard disk drive thickness using a sensor, such as a proximity sensor. The pusher dog 2401 traverses along the feeder arm assembly by a belt driven by the belt actuator 2403.

A queue area 2422 positioned below the feed arm assembly holds hard disk drives waiting to be loaded onto the disk drive infeed of the dismantling assembly. In one embodiment, the queue area 2422 holds a maximum of 15 hard disk drives. The disk drives may be fed from the queue by an infeed chute 2405.

A chain conveyor belt 2407 indexes thru stations and provides an adequate torque for the lid and logic circuit board removal. The conveyor belt 2407 includes an unclamping mechanism for later unclamping the casting. In some embodiments, the conveyor belt 2407 is driven by a servo motor at 9 inch index increments at a rate of about 1.5 seconds per index.

The conveyor belt 2407 indexes as a hard disk drive is dropped into a pusher bar assembly 2201. Upon being dropped, a bar code reader 2202 reads the serial number and manufacture number and compares to a customer database. The conveyor belt 2407 may include one or more blank slots 2503 to incorporate a delay for reading from the customer database.

Any hard disk drives that are determined not to be dismantled will be dropped by a drop table 2404 and exit through a chute C4. The drop table may be operated by a pneumatic cylinder. The conveyor belt 2407 continues to index to bring a hard disk drive into a peeling blade or wedge 2505 that separates the logic board from the bottom side of the casting at which point the logic circuit board is dropped thru a chute C5.

The conveyor belt 2407 is again indexed to bring a hard disk drive into a station for lid removal from a top side of the hard disk casting. As the conveyor 2407 is indexed, a floating blade or wedge 2506 removes the lid 2211. As mentioned above, the blade or wedge 2506 has a profile that enables the lid 2211 to shear the heads off of screws 2221, or other fasteners, that hold the lid 2211 to the housing 2209. In an exemplary embodiment, the profile of the blade or wedge 2506 includes a hump that will force the lid 2211 to abruptly bellow and place a shear force just below the screw head that is sufficient to cut the screw at the screw head.

The blade or wedge 2506 is floating such that it pivots about a pin. The blade or wedge 2506 may be adjusted in a vertical direction by a stepper motor. In some embodiments, a height adjustment sensor may be used to detect the position of the gap 2225 between the lid 2211 and the housing 2209 of the hard disk drive. The stepper motor may adjust the blade or wedge 2506 in conjunction with the height of the gap 2225 as detected by the height adjustment sensor.

As the conveyor belt 2407 indexes out of the lid removal station, a proximity sensor detects lid presence. The removed lid is transported down chute C6. However, if the proximity sensor detects that the lid has not been removed, the hard disk drive having the lid is ejected at 2507 through a chute C7 by a pneumatic cylinder.

The conveyor belt 2407 indexes a hard disk drive that is without a lid into a press station 2409. The press station 2409 includes a servo motor 2413 connected to a large ball screw 2411. In one embodiment, the ball screw is capable of applying up to approximately 20 or more tons of force. A three platen die set 2415 has a spindle motor 2223 knockout tooling and an internal pivoting sub die set 2508 mounted thereon for reader head bearing 2215 removal. The punched out motor 2223 and bearings 2215 drop out thru chute C8.

Head stack placement may vary among hard disk drives. It is preferable to automatically align a punch tool with the head bearing to accommodate for the variations in head placement. In some embodiments, a camera may be used to focus on the location of the head bearing 2215. The camera may focus on the center of the bearing. The image taken by the camera may be used to adjust the position of the punch tool by positioning motors in a horizontal X-Y plane.

A magnet in the hard disk drive may be separated for purposes of recovering materials that make up the magnet, which includes rare earth minerals. The magnet may be separated from the hard disk drive by lowering a bar to hold the hard disk drive in place and raising a pair of punches that punch from underneath by a powered butt station press 2509 to snap the magnet loose. The butt station press may include a part presence sensor, such as a laser sensor, that ensures that a part of the magnet did not get stuck inside the die.

Remaining internal components of a hard disk drive will be loose and may fall out as the conveyor belt 2407 indexes to position 2510 over a chute C10.

The conveyor belt 2407 includes a declamping mechanism 2417 to unclamp the casting from the pusher bar assembly 2301 in order for the casting to drop into a chute C11. The declamping mechanism may be mounting cams that force the casting out of the pusher bar assembly.

FIG. 26 is a diagram of a hard disk drive pusher bar assembly. Pusher bar assemblies 2301 are mounted to the chain conveyor belt 2407 in accordance with servo motor index spacing. The pusher bar assembly 2301 is a horseshoe shaped component having an inner spacing W between side walls 2605 that is wider than a width of a hard disk drive. In some embodiments, the distance between side walls is adjustable. In order to securely hold a hard disk drive, a pair of inner walls 2603 may be mounted to side walls 2605. The inner walls 2603 may be made of a hard rubber material that has a long life, but allows a hard disk drive to be clamped into the space between the side walls 2605.

Figure 27A:
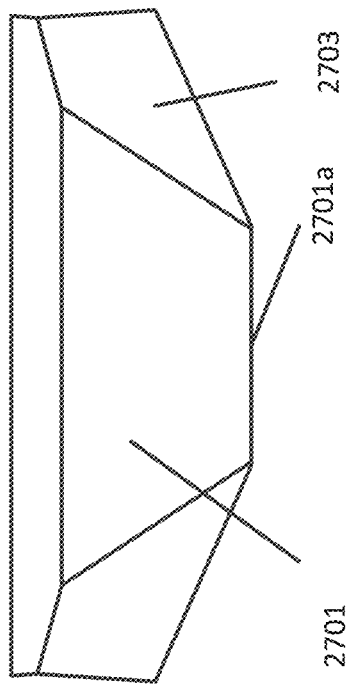
FIGS. 27A, 27B and 27C illustrate a wedge for separating the lid from the housing in accordance with an exemplary aspect of the disclosure.
Figure 27B:
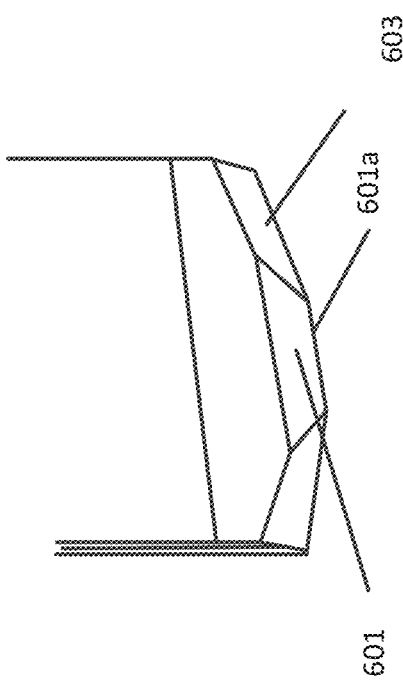
Figure 27C:
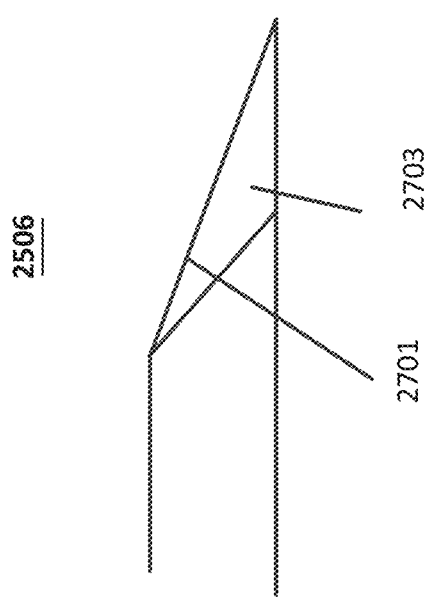

FIGS. 27A, 27B and 27C illustrate an exemplary wedge for separating the lid from the housing in accordance with an exemplary aspect of the disclosure. FIG. 27A is a side profile of the wedge. FIG. 27B is a view from a front of the wedge. FIG. 27C is a perspective view of the wedge. It has been determined that forcing a blade between the lid 2211 and the housing 2209 and simply cut the fasteners 2221 with the blade was found to be unreliable. In testing various blade types, many of various types of hard disk drives failed to be cut to separate the lid 2211 from the housing 2209. Instead, it was determined that the head of the fastener 2221, such as a screw or bolt, may more easily be sheared off by bending the center of the lid which causes a shearing effect on the fasteners 2221. In particular, since in most hard disk drives, the lids are of a harder material than the screws, bending the center of the lid causes a cutting or shearing effect on the screws.

The wedge profile as shown in FIG. 27A includes a beveled edge 2701 on an upper surface of the wedge 2506. The beveled edge may include a sharp cutting edge capable of entering the gap 2225 between the lid 2211 and the housing 2209. To ensure that the edge of the wedge 6 does enter the gap 2225, the wedge 6 may be configured to float about an insertion point. The insertion point may include an adjustment rod sheave for incremental adjustment of wedge insertion angle. The wedge 2506 may further include tapered beveled sides 603, similar to a bevel edged chisel. It has been determined that a straight forward edge blade resulted in variation of deflection over the width of the blade. It has been determined that by reducing the width of the exposed forward blade edge, the deflection force at the center of the lid 2211 substantially increased. In some embodiments, the leading forward edge 2701a is about one third of the width of the wedge 6. In turn, the width of the wedge 2506 is at least the width of a hard disk drive.

The application of a wedge 2506 having tapered beveled sides 2703 to bend the center of the lid 2211 in order to cause a shear action on the fasteners 2221 was determined to effectively separate the lid 2211 from the housing 2209 on several hundred different types of hard disk drives. In addition, the wedge 2506 is preferably made of S7 steal for its shock resistance. The hard wedge of S7 steal was determined to be sufficient to divide the two softer materials of the lid 2211 and housing 2209, then bend the lid 2211.

Figure 28B:
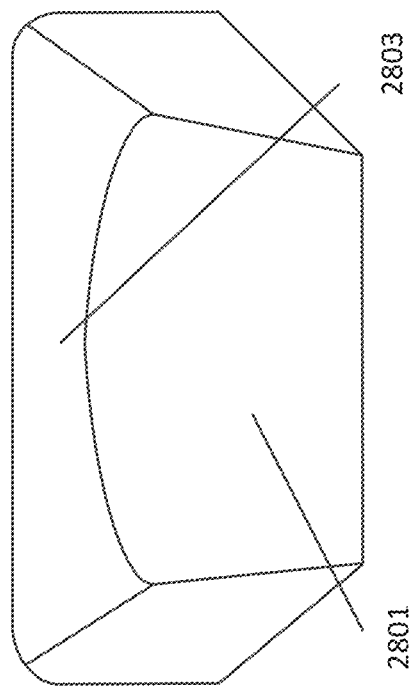
FIGS. 28A and 28B show a possible variation of the blade or wedge of FIGS. 27A, 27B, 27C.
Figure 28A:
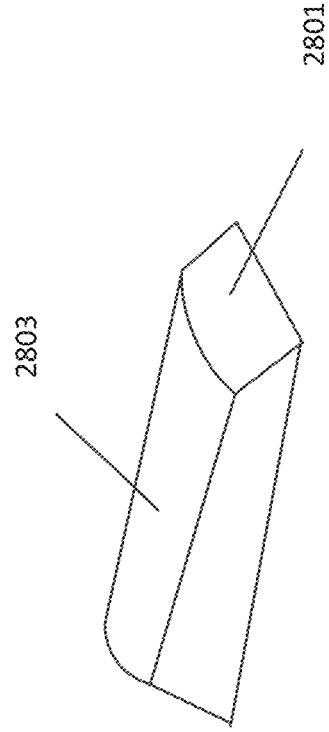

The disclosure is not limited to the blade or wedge of FIGS. 27A, 27B, 27C. Other approaches to bending the lid 2211 and shearing the fastener 2221, such as a screw or bolt, may be used without departing from the scope of the disclosure. FIGS. 28A and 28B show a possible variation of the blade or wedge of FIGS. 27A, 27B, 27C. FIG. 28A is a perspective view of the blade or wedge. FIG. 28B is a front view of the blade or wedge. Instead of tapered beveled sides 2503, the upper surface 2603 of the wedge 6 may be curved or angled when viewed from the front as in FIG. 28B. Also, the upper curved surface 2803 of the wedge 2506 may be angled gradually upward toward the rear of the wedge 2506. The height of the beveled edge 2801 may be made small in order to enter the gap 2225 between the lid 2211 and the housing 2209, and just begin to bend and apply a separating force. The upper curved surface of the wedge 2506 may perform a majority of the function bending the center of the lid 2211 to separate the lid 2211 from the housing 2209.

Figure 29A:
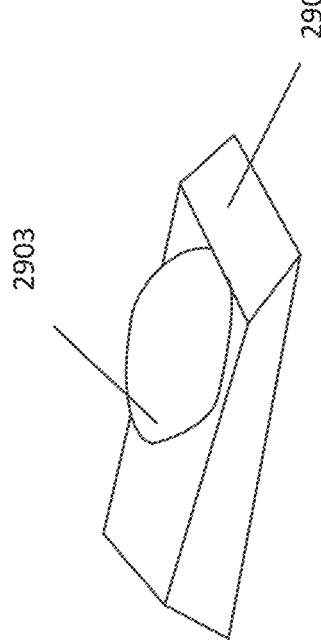
FIGS. 29A and 29B show a possible variation of a blade or wedge for separating the lid from the housing by snapping off the screw heads.
Figure 29B:
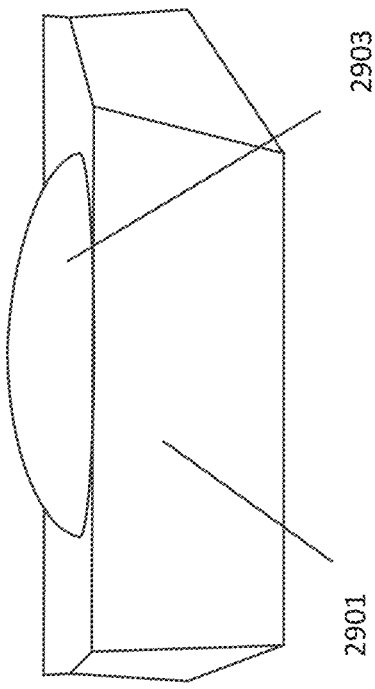

FIGS. 29A and 29B show still another variation of a blade or wedge for separating the lid from the housing by snapping off the screw heads. FIG. 29A is a perspective view of the blade or wedge. FIG. 29B is a front view of the blade or wedge. Instead of the upper curved surface as in FIGS. 28A, 28B, a rounded cap may be mounted to the upper surface of the wedge 2506. With this configuration, as the lid 2211 moves up the side of the rounded cap 2903 it will bend at its center and cause the fastener 2221 to be sheared. A force exerted on the lid 2211 as it travels over the cap 2903 will cause the fasteners 2221 to shear and the lid 2211 to separate from the housing 2209. The height and extent of the rounded cap should be sufficient to shear the fastener 2221 after the wedge 6 has been inserted into the gap 2225.

Figure 30:
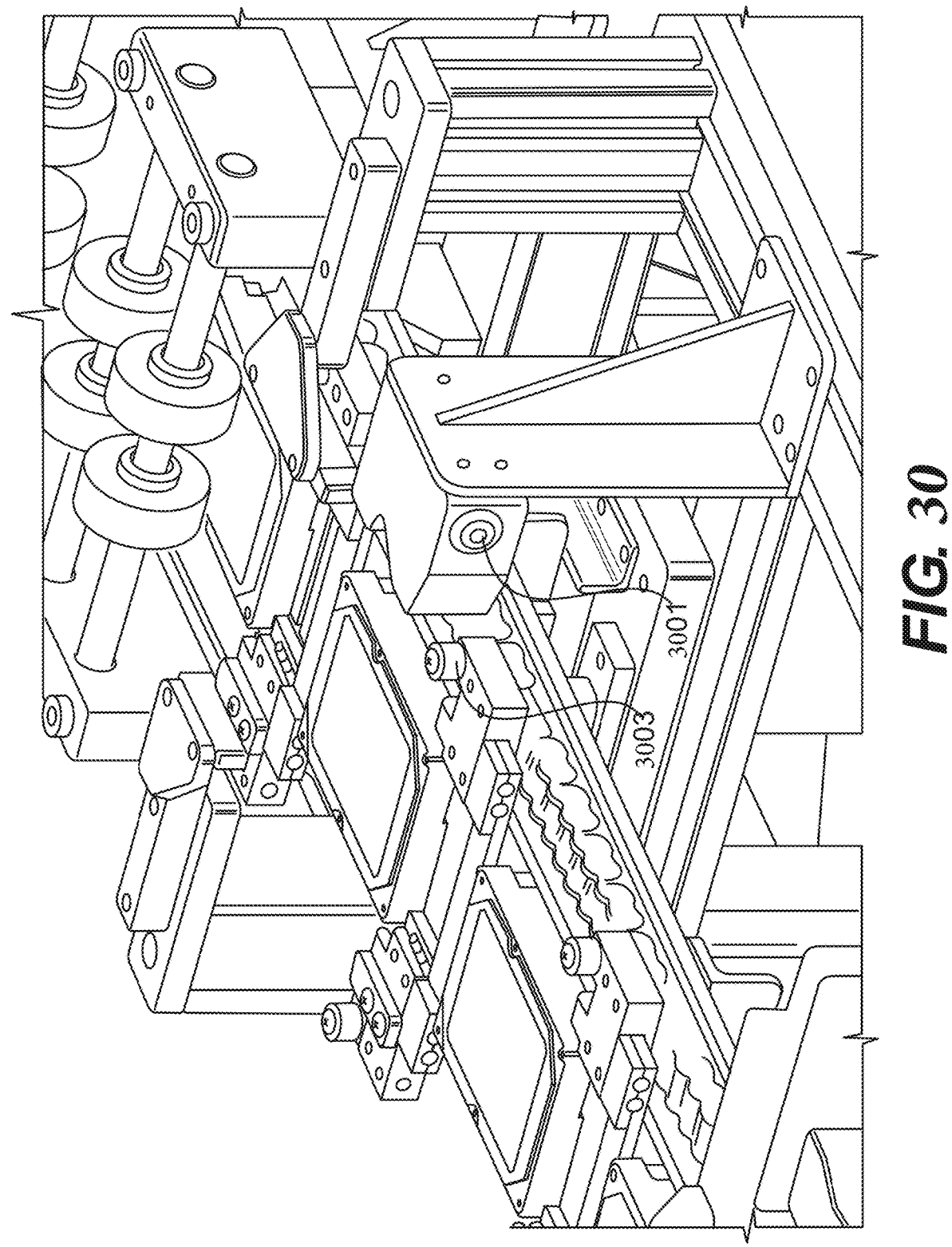
FIG. 30 is a perspective of a section of the dismantling apparatus having a laser guiding device in accordance with an exemplary aspect of the disclosure.

A position adjustment sensor may be a sensor that is capable of detecting the position of the gap 2225. In some embodiments, the position adjustment sensor may be a comb-like sensor that is configured to detect differences in amount of bend in comb fingers. Fingers that bend relatively more are considered as being outside of the gap 2225. One or more fingers that bend less may be considered as entering into the gap, thereby detecting the location of the gap 2225. The detected position information may be fed to a stepper motor to adjust the position of the wedge 2506. Another type of position adjustment sensor may be a laser profile measurement device. FIG. 30 is a perspective of a section of the dismantling apparatus having a laser guiding device in accordance with an exemplary aspect of the disclosure. The laser guiding device 3001 may flash a laser beam 3003 to measure the profile of a portion of a side of the hard disk drive. Information of the location of a gap/groove 2225 as detected from the profile is fed to a stepper motor to control the position of the wedge 2506. The laser guiding device 3001 may be mounted at about Station 2.

In addition to the position adjustment sensor, the wedge 2506 may be mounted to a spring so that the wedge may compensate for variation in the location of the gap/groove 2225. Upon impact, the spring may depress enough to allow the leading edge of the wedge to find the point of least resistance.

Figure 31:
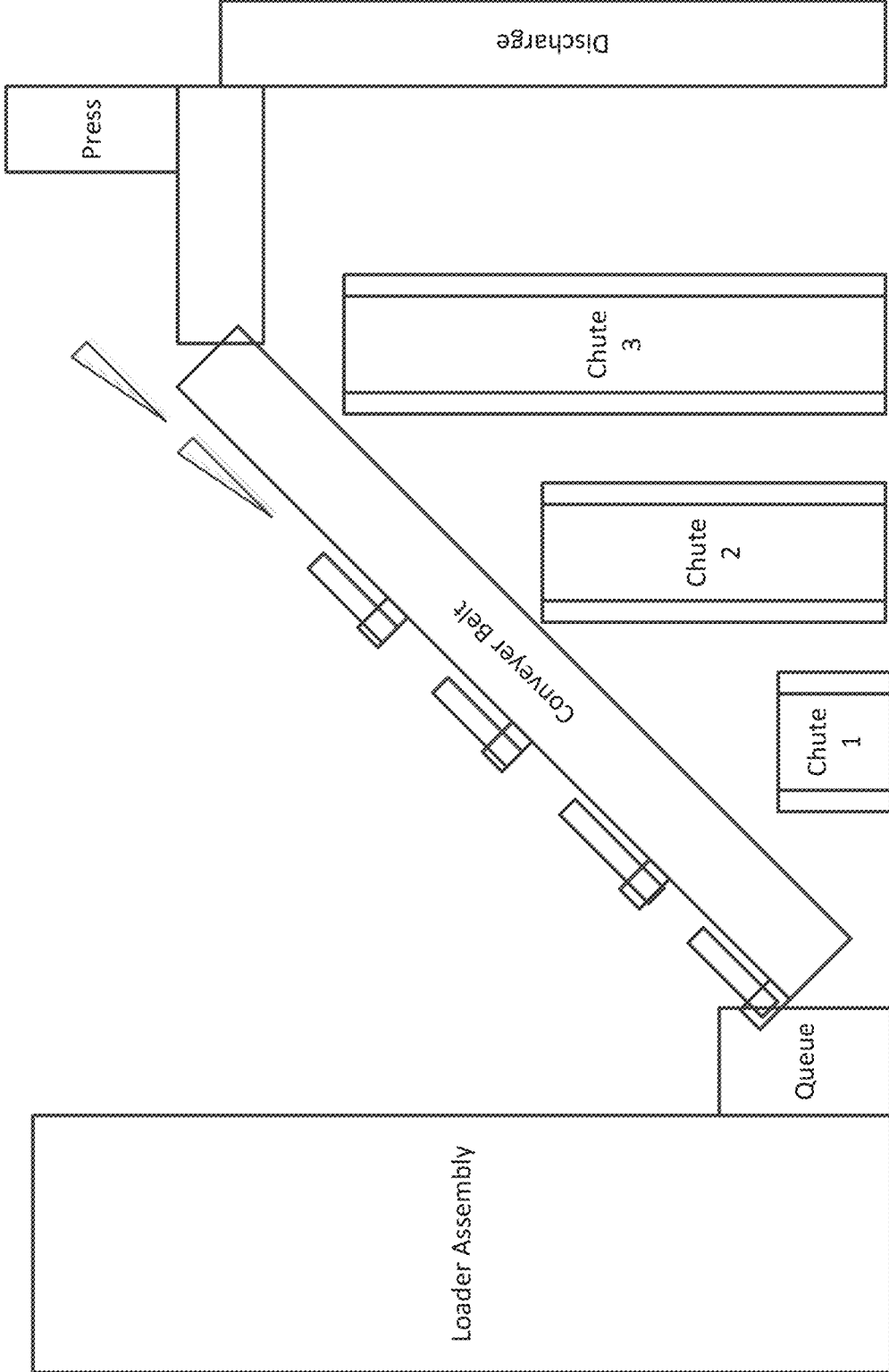
FIG. 31 is a diagram of a side view of an alternative apparatus for dismantling hard disk drives into parts in accordance with exemplary aspects of the disclosure.

FIG. 31 is a diagram of a side view of an alternative apparatus for dismantling hard disk drives into parts in accordance with exemplary aspects of the disclosure. The belt conveyor belt 2407 in the above embodiments is arranged horizontal. In another embodiment, the conveyor belt may be arranged at an angle such that hard disk drives are fed from a near ground level position and the final casting is unclamped at a higher position for placing a partially dismantled hard disk drive in a press area station. Such an arrangement may allow for simpler feeding of hard disk drives. In still another embodiment, the conveyor belt may be arranged at an angle such that hard disk drives are fed from a position at a height of a feeding station and the final casting is unclamped at near ground level position. Such an arrangement may allow simplification of the dismantling process by removal of a feed chute and queue area.

Figure 32:
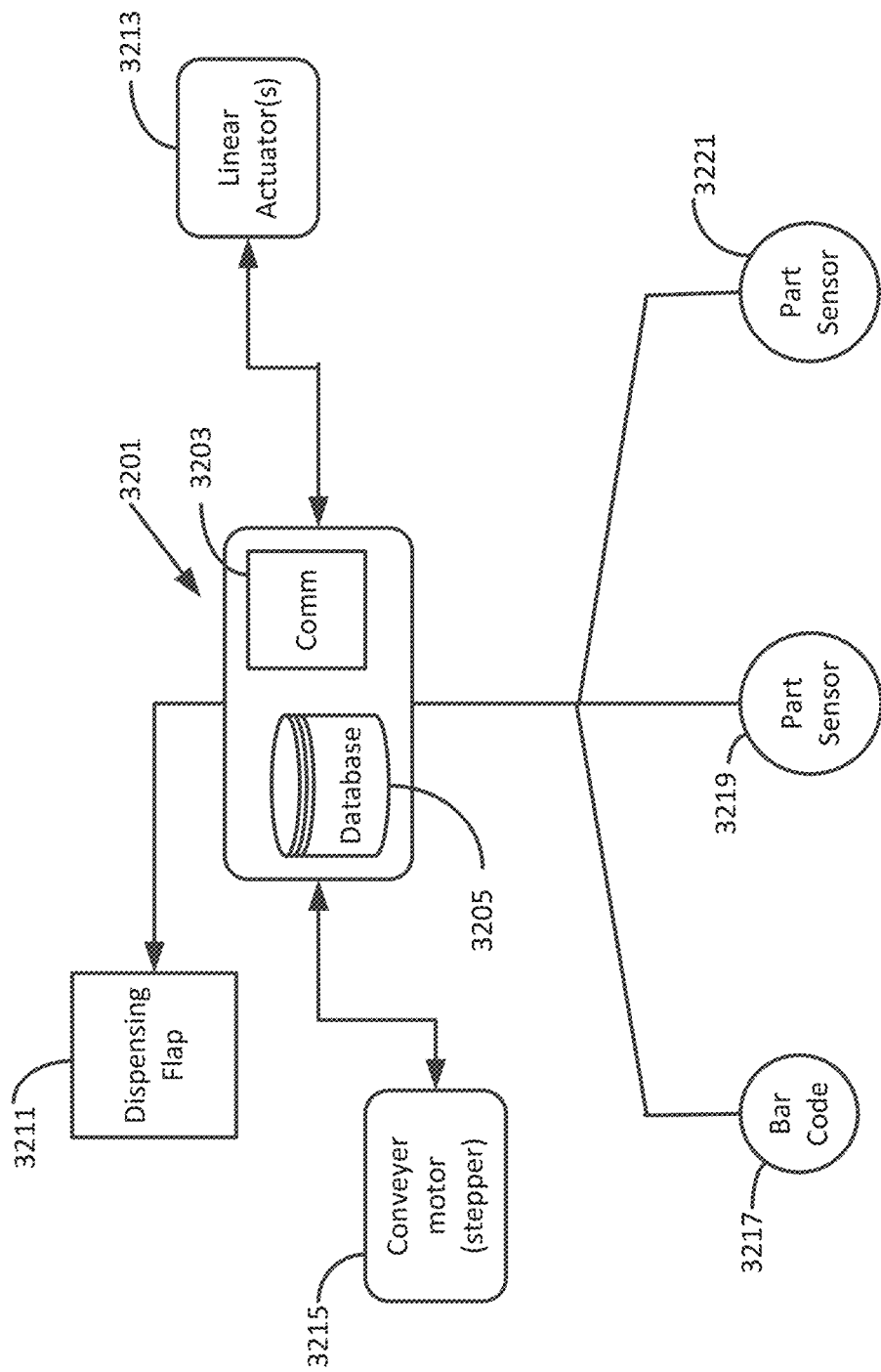
FIG. 32 is a block diagram of a control system for a system for dismantling hard disk drives into parts in accordance with exemplary aspects of the disclosure.

FIG. 32 is a block diagram of a control system for a system for dismantling hard disk drives into parts in accordance with exemplary aspects of the disclosure. A computer-based controller may control operation of the hard disk drive dismantling apparatus. The computer-based controller may be any desktop computer or a microcontroller, with a minimum requirement that it can read and write to a database 3205. The database 3205 may be as simple as a list or a table structure in a single file, a spreadsheet, or a more complex relational database, depending on what format a customer is able to provide. The database may be stored in a removable drive, such as a flash drive via a USB port, external hard drive, or may be stored internally, after being transferred via communications hardware 3203 from an external source.

The computer system 3201 is configured to perform controller functions including obtaining and transforming readings from various sensors, including a bar code reader 3217, one or more part sensors 3219, 3221, including one or more of laser sensors, proximity sensors and a camera, and issuing control commands to actuators including motors 3215, dispensing flaps 3211 and pneumatic actuators 3213.

The software for the computer system 3201 may be stored in a ROM, or other non-volatile storage, and may be in the form of a C language program, or a derivative language thereof, that is executed using an operating system, such as Windows 10 or later, Linux, or other Unix-based operating system. The computer system 3201 may include any processor, such as an Intel processor or AMD processor, which is capable of performing these operating systems. In the case of a microcontroller configuration, a controller operating system that is provided with the microcontroller may be used. The computer system 3201 may be configured with an A/D converter and signal processing device for handing sensor signals, as necessary.

Figure 33A:
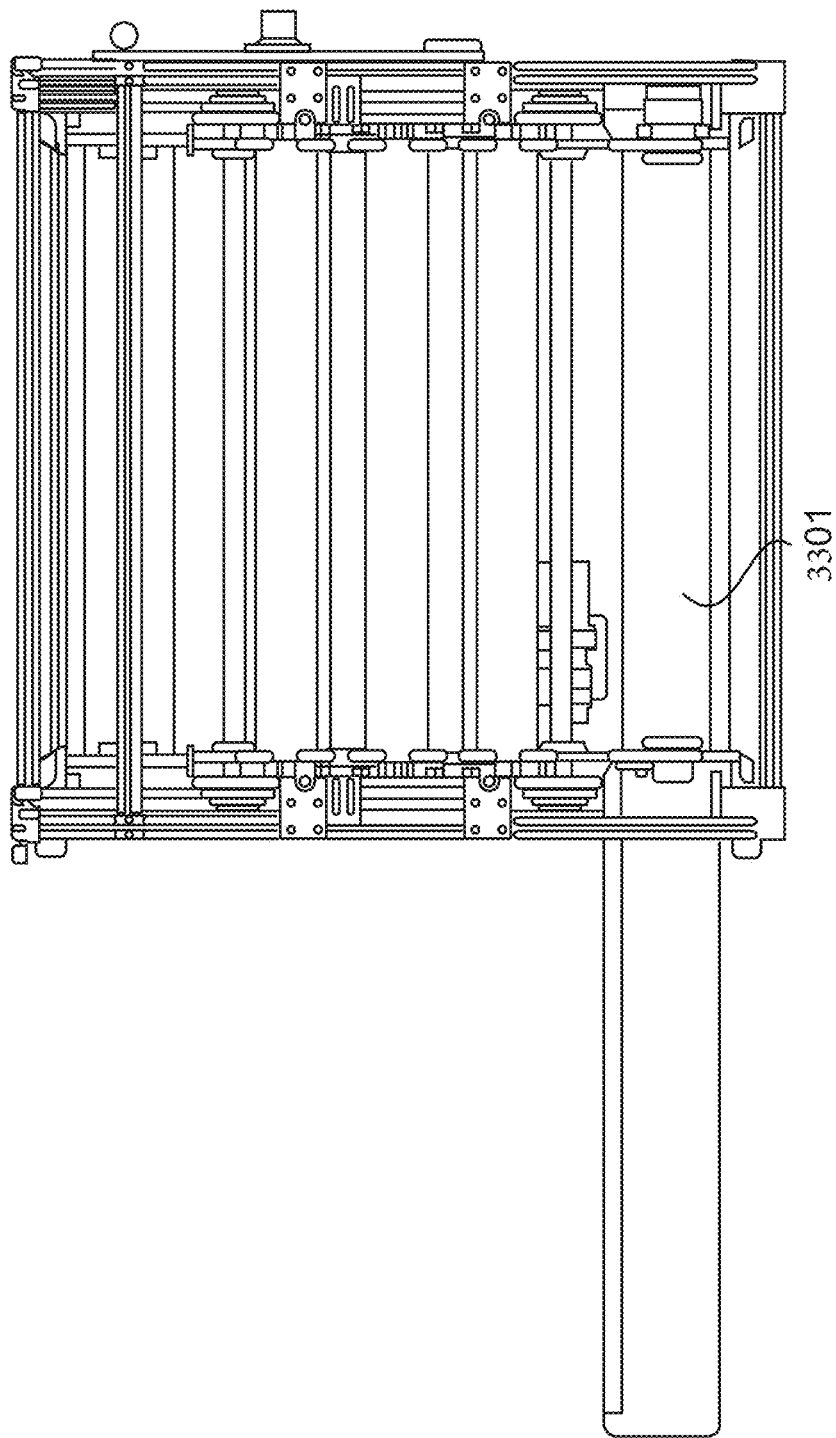
FIGS. 33A, 33B, 33C are diagrams for a carousel feeder system for serving hard disk drives in accordance with exemplary aspects of the disclosure.
Figure 33B:
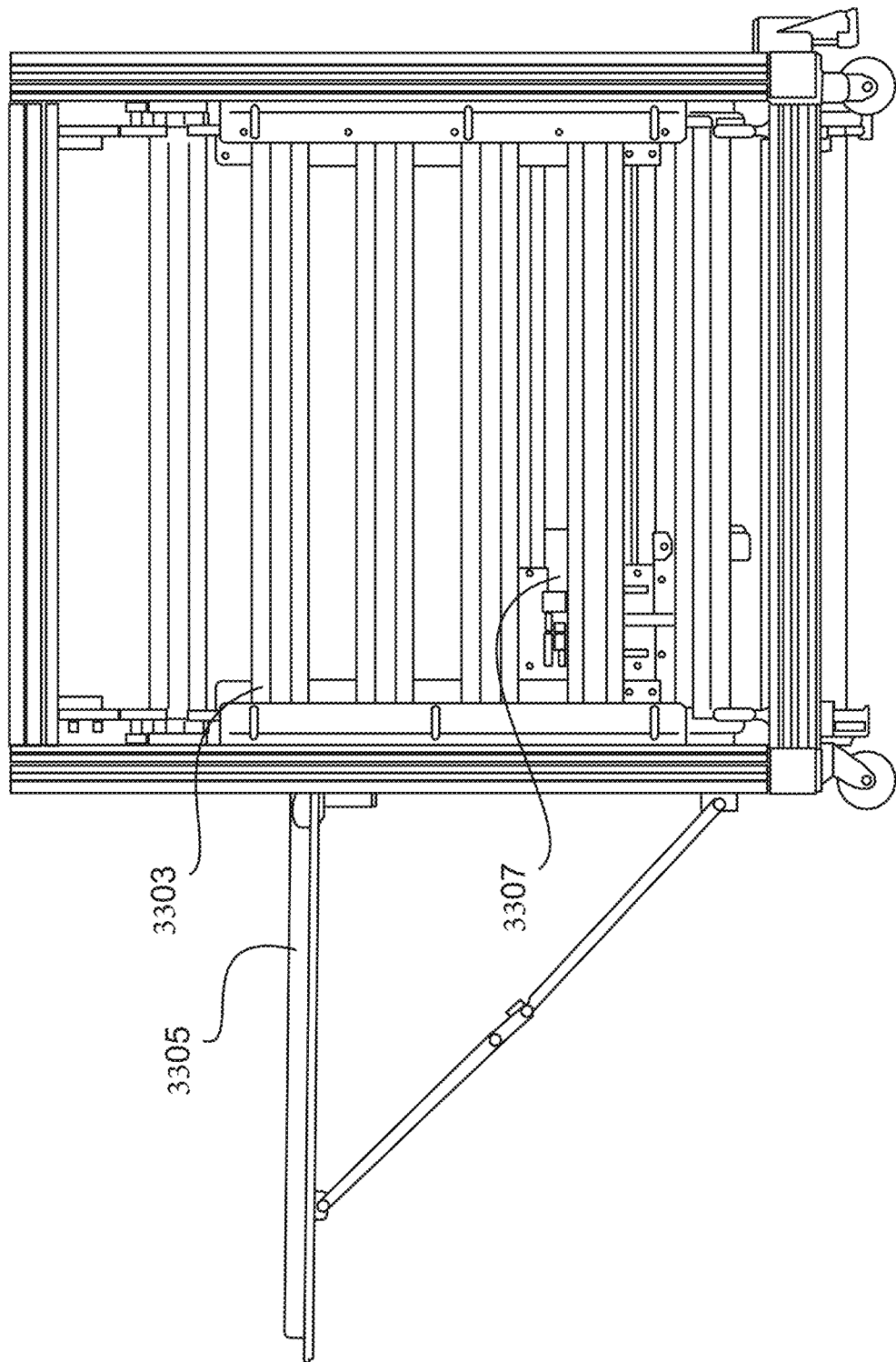
Figure 33C:
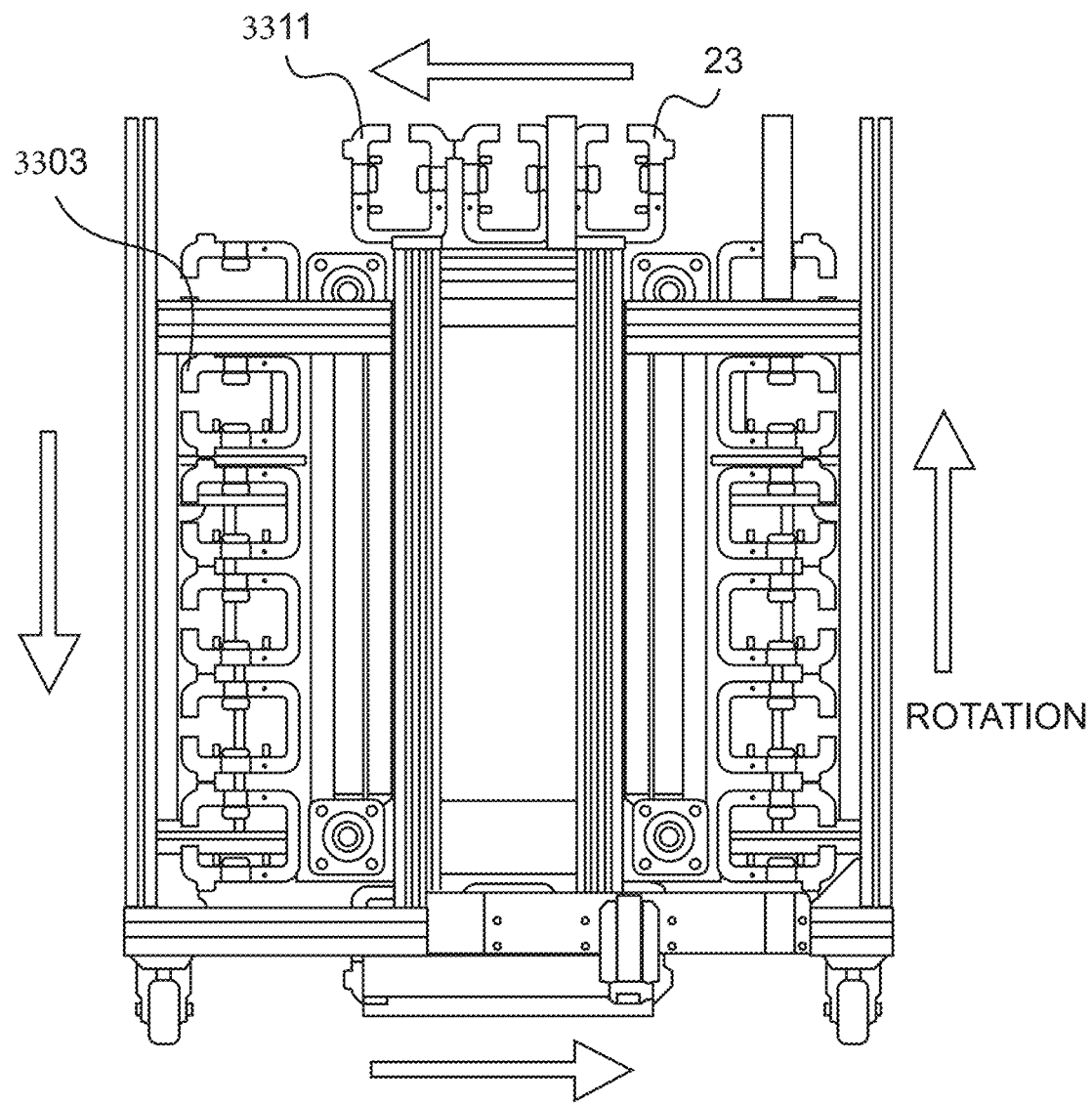

FIGS. 33A, 33B, 33C are diagrams for a carousel feeder system for serving hard disk drives in accordance with exemplary aspects of the disclosure. In order to handle high throughput that the dismantling apparatus is capable of handling, a feeder system may be used to automatically feed hard disk drives to minimize idle time. In addition, the feeder system may be accompanied by a customer database of hard disk drives and an arrangement of hard disk drives that are identified in the database. The arrangement is such that as each hard disk drive is fed to the dismantler apparatus it is checked against the customer database in order to account for the hard disk drives that are obtained from the feeder system. Any missing hard disk drives that have not been fed from the feeder system may be flagged in the customer database, or provided in a report by the computer system 3301.

The feeder system may be configured as a rotating carousel feeder in which carousel stations 3311 rotate starting from a drive insertion position 3303 to a feeder arm drive removal position 2423. In one embodiment, each carousel station 3301 can hold up to 40 hard disk drives and the feeder system includes 18 carousel stations, for a total maximum capacity of 720 drives. The carousel feeder system is preferably detachable and transportable so that more than one carousel feeder may be filled with hard disk drives. Each carousel feeder may include a fold-away feeder table 2305 that may be used to load a row of hard disk drives into a carousel station. Rotation of the carousel stations may be performed by an electric motor 3107.

Figure 34A:
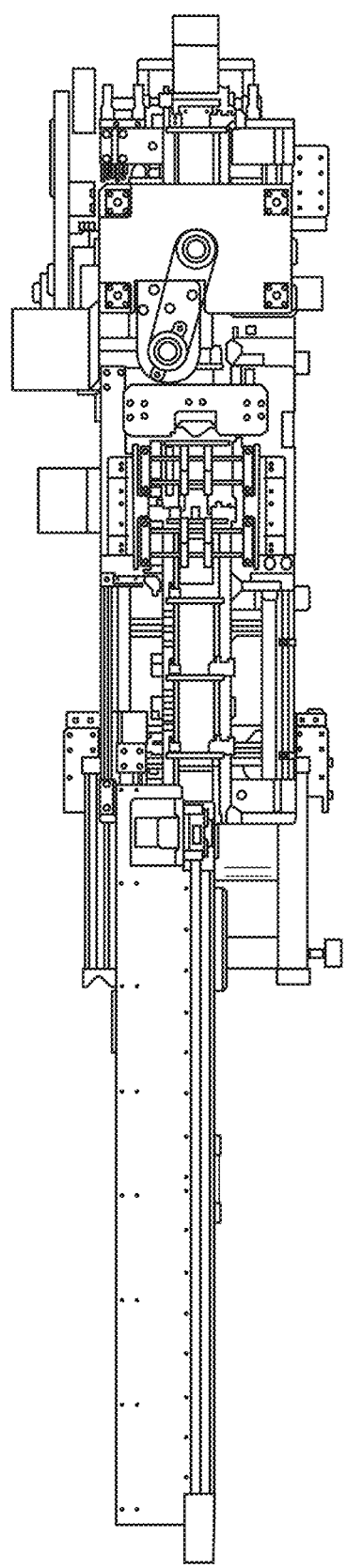
FIGS. 34A, 34B, 34C are detailed schematic diagrams of a top view, side view and front view of an exemplary apparatus in accordance with exemplary aspects of the disclosure.
Figure 34B:
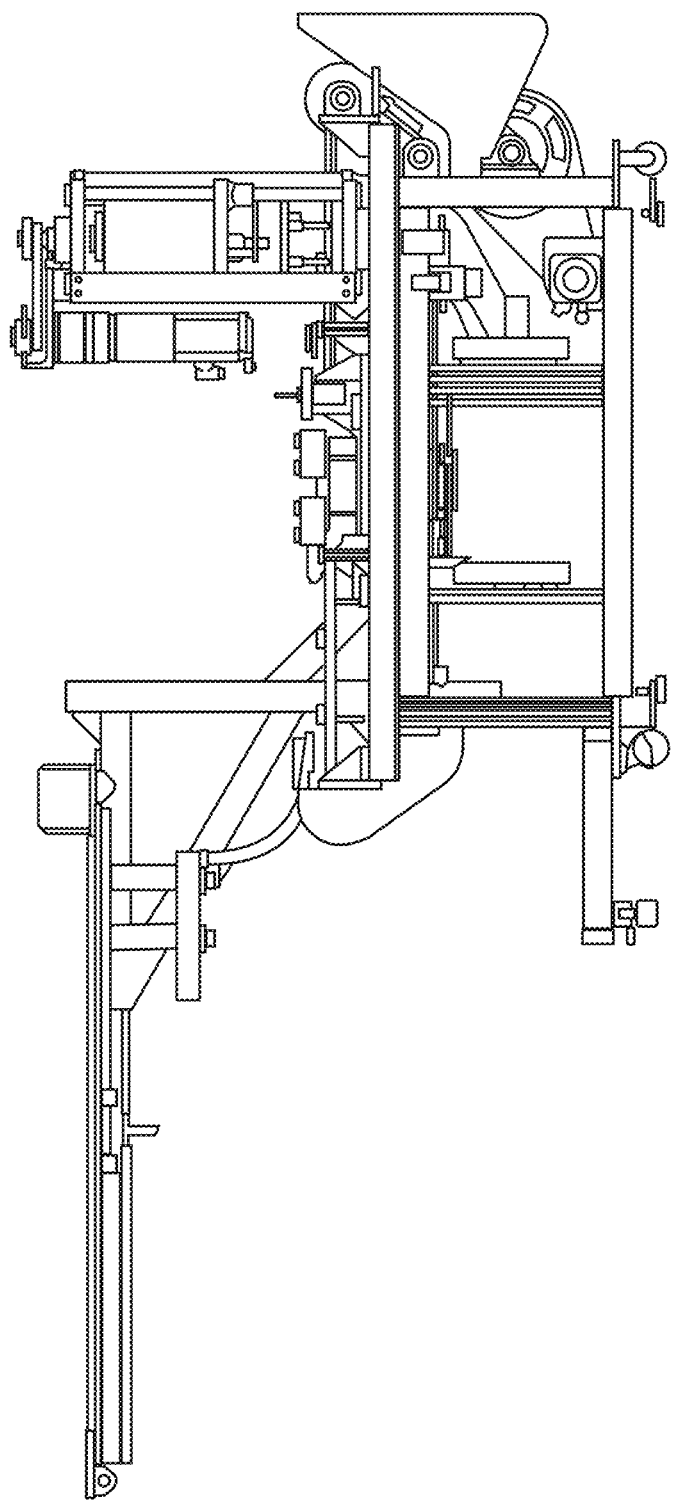
Figure 34C:
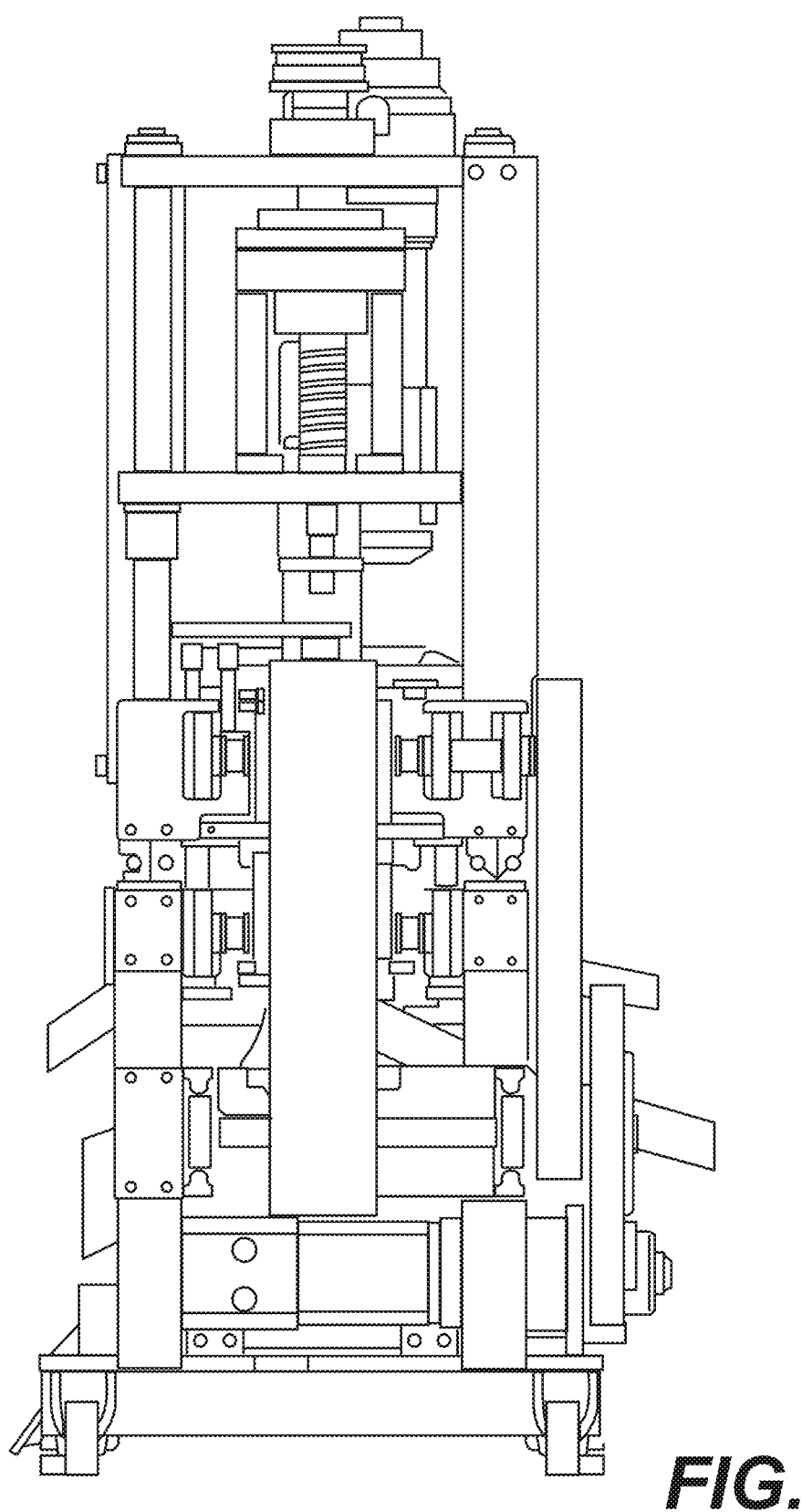

FIGS. 34A, 34B, 34C are detailed schematic diagrams of a top view, side view and front view of an exemplary apparatus in accordance with exemplary aspects of the disclosure.

The above disclosure also encompasses the embodiments listed below.

(1) A method of dismantling a plurality of hard disk drives. Each hard disk drive including a housing, a logic board at a lower portion of the housing, and a lid at an upper portion of the housing, such that the housing, logic board and lid encase internal parts of the hard disk drive. The method includes, for each of the plurality of hard disk drives clamping the hard disk drive into a holder assembly; reading identification information printed on a label of the hard disk drive by a scanner; indexing the hard disk drive to a position at which the logic board of the hard disk drive is peeled off and dropped into a bin for holding logic boards; separating the lid of the hard disk drive from a housing of the hard disk drive; indexing the hard disk drive to a position at which one or more magnets, as encased parts of the internal parts of the hard disk drive, are punched in a direction from the logic board side of the hard disk drive to separate the one or more magnets from the hard disk drive; and dispensing remaining of the internal parts of the hard disk drive into a final parts bin.

(2) The method of feature (1), in which the identification information includes a serial number and a manufacture number, further including upon reading the serial number and the manufacture number, checking a database to determine if dismantling is not to be performed for the hard disk drive and removing the hard disk drive from the holder assembly when it is not to be dismantled.
(3) The method of features (1) or (2), in which the indexing the hard disk drive to a position at which a lid of the hard disk drive is separated further includes checking via a sensor whether the lid has been fully separated and removing the hard disk drive from the holder assembly when the lid has not been fully separated.
(4) The method of features (1) to (3), in which after the logic board has been peeled off and dropped, the identification information of the hard disk drive is again read by the scanner and compared to the identification information read before the logic board had been peeled off.
(5) The method of features (1) to (4), in which the separating the lid of the hard disk drive from the housing of the hard disk drive includes checking a location of the gap between the lid and the housing via a position detection sensor, and moving the hard disk drive into a wedge positioned at the checked gap between the lid and the housing, causing the lid to bend, approximately at its center, as the hard disk drive moves further pass the wedge, and the wedge causing the bent lid to shear fasteners holding the lid to the housing to separate the lid from the housing.
(6) The method of feature (5), in which the position detection sensor is a laser marker, the method further comprises checking the location of the gap by marking a side of the hard disk drive with the laser marker and forming a profile of a portion of a side of the housing and the lid to detect the location of the gap.
(7) The method feature (6), in which the wedge includes a spring configured to compensate for variation in the location of the gap by depressing and allowing the wedge to adjust to the location of the gap.
(8) The method of features (1) to (7), in which the one or more magnets of the hard disk drive are punched in a direction from the logic board side by a pair of punch pins.
(9) The method of features (1) to (8), further including focusing a camera to locate a center position of a reader head bearing of the hard disk drive; removing the reader head bearing from the hard disk drive using an internal picoting sub die in accordance with the located center position.
(10) The method of features (1) to (9), in which the dispensing remaining parts of the hard disk drive includes dropping loose internal components of the hard disk drive; and removing a casting of the hard disk drive from the holder assembly using cams.
(11) The method of features (1) to (10), in which before the clamping a hard disk drive into a holder assembly, the hard disk drive is fed from a queue holding a plurality of hard disk drives.
(12) An apparatus for dismantling a plurality of hard disk drives. Each hard disk drive including a housing, a logic board at a lower portion of the housing, and a lid at an upper portion of the housing, such that the housing, logic board and lid encase internal parts of the hard disk drive. The apparatus includes a holder assembly configured to clamp a hard disk drive; a scanner that reads an identification information printed on a label of the hard disk drive; a chain conveyor belt that indexes the hard disk drive to a position at which a logic board of the hard disk drive is peeled off and dropped into a bin for holding logic boards; a lid separating station configured to separate the lid of the hard disk drive from a housing of the hard disk drive by moving the hard disk drive into a wedge positioned at a gap between the lid and the housing, the wedge causing the lid to bend, approximately at its center, as the hard disk drive moves further pass the wedge, and causing the bent lid to shear fasteners holding the lid to the housing to separate the lid from the housing; the chain conveyor belt indexes the hard disk drive to a position at which one or more magnets of the hard disk drive are punched; a magnet punching station configured to punch the one or more magnets, as encased parts of the internal parts of the hard disk drive, in a direction from the logic board side of the hard disk drive to separate the one or more magnets from the hard disk drive; and a final parts bin into which remaining of the internal parts of the hard disk drive are dispensed into.
(13) An apparatus of feature (12), in which the lid separating station includes a position detection sensor checking a location of a gap between the lid and the housing, and a wedge positioned at the checked gap between the lid and the housing, the wedge configured to cause the lid to bend, approximately at its center, as the hard disk drive moves further pass the wedge, and cause the bent lid to shear fasteners holding the lid to the housing to separate the lid from the housing.
(14) An apparatus of feature (13), in which the position detection sensor is a laser marker that checks the location of the gap by marking a side of the hard disk drive and forming a profile of a portion of a side of the housing and the lid to detect the location of the gap.
(15) An apparatus of features (13) and (14), in which the wedge includes a spring configured to compensate for variation in the location of the gap by depressing and allowing the wedge to adjust to the location of the gap.
(16) An apparatus of features (12) to (15), in which the position at which one or more magnets of the hard disk drive are punched in a direction from the logic board side by a pair of punch pins.
(17) An apparatus of features (12) to (16), in which the wedge includes tapered beveled sides and a forward beveled side forming an edge that is approximately one-third a width of the wedge.
(18) An apparatus for dismantling a plurality of hard disk drives, each hard disk drive including a housing with a lid, such that the housing encases internal parts of the hard disk drive including a platter assembly and a spindle motor. The apparatus includes a disassembly shear for receiving a hard disk drive, of the plurality of hard disk drives. The disassembly shear includes a shear die that supports a shear blade adapted to selectively remove the lid from the housing. The shear blade the wedge includes tapered beveled sides and a forward beveled side forming an edge. The shear blade causes the lid to bend, approximately at its center, as the shear blade into the hard disk drive, and causes the bent lid to shear fasteners holding the lid to the housing to separate the lid from the housing. The apparatus further includes a spindle motor punch to remove the spindle motor from the platter assembly.
(19) The apparatus of feature (18), further including an actuator for actuating the disassembly shear. The hard disk drive is positioned in a selected vertical position in a receiving shoe and beneath the shear die and above a discharge orifice. The actuator is configured to actuate the disassembly shear and drive the shear die supporting the shear blade adapted to selectively remove the lid. The lid, the spindle motor and the platter assembly are discharged into separate discharge orifices.

(20) The apparatus of feature (19), in which the actuator is a hydraulic cylinder configured to actuate the disassembly shear to drive the shear blade to remove a logic board from the housing and discharge the logic board into a separate discharge orifice from the platter assembly.

In addition to the above-referenced embodiments, any of the machine functions described herein may be performed on separate machines that can be manually operated, semi-automated, or fully automated. Each separate machine may operate independently or may be linked to other machines by a conveyor or other product handling equipment, such as pick-and-place robots, or in-process materials may be manually moved between machines. Each of the machine process categories described above, and in particular hard drive case separation, circuit board separation, circuit board dismantling, and motor removal may be conducted separately or sequentially as so desired and remain within the scope of the original disclosure.

Figure 35:
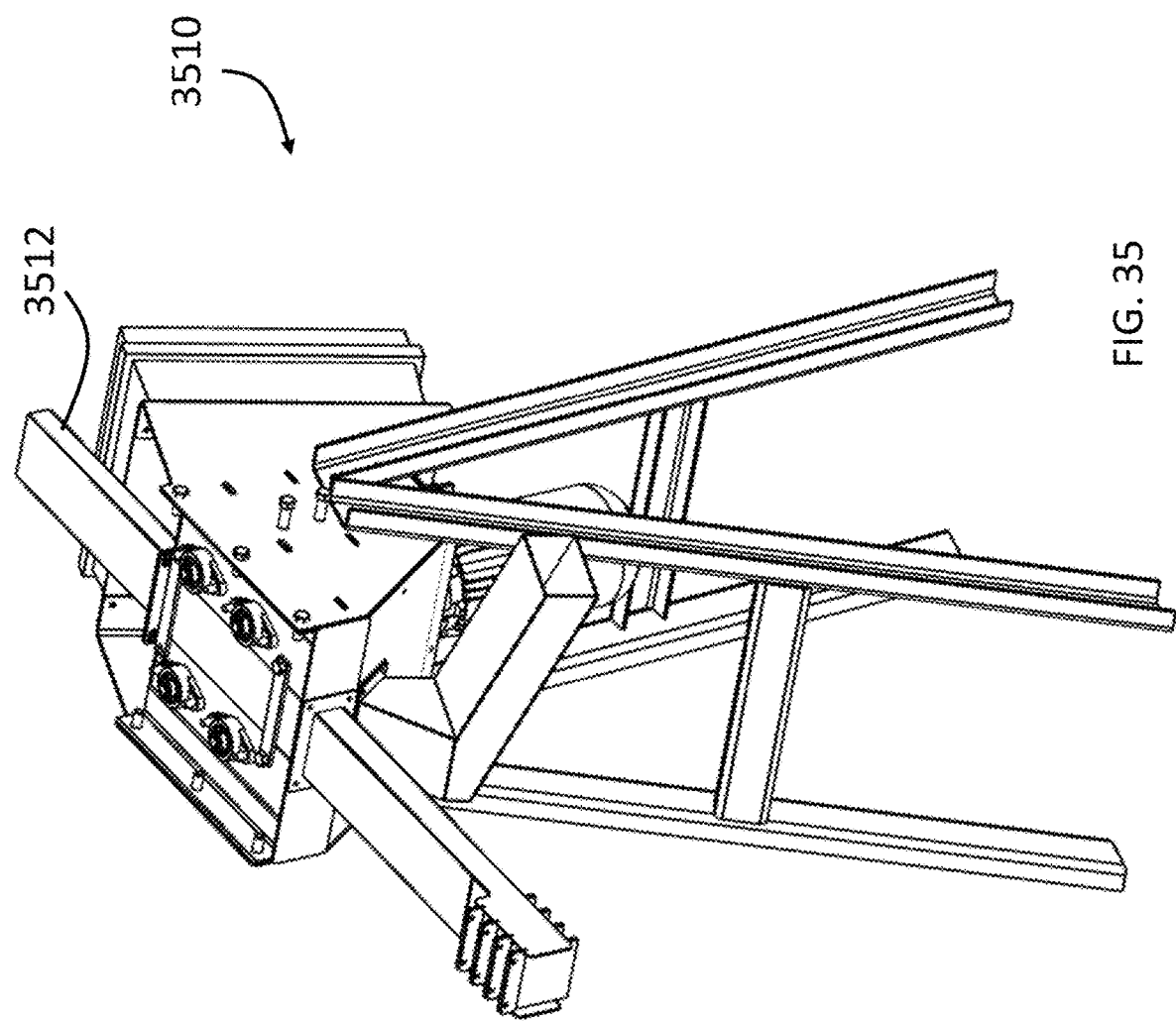
FIG. 35 is a perspective view of a hard drive processing machine in accordance with an embodiment of the invention.
Figure 36:
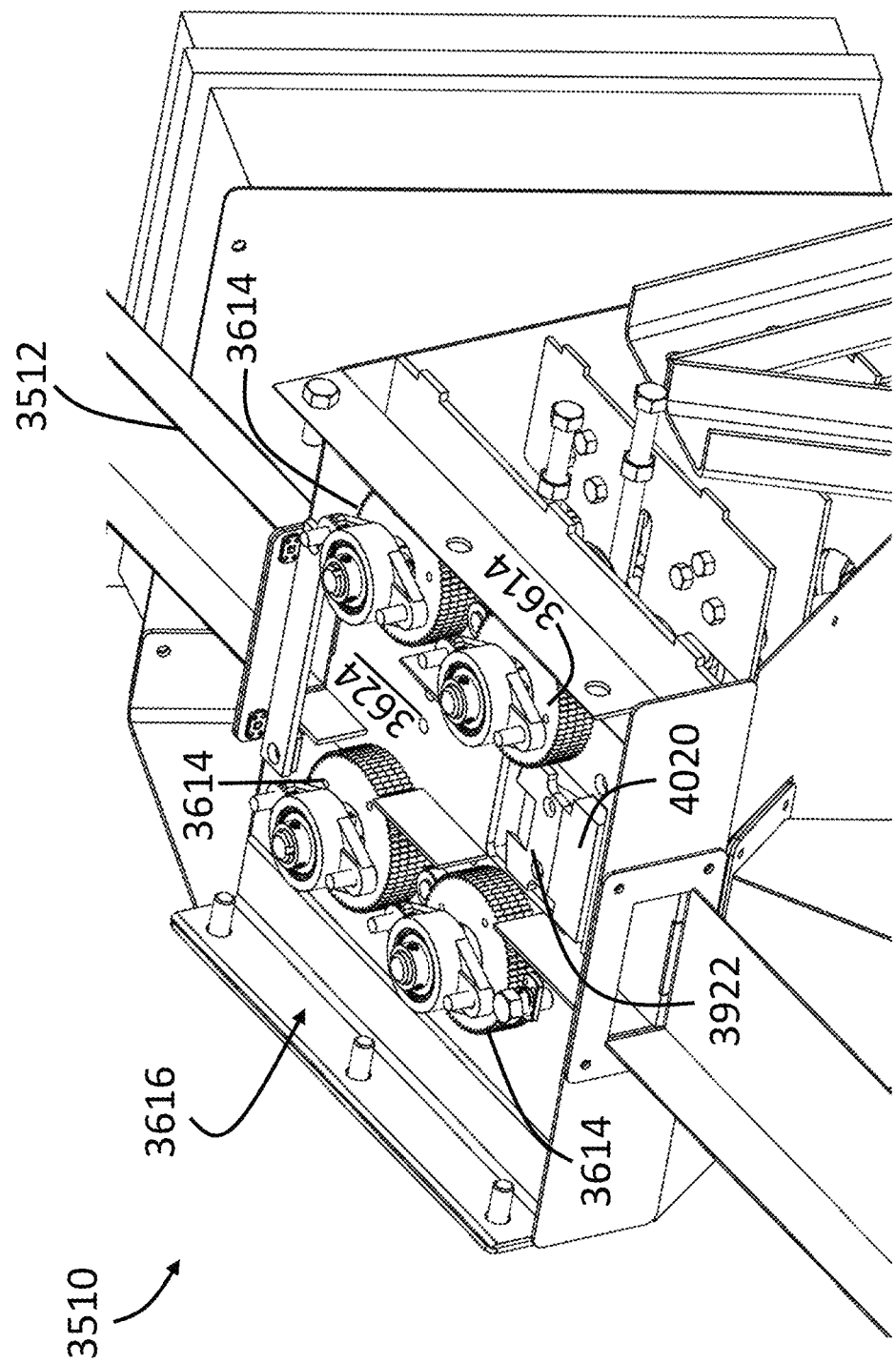
FIG. 36 is an enlarged perspective view of a feed mechanism and separating blade station of the hard drive processing machine of FIG. 35.
Figure 37A:
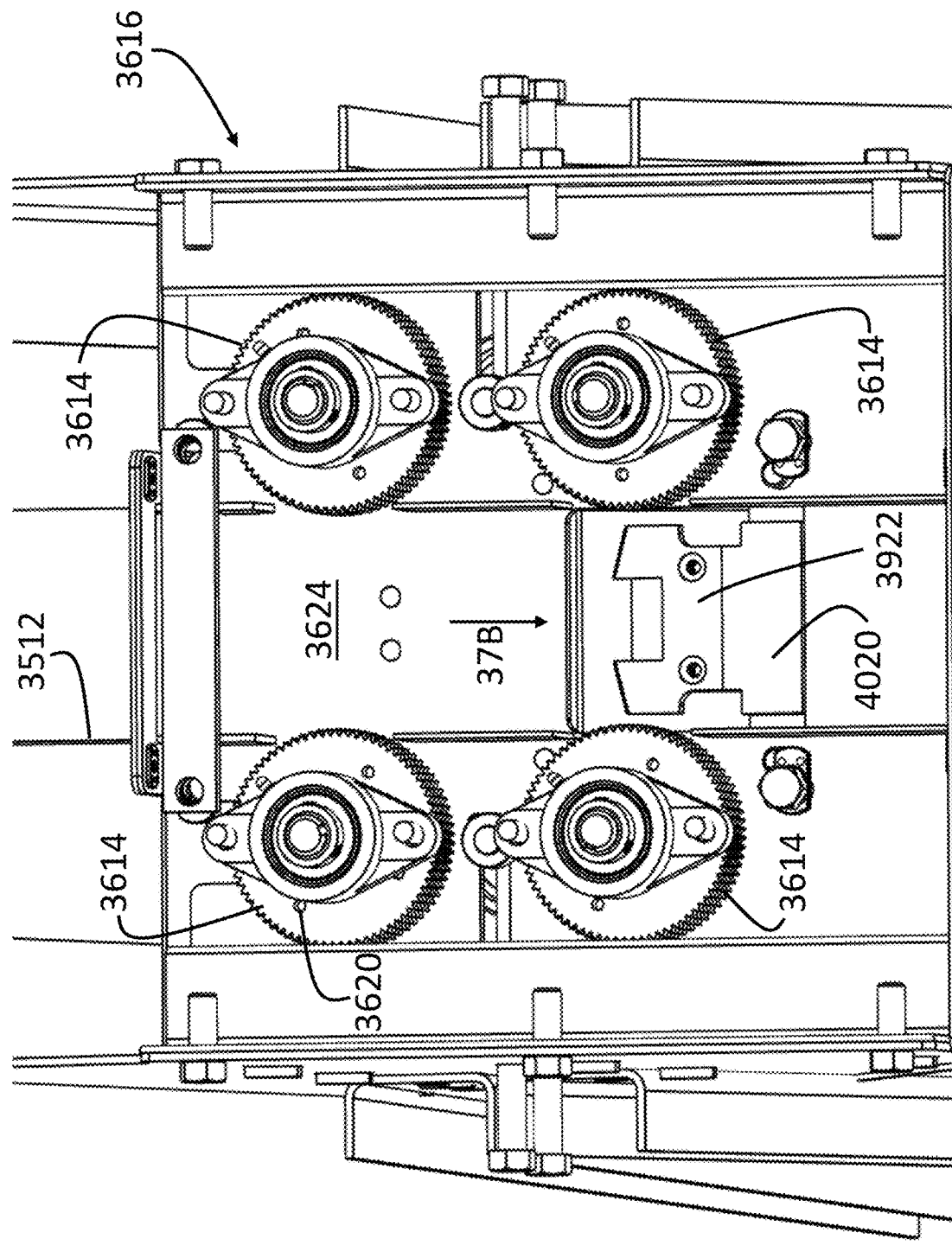
FIG. 37A is a further enlarged view of the feed mechanism and separating blade station of FIG. 36.

Referring again to the drawings, there is illustrated in FIGS. 35-37 a hard drive processing machine, shown generally at 3510. Though illustrated as a stand-alone device, the processing machine 3510 may be incorporated in whole or in part as a station within a larger system for processing hard drives generally. The hard drive processing machine 3510 is illustrated having an inlet 3512, configured as a chute or slide, to permit hard drive units to enter the machine. In one embodiment of the processing machine 3510, the hard drive units have the lid sections removed prior to entry into the inlet 3512. The chute 3512 feeds hard drive units having the lid removed and the circuit board facing down are fed into the chute 3512. Spaced apart, drive rollers 3614 contact the outer edge of the hard drive units and propel them toward a board removal station, shown generally at 3616. The drive rollers 3614 are arranged in an opposing relationship, though they may be staggered relative to each other.

Figure 37B:
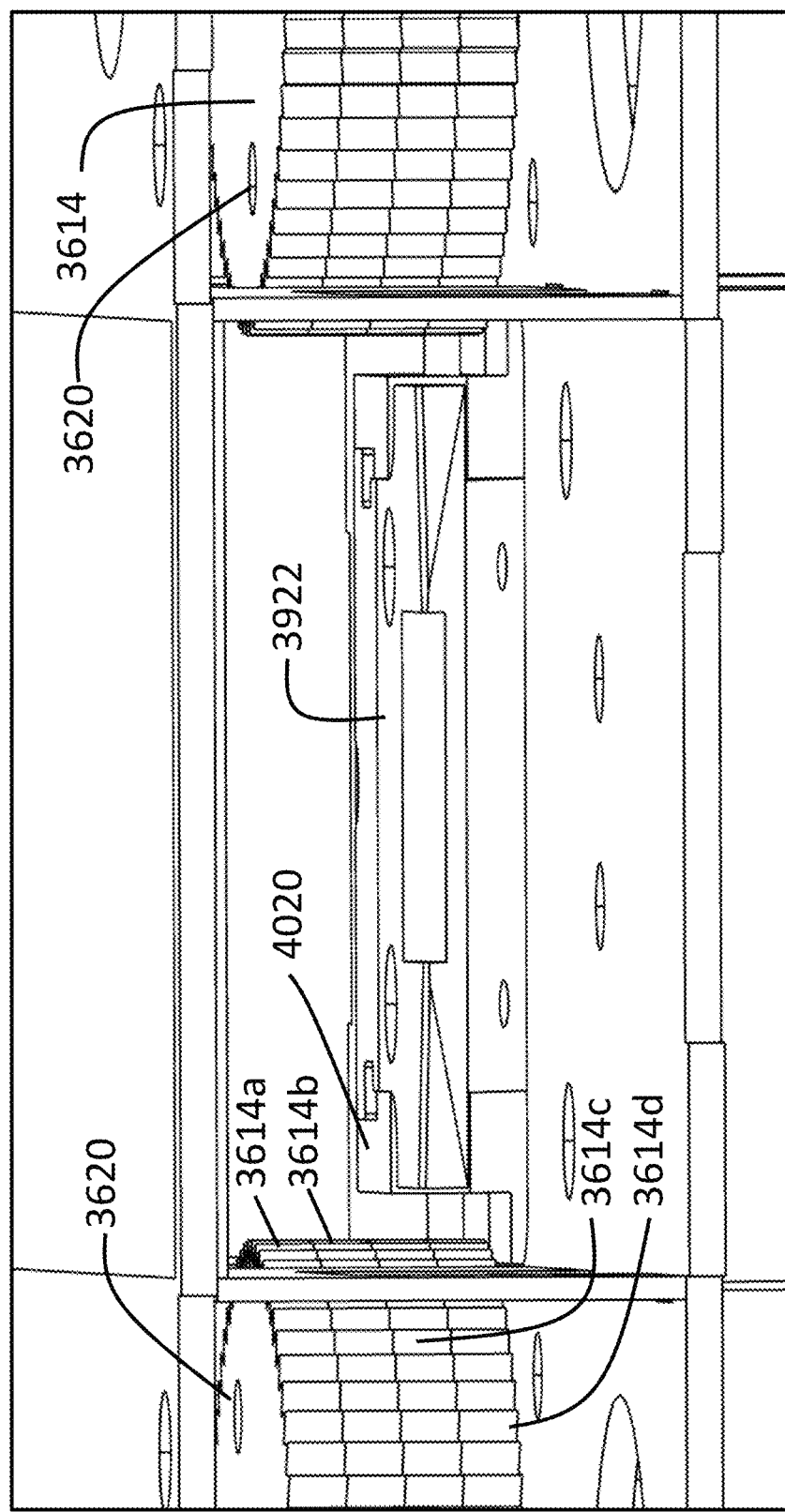
FIG. 37B is an enlarged view, taken along arrow 37B, of the feed mechanism and separating blade of FIG. 37A.

As shown in FIGS. 37B and 38B, the drive roller 3614 is constructed as an assembly of drive roller plates 3614a-3614d. In certain embodiments, the drive roller plates are pinned together, with pins 3620, to maintain the relative tooth orientations between the plates and distribute contact and impact forces. Though four plates are shown, any number of segments or plates from a single plate forming the entire drive roller to any number of assembled plates of different or the same thickness may be used if desired. In certain embodiments, the plates may be welded or otherwise bonded together. The tooth form of the drive roller 3614 is generally triangular and terminates in a generally sharp point or a triangular apex that has a radiused end or a short, flat tip profile. In one embodiment, the radiused end or the short, flat tip profile may be in a dimensional range of about 0.1 mm to about 0.5 mm.

The tooth form and tip geometry is configured to firmly hold the hard drive casing through the case separation process and circuit board removal process. In one example, the plates are made from a heat treatable steel having a sufficiently toughness rating and high carbon content to permit localized hardening or surface hardening of the tooth form. One such material may be a 4140 Chrome Molybdenum steel, though other materials may be used. In one processing method, the tooth form may be laser cut into blank discs at a speed to permit localized heating of the tooth form to case harden the tooth for strength to hold the hard drive incoming stock yet leave a softer core material that absorbs impact forces and provides fracture toughness to the structure. Other known manufacturing processes may be used for form the tooth profiles.

The board removal station 3616 includes a separating blade assembly, shown generally at 3618. The separating blade assembly 3618 includes a blade mount 3920 and a circuit board separating blade 4022. As shown in FIGS. 38B and 41A-41B, the blade mount 4020 is supported for movement relative to a conveyor base 3624 to permit free alignment of a leading edge 3922a of the separating blade 3922 to a circuit board of the hard drive unit. A suspension element 4126, illustrated as a cantilever spring, permits the leading edge 3922a to float and seek a separation point between the circuit board leading edge, which may include a connector, to facilitate cleanly cleaving and/or peeling the board off of the hard drive unit. The separation point may be defined in the context of a circuit board to hard drive housing relationship as an interface space therebetween. In the context of a hard drive housing being opened into two pieces, the separation point may be a seam between a first half and a second half of the housing.

The leading edge 3922a of the separation blade 3922 includes a notch or motor bypass slot 22b. The motor bypass slot 3922b permits a disk drive motor of the hard drive to remain with the hard drive unit for subsequent processing. The motor bypass slot 3922b has a leading edge 3922c that is offset by a distance A from the leading edge 3922a of the separating blade 3922. The offset, "A," permits a rake angle, "α," of the separating blade 3922 to act on the circuit board while allowing the drive motor to remain with the disk drive portion of the hard drive unit. In one embodiment, the offset, A, may be in a range of 2-20 mm and may further be in a range of 5-10 mm. In the illustrated embodiment, the offset may be in a range of 7-9 mm. The rake angle, a, may be in a range of 10-40 degrees and may further be in a range of 15-30 degrees. In the illustrated embodiment, the rake angle α may be in a range of 15-20 degrees. A second rake angle, "β," permits the separating blade 3922 to ride over the uneven topography of the circuit board caused by the various electronic components attached on the surface, such as microprocessors, transistors, resistors, and the like. In one embodiment, the rake angle, β, may be in a range of 5-25 degrees and further in a range of 7-15 degrees. In the illustrated embodiment, the rake angle β may be in a range of 10-12 degrees. In the illustrated embodiment, the circuit board separating blade leading edge has a sweep angle, "γ", that may be in a range from flat or 0 degrees to about 35 degrees. In one embodiment, the sweep angle, γ, is 20-25 degrees. Thus, the separating blade 3922 peels the circuit board from both the hard drive unit and the disk drive motor. This ability to separate the circuit board from the disk drive motor permits a faster and cleaner separation of materials for downstream processing of materials. Metallic elements and reclaimable materials from the circuit board are different from those of the drive motor, so it is desirable to process these components separately.

The blade mount 4020, as shown in FIG. 40A, includes a blade mounting interface 4022a that locates and supports the separating blade 3922. The blade mounting interface includes a blade securement 4022b to attach the blade to the mount. The securement 4022b is illustrated as two spaced-apart threaded bores, though any suitable attachment may be used, such as studs, over-center clamps, or integrally forming the mount with the blade. The blade mounting interface includes a backstop 4024 that locates and supports the blade in response to impact forces during cover removal or circuit board separation. The blade mount 4020 may be further configured to hold shear blade 23, or any other separating or shear blade described herein, with modification of mounting hole arrangements described for either the shear blade 23 or the blade mount 4020 to accept the other. The blade mount 4020 further includes mounting bores 4026 that attach the blade assembly 3618 to the conveyor base 3624 or any other suitable location on the processing machine. The mounting bores are large enough to permit the blade mount 4020 and separating blade 3922 to move, both linearly and angularly, to permit the leading edge 3922a to seek the separation point of the circuit board from the hard drive unit. As shown in FIG. 41A, a free-space or suspension travel space B permits movement of the blade assembly. The suspension element 4126 is illustrated as a cantilever spring connected to the blade mount 4020, though other suspension configurations may be used. The suspension element may be configured as coil springs, Bellville springs, or hairpin springs located between the attaching bolts and the flanges of the mounting bracket.

An alternative embodiment of a blade mount, shown generally at 4310, is height adjustable to vary the relative location of the blade, such as the hard drive case shearing blade 23 or the circuit board separation blade 3922 and any variations or feature combinations thereof. Adjustable blade mount 4310 includes a mounting base 4312 with mounting bores 4314 that attach the adjustable blade mount and blade to the conveyor base 3624 or any other suitable location on the processing machine. The mounting base 4312 includes a blade mount receiver 4316 that locates and supports an adjustable blade support 4318. The receiver 4316 includes channels 4320 to permit adjustment of the blade support 4318 in one direction, such as the height of the blade relative to the conveyor, and constrain the blade and blade support against impact forces during processing. The channels 4320 may be configured, for example, as square, rectangular, rounded or dovetail configurations that interface with corresponding, mating projections 4322 on the blade support 4318. The blade support 4318 includes the same or similarly configured blade interface structures as described above in conjunction with the blade mounting interface 4022a. The mounting base 4312 includes support locks 4324, illustrated as opposing set screws, though a single set screw may be provided. An adjuster assembly, shown generally at 4326, includes a jack screw 4328 and a partial bore 4330 having threads formed in the adjustable blade support 4318 that mate with the jack screw 4328. The mounting base 4312 includes a jack screw retaining bore 4332 that permits the jack screw 4330 to rotate but is retained axially relative to the mounting base 4312. Alternatively, the jack screw 4328 may be provided in a threaded bore in the blade support 4318 and act against one of the mounting base or the conveyor to change the elevation of the blade relative to the conveyor.

Referring now to FIGS. 41A-41B and 42A-42D, as the hard drive unit is moved into contact with the leading edge of the separating blade, the blade moves in response to the path of least resistance which is the free space between the circuit board and the hard drive disk assembly. As the rake angle, a, portion of the blade moves into the hard drive unit, the circuit board bends and rides down along the rake angled edge. The bending of the circuit board initiates separation with the mounting areas of the hard drive housing and further stresses the connection with the drive motor. Since the drive motor connections to the circuit board are predominantly electrical, the contacts are more easily sheared due to the speed of travel of the hard drive unit within the machine. The motor bypass slot transitions to and maintains the same rake angle, a, of the leading edge so the circuit board follows the sloped face while the motor itself passes through the slot and remains attached to the disk drive assembly. The motor bypass slot further defines an opposite rake angle, "δ," that may contact the drive motor as the blade passes between the circuit board and the disk drive. This opposite rake angle δ supports the motor against the hard drive unit to aid in maintaining the motor's connection to the disk drive.

Figure 42A:
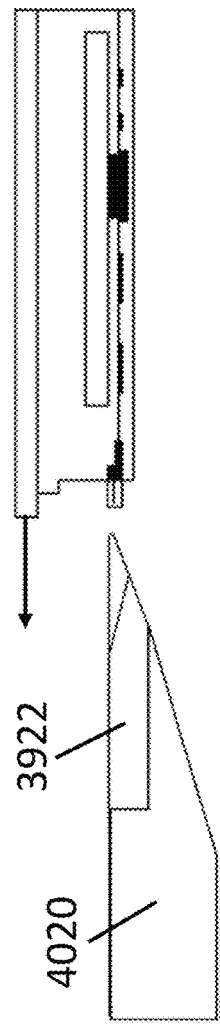
FIGS. 42A-42D are a schematic illustration of a separating sequence of a circuit board from a hard drive housing.
Figure 42B:
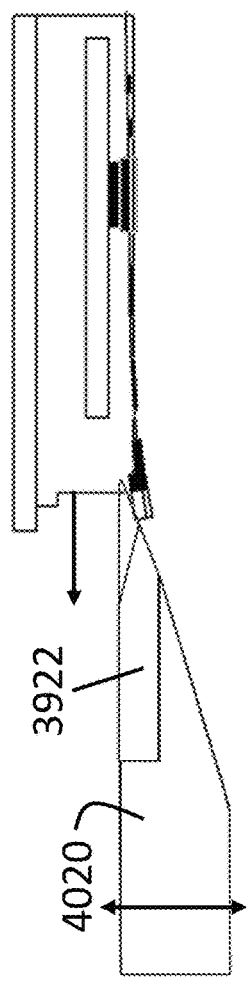
Figure 42C:
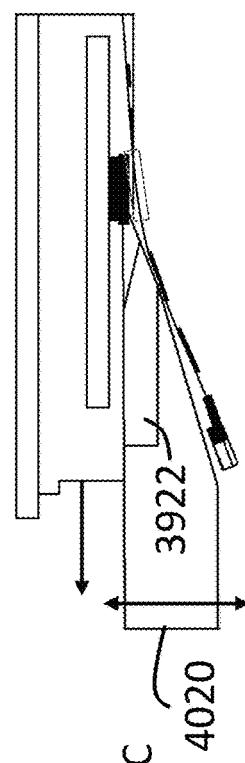
Figure 42D:
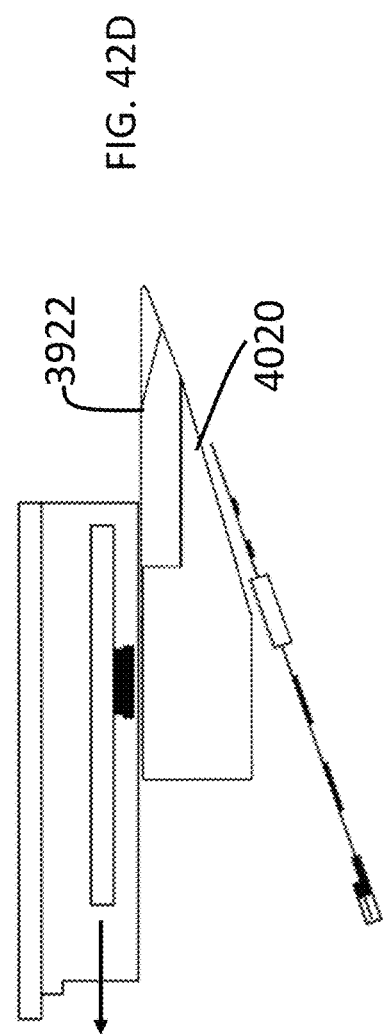

As can be seen from FIG. 38B, with reference to FIGS. 42A-42D, the circuit board is separated from the hard drive unit and disk drive motor and passes to an exit chute while the remaining disk drive and housing portion travels out of the processing machine for subsequent processing or disposition. As shown in FIG. 42A, the hard drive unit approaches the leading edge of the circuit board separating blade. As the leading edge contacts the leading edge of the circuit board, the blade is free to move relative to the conveyor base to travel over the circuit board. Certain circuit boards may have a leading edge connector that can also pass through the motor bypass slot while the leading edge of the circuit board separating blade contacts the board portion of the printed circuit board, as shown in FIG. 42B. As the hard drive unit is driven into the circuit board separating blade, the flexible nature of the board portion permits the blade to peel the board off of the hard drive housing. As the blade progresses along the length of the hard drive unit, the circuit board follows the rake angle, a, and applies sufficient stress to the circuit board to motor interface to begin to break the electrical and mechanical attachments of the board to the disk drive motor. The motor passes through the motor bypass slot and surface defined by the rake angle, δ, of the bypass slot contacts the motor and maintains its connection to the disk drive assembly. The circuit board tears away from the motor and continues to follow the blade surface defined by the rake angle, a, onward to an exit chute. The remaining hard drive is moved for either continued processing or other disposition.

Numerous modifications and variations of the present invention are possible in light of the above teachings. It is therefore to be understood that within the scope of the appended claims, the invention may be practiced otherwise than as specifically described herein.

The invention claimed is:

1. An apparatus for separating components of a hard disk drive comprising:
    a pair of opposing drive rollers configured to contact a hard disk drive housing and move the hard disk drive through a separating station, the separating station defining a base; and
    a separating blade mounted on a blade mount, the separating blade and the blade mount resiliently suspended relative to the base such that the separating blade is configured to deflect to a separation point to remove a first hard drive component from a second hard drive component.

2. The apparatus of claim 1 wherein the pair of opposing drive rollers are formed with a plurality of triangular tooth forms terminating in one of a pointed triangular apex or a radiused triangular apex having a form radius in a range of about 0.1 mm to about 0.5 mm configured to either one of deflect or pierce the hard disk drive housing.

3. The apparatus of claim 2 wherein the opposing drive rollers are formed from a plurality of drive roller plates, connected together for concurrent movement.

4. The apparatus of claim 1 wherein the first component is a circuit board and the second component is the hard disk drive, the separating blade is a circuit board separating blade having a slot configured to selectively remove the circuit board from the hard disk drive and permit a third component connected to the circuit board to remain attached to the hard disk drive and the separating point is a region between the circuit board and the hard disk dive housing.

5. The apparatus of claim 4 wherein the third component is a disk drive motor and the separating blade defines a leading edge of the slot that is offset from a leading edge of the blade such that the slot leading edge separates the circuit board from the disk drive motor, the separating blade leading edge defining a rake angle that contacts the circuit board.

6. The apparatus of claim 5 wherein the offset is in a range of about 2 mm to about 20 mm and the rake angle is in a range of about 10 degrees to about 40 degrees.

7. The apparatus of claim 1 wherein the separating blade is a lid separating blade adapted to selectively remove a hard disk drive lid from the hard disk drive housing, wherein the lid separating blade includes a wedge having tapered beveled sides and a forward beveled side defining a blade edge, the separating blade being movable relative to a leading edge portion of the forward beveled side with a seam defining an interface between the hard disk drive lid and the hard disk drive housing such that contact between the separating blade and the seam causes the hard disk drive lid to bend and the tapered beveled sides guiding lid edges of the hard disk drive lid to draw inwardly shearing connecting fasteners to separate the hard disk drive lid from the hard disk drive housing.

8. The apparatus of claim 1 wherein the blade mount is an adjustable blade mount having a mounting base and a blade mount receiver, the blade mount receiver and the mounting base including mating channels and projections configured to permit adjustment of the separating blade in a first direction and constrain the blade in a second direction against impact forces with the first hard drive component or the second hard drive component.

9. The apparatus of claim 8 wherein the first component is the hard disk drive housing and the second component is a circuit board.

10. The apparatus of claim 8 wherein the first direction is a height of the separating blade relative to the base, and a jack screw is disposed between a blade support that is connected to the separating blade and the mounting base to adjust the separating blade height.

11. The apparatus of claim 10 wherein the blade mount receiver includes at least one support lock to fix the blade mount receiver relative to the mounting base.

12. The apparatus of claim 10 wherein the jack screw engages a partial bore having threads formed in the blade support and the mounting base includes a jack screw retaining bore that permits the jack screw to rotate relative to the mounting base and axially retained relative to the mounting base.

* * * * *